US012699855B2

(12) United States Patent

Agrawal et al.

(10) Patent No.: US 12,699,855 B2

(45) Date of Patent: Aug. 4, 2026

(54) NATURAL LANGUAGE OUTPUTS FOR PATH PRESCRIBER MODEL SIMULATION FOR NODES IN A TIME-SERIES NETWORK

(71) Applicant: Oracle International Corporation, Redwood Shores, CA (US)

(72) Inventors: Vikas Agrawal, Hyderabad (IN); Manisha Gupta, San Ramon, CA (US); Malhar Chaudhari, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 528 days.

(21) Appl. No.: 17/396,569

(22) Filed: Aug. 6, 2021

(65) Prior Publication Data

US 2021/0365643 A1 Nov. 25, 2021

Related U.S. Application Data

(63) Continuation-in-part of application No. 17/018,794, filed on Sep. 11, 2020, now Pat. No. 11,467,803, and (Continued)

(30) Foreign Application Priority Data

Sep. 13, 2019 (IN) .............................. 201941036990

(51) Int. Cl.
*G06F 40/56* (2020.01)
*G06F 16/332* (2025.01)
(Continued)

(52) U.S. Cl.
CPC .......... *G06F 40/56* (2020.01); *G06F 16/3326* (2019.01); *G06F 16/3329* (2019.01); (Continued)

(58) Field of Classification Search
CPC .. G06F 40/56; G06F 16/3326; G06F 16/3329; G06F 16/3344; G06F 40/247; (Continued)

(56) References Cited

U.S. PATENT DOCUMENTS 5,276,771 A 1/1994 Manukian et al.
5,642,519 A 6/1997 Martin
(Continued)

FOREIGN PATENT DOCUMENTS

CN 102254017 A 11/2011
CN 106575308 A 4/2017
(Continued)

OTHER PUBLICATIONS

U.S. Appl. No. 16/140,153, Non-Final Office Action mailed on Sep. 9, 2021, 12 pages.
(Continued)

*Primary Examiner* — Francis Z. Santiago Merced
(74) *Attorney, Agent, or Firm* — Kilpatrick Townsend & Stockton LLP

(57) ABSTRACT

A method of generating natural language outputs may include accessing a model of a system, where the system may be represented by a hierarchy of nodes in a data structure, and nodes in the hierarchy of nodes may include time series of data. The method may also include identifying a time series represented by a node in the data structure that will generate a future anomaly; accessing a template corresponding to a type of the time series; populating semantic tags in the template using data from the time series; sending a phrase from the template to a natural language model; receiving a plurality of similar phrases from the natural language model; selecting one of the plurality of similar (Continued)

phrases and replacing the phrase in the template; and causing language from the template to be displayed on a display device.

20 Claims, 29 Drawing Sheets

Related U.S. Application Data a continuation-in-part of application No. 16/586,347, filed on Sep. 27, 2019, now Pat. No. 11,367,034.

(60) Provisional application No. 62/855,218, filed on May 31, 2019, provisional application No. 62/737,518, filed on Sep. 27, 2018.

(51) Int. Cl.

| | |
|---|---|
| *G06F 16/3329* | (2025.01) |
| *G06F 16/334* | (2025.01) |
| *G06F 40/247* | (2020.01) |
| *G06F 40/35* | (2020.01) |

(52) U.S. Cl.
CPC ........ *G06F 16/3344* (2019.01); *G06F 40/247* (2020.01); *G06F 40/35* (2020.01)

(58) Field of Classification Search
CPC ........ G06F 40/35; G06F 40/186; G06F 40/30; G06F 7/24; G06F 3/0482; G06F 9/451; G06N 3/045; G06N 3/08; G06N 5/01; G06N 20/00; G06Q 30/0201; G06Q 10/06393; G06Q 10/04; G06T 11/206; G06T 2200/24
USPC ........................................................ 705/7.39
See application file for complete search history.

(56) References Cited

U.S. PATENT DOCUMENTS

| | | | |
|---|---|---|---|
| 5,717,828 A | 2/1998 | Rothenberg | |
| 5,754,681 A | 5/1998 | Watanabe et al. | |
| 5,966,690 A | 10/1999 | Fujita et al. | |
| 6,732,064 B1* | 5/2004 | Kadtke | G06F 18/21 |
| | | | 702/189 |
| 6,995,768 B2 | 2/2006 | Jou et al. | |
| 7,277,831 B1 | 10/2007 | Pawelzik et al. | |
| 7,801,769 B1 | 9/2010 | Kelly et al. | |
| 7,869,989 B1 | 1/2011 | Harvey et al. | |
| 8,200,527 B1 | 6/2012 | Thompson et al. | |
| 8,620,716 B2 | 12/2013 | Nicholls et al. | |
| 8,824,337 B1 | 9/2014 | Geisberger | |
| 9,208,231 B1 | 12/2015 | Upstill et al. | |
| 9,911,094 B1 | 3/2018 | Chen et al. | |
| 10,204,359 B1 | 2/2019 | Lee et al. | |
| 10,210,548 B1 | 2/2019 | Wai | |
| 10,614,191 B1 | 4/2020 | Fraisse et al. | |
| 11,238,409 B2 | 2/2022 | Gupta et al. | |
| 11,243,966 B1 | 2/2022 | Wong | |
| 11,367,034 B2 | 6/2022 | Chintalapati et al. | |
| 11,467,803 B2 | 10/2022 | Agrawal et al. | |
| 12,039,287 B2 | 7/2024 | Agrawal et al. | |
| 2003/0004402 A1 | 1/2003 | Hitt et al. | |
| 2004/0179467 A1 | 9/2004 | Seeger et al. | |
| 2004/0196301 A1 | 10/2004 | Isner | |
| 2006/0046232 A1 | 3/2006 | Peter | |
| 2006/0241923 A1 | 10/2006 | Xu et al. | |
| 2007/0204113 A1 | 8/2007 | Landry | |
| 2007/0222968 A1 | 9/2007 | Krasutsky | |
| 2007/0244741 A1 | 10/2007 | Blume et al. | |
| 2008/0124686 A1 | 5/2008 | Forman | |
| 2008/0199075 A1 | 8/2008 | Gokturk et al. | |
| 2008/0313000 A1 | 12/2008 | Degeratu et al. | |
| 2009/0083019 A1 | 3/2009 | Nasle | |

| | | | |
|---|---|---|---|
| 2009/0132450 A1 | 5/2009 | Schlottmann | |
| 2009/0248502 A1 | 10/2009 | Hoff et al. | |
| 2009/0276296 A1 | 11/2009 | Spriegel | |
| 2010/0036606 A1 | 2/2010 | Jones | |
| 2010/0049538 A1 | 2/2010 | Frazer et al. | |
| 2010/0223212 A1* | 9/2010 | Manolescu | G09B 7/00 |
| | | | 706/46 |
| 2010/0233663 A1 | 9/2010 | Pennington et al. | |
| 2010/0329395 A1 | 12/2010 | Kang et al. | |
| 2011/0112998 A1 | 5/2011 | Abe et al. | |
| 2011/0131082 A1 | 6/2011 | Manser et al. | |
| 2011/0161139 A1 | 6/2011 | Maheshwari et al. | |
| 2011/0261049 A1 | 10/2011 | Cardno et al. | |
| 2011/0295903 A1* | 12/2011 | Chen | G06F 16/285 |
| | | | 707/794 |
| 2011/0311129 A1 | 12/2011 | Milanfar et al. | |
| 2012/0053995 A1 | 3/2012 | D'Albis et al. | |
| 2012/0066017 A1 | 3/2012 | Siegel | |
| 2012/0102396 A1 | 4/2012 | Arksey et al. | |
| 2012/0158301 A1 | 6/2012 | Schilling et al. | |
| 2013/0002587 A1 | 1/2013 | Biggs et al. | |
| 2013/0018824 A1 | 1/2013 | Ghani et al. | |
| 2013/0024249 A1 | 1/2013 | Zohar et al. | |
| 2013/0080375 A1 | 3/2013 | Viswanathan et al. | |
| 2013/0191309 A1 | 7/2013 | Lakshminarayan | |
| 2013/0261965 A1 | 10/2013 | Delling et al. | |
| 2013/0261966 A1 | 10/2013 | Wang et al. | |
| 2014/0157142 A1 | 6/2014 | Heinrich et al. | |
| 2014/0222738 A1 | 8/2014 | Joyce et al. | |
| 2014/0258189 A1 | 9/2014 | Schmidt | |
| 2014/0282261 A1 | 9/2014 | Ranz et al. | |
| 2014/0358602 A1 | 12/2014 | Jones | |
| 2015/0012471 A1 | 1/2015 | Efrat et al. | |
| 2015/0113056 A1 | 4/2015 | Srinivasan et al. | |
| 2015/0120608 A1 | 4/2015 | Leftwich et al. | |
| 2015/0206443 A1 | 7/2015 | Aylesworth et al. | |
| 2015/0229661 A1 | 8/2015 | Balabine et al. | |
| 2015/0234869 A1 | 8/2015 | Chan et al. | |
| 2015/0363798 A1 | 12/2015 | Aihara et al. | |
| 2015/0369864 A1 | 12/2015 | Marlow et al. | |
| 2016/0057207 A1 | 2/2016 | Li et al. | |
| 2016/0078868 A1* | 3/2016 | Landry | G06F 40/35 |
| | | | 704/9 |
| 2016/0092530 A1 | 3/2016 | Jakubiak et al. | |
| 2016/0170610 A1 | 6/2016 | Bertram et al. | |
| 2016/0171380 A1* | 6/2016 | Kennel | G06N 7/01 |
| | | | 706/12 |
| 2016/0171540 A1 | 6/2016 | Mangipudi et al. | |
| 2016/0239768 A1 | 8/2016 | Jones | |
| 2016/0306908 A1 | 10/2016 | Fontes et al. | |
| 2016/0328253 A1 | 11/2016 | Majumdar | |
| 2016/0379083 A1 | 12/2016 | Sala et al. | |
| 2017/0024652 A1 | 1/2017 | Kipersztok et al. | |
| 2017/0116624 A1 | 4/2017 | Moore et al. | |
| 2017/0124581 A1 | 5/2017 | Wilson et al. | |
| 2017/0228643 A1 | 8/2017 | Kurach et al. | |
| 2017/0243140 A1 | 8/2017 | Achin et al. | |
| 2017/0344927 A1 | 11/2017 | Coletta et al. | |
| 2017/0372695 A1 | 12/2017 | Takei et al. | |
| 2018/0046926 A1 | 2/2018 | Achin et al. | |
| 2018/0046987 A1 | 2/2018 | Goren et al. | |
| 2018/0060744 A1 | 3/2018 | Achin et al. | |
| 2018/0077175 A1 | 3/2018 | Divalentin et al. | |
| 2018/0114128 A1 | 4/2018 | Libert et al. | |
| 2018/0140260 A1 | 5/2018 | Taguchi et al. | |
| 2018/0253655 A1 | 9/2018 | Wang et al. | |
| 2018/0268082 A1 | 9/2018 | Latzina | |
| 2018/0276861 A1 | 9/2018 | Wright et al. | |
| 2018/0332256 A1 | 11/2018 | Ni et al. | |
| 2018/0349474 A1 | 12/2018 | Smith et al. | |
| 2018/0365229 A1 | 12/2018 | Buhrmann et al. | |
| 2019/0066056 A1 | 2/2019 | Gomez et al. | |
| 2019/0104041 A1 | 4/2019 | Tabak et al. | |
| 2019/0132224 A1 | 5/2019 | Verma et al. | |
| 2019/0138675 A1 | 5/2019 | Fontes et al. | |
| 2019/0156216 A1 | 5/2019 | Gupta et al. | |
| 2019/0171913 A1* | 6/2019 | Cheng | G06N 3/084 |
| 2019/0186928 A1 | 6/2019 | Blandin et al. | |
| 2019/0188289 A1 | 6/2019 | Suzuki et al. | |

(56) References Cited

U.S. PATENT DOCUMENTS

| | | | |
|---|---|---|---|
| 2019/0188605 | A1 | 6/2019 | Zavesky et al. |
| 2019/0197605 | A1 | 6/2019 | Sadler et al. |
| 2019/0220153 | A1 | 7/2019 | Kidron et al. |
| 2019/0268233 | A1 | 8/2019 | Singh |
| 2019/0306184 | A1 | 10/2019 | Oliner et al. |
| 2019/0317739 | A1 | 10/2019 | Turek et al. |
| 2020/0065857 | A1 | 2/2020 | Lagi et al. |
| 2020/0074295 | A1 | 3/2020 | O'donncha et al. |
| 2020/0103888 | A1 | 4/2020 | Sayyarrodsari et al. |
| 2020/0103895 | A1 | 4/2020 | SayyarRodsari et al. |
| 2020/0104775 | A1 | 4/2020 | Chintalapati et al. |
| 2020/0175217 | A1 | 6/2020 | Alhubail et al. |
| 2020/0287923 | A1 | 9/2020 | Raghavendra et al. |
| 2021/0081170 | A1 | 3/2021 | Agrawal et al. |
| 2021/0168175 | A1 | 6/2021 | Crabtree et al. |
| 2021/0326728 | A1 | 10/2021 | Kawachi et al. |
| 2021/0365611 | A1 | 11/2021 | Agrawal et al. |
| 2021/0365643 | A1 | 11/2021 | Agrawal et al. |

FOREIGN PATENT DOCUMENTS

| | | |
|---|---|---|
| EP | 3309689 | 4/2018 |
| JP | 2011054156 A | 3/2011 |
| JP | 2013109364 | 6/2013 |
| JP | 2017182363 A | 10/2017 |
| JP | 2017199362 A | 11/2017 |
| JP | 2018128873 A | 8/2018 |
| KR | 102148372 | 8/2020 |
| WO | 2011101858 A1 | 8/2011 |
| WO | 2021021328 | 2/2021 |

OTHER PUBLICATIONS

U.S. Appl. No. 16/147,234, Notice of Allow ance mailed on Sep. 30, 2021, 13 pages.

U.S. Appl. No. 16/586,347, Final Office Action mailed on Sep. 17, 2021, 22 pages.

Foote, A Brief History of Machine Learning, Dataversity, Available Online at: https://www.dataversity.net/a-brief-history-of-machine-learning, Mar. 26, 2019, 8 pages.

Ramamurthy et al., Identifying Employees for Re-Skilling Using an Analytics-Based Approach, 2015 IEEE International Conference on Data Mining Workshop (ICDMW), 2015, pp. 345-354.

Singh et al., Propensity Modeling for Employee Re-Skilling, 2017 IEEE Global Conference on Signal and Information Processing (GlobalSIP), 2017, pp. 893-897.

Tch, The Mostly Complete Chart of Neural Networks, Explained, Tow ards Data Science, Available Online at: https://towardsdatascience.com/the-mostly-complete-chart-of-neural-networks-explained-3fb6f2367464, Aug. 4, 2017, 28 pages.

U.S. Appl. No. 16/586,347, Notice of Allowance mailed on Feb. 7, 2022, 14 pages.

Casual Relationship, Science Direct, Accessed from Internet on May 26, 2022, pp. 1-7.

N-Sphere, Available Online at: https://en.wikipedia.org/wiki/N-sphere, Aug. 12, 2018, 8 pages.

U.S. Appl. No. 16/145,963, Final Office Action mailed on May 6, 2022, 31 pages.

U.S. Appl. No. 16/580,746, Non-Final Office Action mailed on Jul. 1, 2022, 72 pages.

U.S. Appl. No. 17/018,794, Notice of Allowance mailed on Jun. 8, 2022, 9 pages.

KR 102148372, Apparatus and Method for Recognizing Emotion Based on Voice, Google Patents, Aug. 26, 2020, 19 pages.

U.S. Appl. No. 16/145,963, Non-Final Office Action mailed on Oct. 29, 2021, 34 pages.

U.S. Appl. No. 16/140,153, Final Office Action mailed on Dec. 20, 2021, 2021, 13 pages.

*Episodic Memory*, Wikipedia, Available Online at: https://en.wikipedia.org/wiki/Episodic_memory, last edited Mar. 2, 2018, 9 pages, retrieved May 4, 2021.

*Win-Loss Analytics*, Wikipedia, Available Online at: https:/w_eb.archive.om/web/20151228213605/https://en.w ikipedia.org/wiki/Win%E2%80%93loss_analytics, last edited Jan. 22, 2016, 1 page, retrieved May 4, 2021.

Lundberg et al., *A Unified Approach to Interpreting Model Predictions*, 31st Conference on Neural Information Processing Systems, Nov. 25, 2017, 10 pages.

Runge et al., *Detecting and Quantifying Causal Associations in Large Nonlinear Time Series Datasets*, Science Advances, vol. 5, Nov. 27, 2019, 15 pages.

Runge et al., *Detecting Causal Associations in Large Nonlinear Time Series Datasets*, Cornell University Library, vol. 5, No. 11, Available Online at: https://arxiv.org/abs/1702.07007, Feb. 22, 2017, 46 pages.

Tiunov, *Time Series Anomaly Detection Algorithms, Stats and Boats*, Available Online at: https://blog.statsbot.co/time-senes-anomally-detection-algorithms-1cef5519aef2, Jun. 8, 2017, 8 pages.

International Application No. PCT/US2019/053576, International Preliminary Report on Patentability mailed on Apr. 8, 2021, 9 pages.

International Application No. PCT/US2019/053576, International Search Report and Written Opinion mailed on Dec. 12, 2019, 12 pages.

U.S. Appl. No. 16/140,153, Final Office Action mailed on Dec. 7, 2020, 27 pages.

U.S. Appl. No. 16/140,153, First Action Interview Office Action Summary mailed on Jul. 1, 2020, 27 pages.

U.S. Appl. No. 16/140,153, First Action Interview Pilot Program Pre-Interview Communication mailed on May 4, 2020, 26 pages.

U.S. Appl. No. 16/145,963, Final Office Action mailed on Jan. 15, 2021, 24 pages.

U.S. Appl. No. 16/145,963, First Action Interview Office Action Summary mailed on Sep. 25, 2020, 6 pages.

U.S. Appl. No. 16/145,963, First Action Interview Pilot Program Pre-Interview Communication mailed on Aug. 5, 2020, 5 pages.

U.S. Appl. No. 16/147,234, Final Office Action mailed on Dec. 11, 2020, 17 pages.

U.S. Appl. No. 16/147,234, First Action Interview Office Action Summary mailed on Sep. 29, 2020, 7 pages.

U.S. Appl. No. 16/147,234, First Action Interview Pilot Program Pre-Interview Communication mailed on Aug. 5, 2020, 6 pages.

U.S. Appl. No. 16/580,746, Final Office Action mailed on Aug. 11, 2021, 89 pages.

U.S. Appl. No. 16/580,746, Non-Final Office Action mailed on Apr. 29, 2021, 40 pages.

U.S. Appl. No. 16/586,347, First Action Interview Pilot Program Pre-Interview Communication mailed on Feb. 9, 2021, 7 pages.

U.S. Appl. No. 16/145,963 , Advisory Action, Mailed On Feb. 9, 2023, 3 pages.

U.S. Appl. No. 16/145,963 , Final Office Action, Mailed On Oct. 18, 2022, 42 pages.

U.S. Appl. No. 16/580,746 , Final Office Action, Mailed On Dec. 27, 2022, 73 pages.

U.S. Appl. No. 17/396,561, Final Office Action mailed on Jun. 6, 2024, 19 pages.

U.S. Appl. No. 17/396,561, Non-Final Office Action mailed on Nov. 24, 2023, 16 pages.

U.S. Appl. No. 17/396,561, Non-Final Office Action mailed on Feb. 13, 2025, 22 pages.

U.S. Appl. No. 17/963,770, Non-Final Office Action mailed on Nov. 24, 2023, 11 pages.

U.S. Appl. No. 17/963,770, Notice of Allowance mailed on Mar. 18, 2024, 8 pages.

Application No. CN201980072248.X, Office Action mailed on Aug. 1, 2024, 16 pages.

Gan et al., "Data Mining Algorithms for Genome Analysis", Tongji University Press, Version: 978-7-5608-7021-2, Aug. 31, 2017, pp. 66-69.

Application No. JP2024-066175, Office Action mailed on Jan. 7, 2025, 7 pages.

U.S. Appl. No. 17/396,561, Non-Final Office Action mailed on Apr. 29, 2026, 23 pages.

* cited by examiner

2100

2102

Access the simplified casual, dynamical model

2104

Identify extreme point anomalies and trend anomalies

2106

Populate template using values from anomalous time series and targets

2108

Generate a natural language variation from the template output

2400

2402

Identify known relationships for nodes that have significantly changed

2404

Calculate local derivatives w.r.t. single nodes and pairs of other nodes

2406

List the single and paired driver nodes that are the strongest for each changed node

2408

Populate template based values from anomalies

2410

Generate a natural language variation from the template

2500

DATABASE 2514

DATABASE 2516

COMPONENT 2518

COMPONENT 2520

COMPONENT 2522

. . .

SERVER 2512

NETWORK(S) 2510

2508

2502

2504

2506

NATURAL LANGUAGE OUTPUTS FOR PATH PRESCRIBER MODEL SIMULATION FOR NODES IN A TIME-SERIES NETWORK

CROSS-REFERENCE TO RELATED APPLICATION

The present application is a continuation-in-part of U.S. patent application Ser. No. 17/018,794 filed on Sep. 11, 2020. U.S. patent application Ser. No. 17/018,794 is a non-provisional application of, and claims the benefit and priority of India Application No: 201941036990, filed Sep. 13, 2019. The present application is also a continuation-in-part of U.S. patent application Ser. No. 16/586,347 filed on Sep. 27, 2019. U.S. patent application Ser. No. 16/586,347 claims the benefit of and priority to U.S. Provisional Application No. 62/855,218, filed May 31, 2019, and U.S. Provisional Application No. 62/737,518, filed Sep. 27, 2018. The entire contents of each of these applications are hereby incorporated herein by reference in their entirety for all purposes.

BACKGROUND

A metric can provide valuable information about real-world operations in an entity. Identifying which metrics are most valuable to the user for their decision making can be challenging. Relevant information for the user may be changing rapidly or stagnant. However, the user who regularly looks only at specific metrics may not be aware of the changes that are significant or contain valuable information, particularly if the user is regularly looking only at stagnant metrics.

BRIEF SUMMARY

In some embodiments, a method of creating and executing action pathways for time series data may include accessing a model of a system, where the system may be represented by a hierarchy of nodes in a data structure, and nodes in the hierarchy of nodes may include time series of data. The method may also include simplifying the model by removing relationships between the hierarchy of nodes that affect parent nodes less than a threshold amount; simulating the model to identify a node comprising a time series of data that risks missing a predefined target value; generating a pathway of actions comprising changes to driver nodes of the node that cause the time series of data to move within a threshold distance of the predefined target value in the future; and causing the pathway of actions to be executed.

In some embodiments, a non-transitory computer-readable medium may include instructions that, when executed by one or more processors, cause the one or more processors to perform operations including accessing a model of a system, where the system may be represented by a hierarchy of nodes in a data structure, and nodes in the hierarchy of nodes may include time series of data. The operations may also include simplifying the model by removing relationships between the hierarchy of nodes that affect parent nodes less than a threshold amount; simulating the model to identify a node comprising a time series of data that risks missing a predefined target value; generating a pathway of actions comprising changes to driver nodes of the node that cause the time series of data to move within a threshold distance of the predefined target value in the future; and causing the pathway of actions to be executed.

In some embodiments, a system may include one or more processors and one or more memory devices comprising instructions that, when executed by the one or more processors, cause the one or more processors to perform operations including including including accessing a model of a system, where the system may be represented by a hierarchy of nodes in a data structure, and nodes in the hierarchy of nodes may include time series of data. The operations may also include simplifying the model by removing relationships between the hierarchy of nodes that affect parent nodes less than a threshold amount; simulating the model to identify a node comprising a time series of data that risks missing a predefined target value; generating a pathway of actions comprising changes to driver nodes of the node that cause the time series of data to move within a threshold distance of the predefined target value in the future; and causing the pathway of actions to be executed.

In any embodiments, any or all of the following features may be included in any combination and without limitation. The hierarchy of nodes in the data structure may include a plurality of non-cyclical, linear parent-child relationships. Simplifying the model may further include removing parameters from the model that affect simulated values less than a threshold amount. Simplifying the model may further include removing non-driver notes from the hierarchy of nodes. Simplifying the model may further include assigning partial delay equations to relationships between the hierarchy of nodes. Simplifying the model may further include initializing the partial delay equations using domain-specific values; and assigning default values to partial delay equations without domain-specific values. Simplifying the model my further include limiting boundary conditions of the partial delay equations to real-world limits to minimize a search space. Simplifying the model may further include performing a simulated annealing algorithm on the model that optimizes based on an error function. Simplifying the model may further include identifying a best-fitting model from a plurality of models using different partial delay equations for relationships between the hierarchy of nodes. The method/operations may also include simulating the model to identify local derivatives for the node with respect to the driver nodes of the node. The method/operations may also include defining a local space for solution exploration with respect to each of the driver nodes using the local derivatives. Generating the pathway of actions may include searching along a pathway of a maximal gradient change from among a plurality of pathways. The maximal gradient change may generate a largest observed change in simulated future values for the node. The pathway of actions may include actions that cause changes to time series associated with the driver nodes for the node. Generating the pathway of actions may include changing a plurality of time series associated with the driver nodes until a resulting simulated future value of the node is within one standard deviation of the predefined target value. The method/operations may also include calculating cost equation outputs of actions in the pathway of actions. The method/operations may also include generating a display summarizing actions of the pathway of actions and corresponding cost equation outputs. The cost equation outputs may include a time delay until the time series of data moves within the threshold distance of the predefined target.

In some embodiments, a method of generating natural language outputs may include accessing a model of a system, where the system may be represented by a hierarchy of nodes in a data structure, and nodes in the hierarchy of nodes comprise time series of data. The method may also include identifying a time series represented by a node in the data structure that will generate a future anomaly; accessing a template corresponding to a type of the time series; populating semantic tags in the template using data from the time series; sending a phrase from the template to a natural language model; receiving a plurality of similar phrases from the natural language model; selecting one of the plurality of similar phrases and replacing the phrase in the template; and causing language from the template to be displayed on a display device.

In some embodiments, a non-transitory computer-readable medium may include instructions that, when executed by one or more processors, cause the one or more processors to perform operations including accessing a model of a system, where the system may be represented by a hierarchy of nodes in a data structure, and nodes in the hierarchy of nodes comprise time series of data. The operations may also include identifying a time series represented by a node in the data structure that will generate a future anomaly; accessing a template corresponding to a type of the time series; populating semantic tags in the template using data from the time series; sending a phrase from the template to a natural language model; receiving a plurality of similar phrases from the natural language model; selecting one of the plurality of similar phrases and replacing the phrase in the template; and causing language from the template to be displayed on a display device.

In some embodiments, a system may include one or more processors and one or more memory devices comprising instructions that, when executed by the one or more processors, cause the one or more processors to perform operations including including accessing a model of a system, where the system may be represented by a hierarchy of nodes in a data structure, and nodes in the hierarchy of nodes comprise time series of data. The operations may also include identifying a time series represented by a node in the data structure that will generate a future anomaly; accessing a template corresponding to a type of the time series; populating semantic tags in the template using data from the time series; sending a phrase from the template to a natural language model; receiving a plurality of similar phrases from the natural language model; selecting one of the plurality of similar phrases and replacing the phrase in the template; and causing language from the template to be displayed on a display device.

In any embodiments, any or all of the following features may be included in any combination and without limitation. Identifying the time series that will generate the future anomaly may include simulating the model of the system to generate a simulated future time series, and determining that the simulated future time series includes data points that fall outside of a threshold region. Identifying the time series that will generate the future anomaly may include identifying a trend such that the time series increases or decreases in a single direction in an aggregate. The template may include semantic tags that are replaced by data points in the time series. The time series may include an entity name, a value type, and a plurality of values. The natural language model may include a Transformer model. The method/operations may also include selecting the plurality of similar phrases from a plurality of output phrases from the natural language model, where the plurality of similar phrases may be selected based on a being above a threshold. Selecting the one of the plurality of similar phrases and replacing the phrase in the template may include randomly selecting one of the plurality of similar phrases. The method/operations may also include generating a plurality of phrases from the phrase before sending the phrase to the natural language model. The plurality of phrases may be generated from the phrase by substituting words in the phrase with synonym words. The plurality of phrases may be converted into word vectors. The word vectors may be provided as a seed to the natural language model. The hierarchy of nodes in the data structure may include a plurality of non-cyclical, linear parent-child relationships. The method/operations may also include simplifying the model by removing relationships between the hierarchy of nodes that affect parent nodes less than a threshold amount; simulating the model to identify a node comprising a time series of data that risks missing a predefined target value; and generating a pathway of actions comprising changes to driver nodes of the node that cause the time series of data to move within a threshold distance of the predefined target value in the future, where the template may describe the action pathway. Simplifying the model may also include removing parameters from the model that affect simulated values less than a threshold amount; removing non-driver notes from the hierarchy of nodes; assigning partial delay equations to relationships between the hierarchy of nodes; initializing the partial delay equations using domain-specific values; and/or assigning default values to partial delay equations without domain-specific values.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Almost all entities store data using relational databases or multidimensional data warehouses. This data may include operational data that describes metrics and progression towards those metrics in terms of discrete data point measurements or inputs. The data may often be stored as a time series of data points, with each data point representing a snapshot in time of a metric that is captured at regular intervals. For example, a metric may be measured or recorded on a weekly basis and stored as part of a time series of values for that metric. These time series may later be used to analyze progression (or a lack thereof) towards a target value, along with diagnosing causes for any deviation from an expected trajectory within the time series, or to find point deviations or trend deviations from normal trends within pre-specified time periods.

Figure 1:
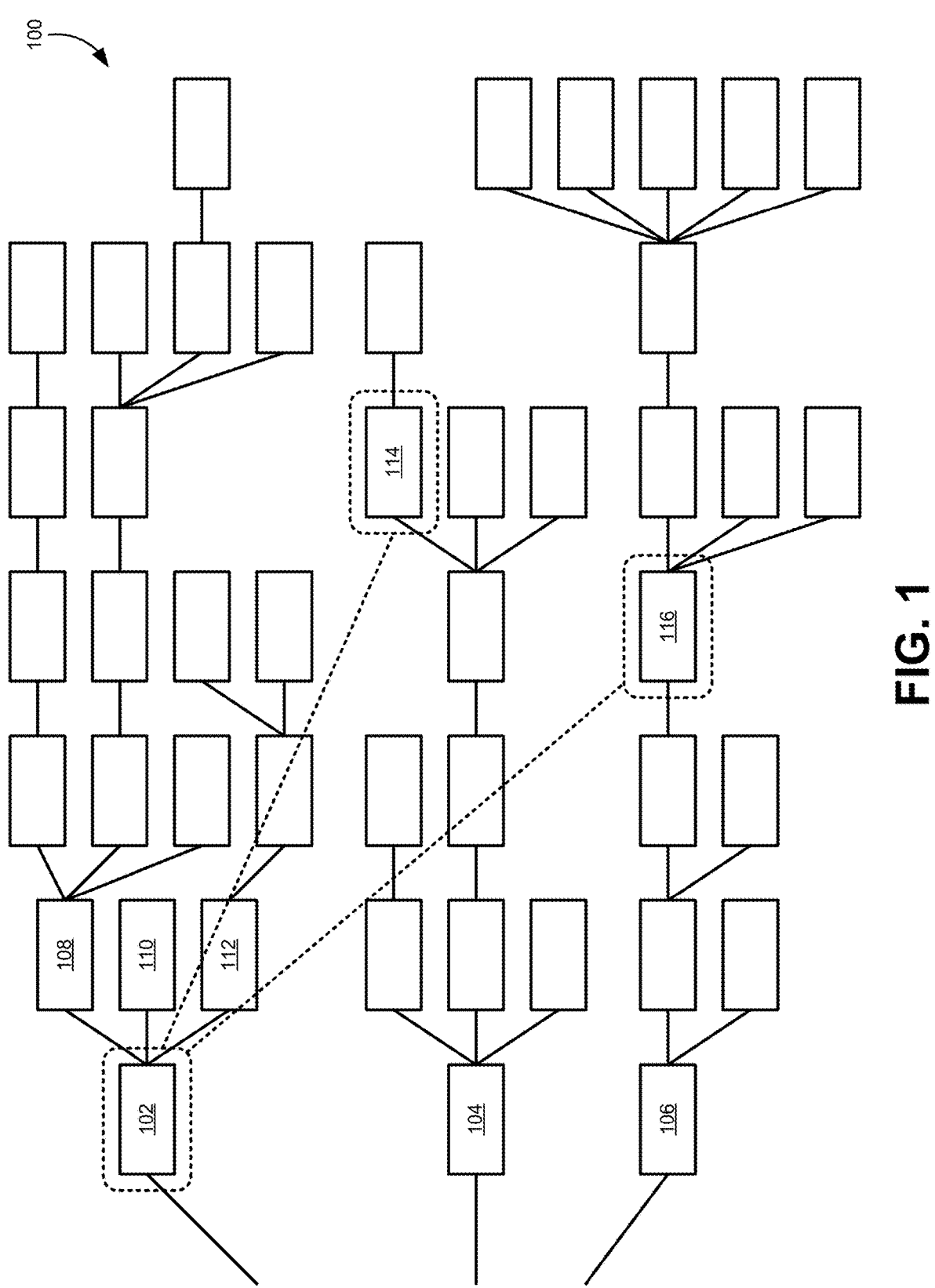
FIG. 1 illustrates a data structure that may be used to store a plurality of nodes representing individual time series, according to some embodiments.

FIG. 1 illustrates a data structure 100 that may be used to store a plurality of nodes representing individual time series, according to some embodiments. Each node in the data structure 100 may represent an individual time series for a metric. For example, node 102 may represent a plurality of values with corresponding timestamps that have been measured and recorded over time. Values may be continuously added to the time series of node 102 as they are received over time. In some embodiments, the time series of node 102 may continually grow as the measurements are received. Other embodiments may use a sliding window that keeps only the N most recent values added to this time series to replace the oldest entries in the time series. Note that the time series of node 102 and other nodes in the data structure 100 may represent any type of data, such as sensor measurements, characteristics of an entity, enterprise data, and so forth.

A data structure 100 may include elements arranged in a sequential manner, with each member element connected to its previous and/or next element. This type of data structure 100 may be traversed quickly by moving through each of the levels. Additionally, the data structure 100 may be hierarchical in nature. For example, the data structure 100 may be organized into different levels with parent relationships and child relationships. A parent-child relationship may indicate a causal relationship between the time series in the parent node and the time series in the child node, where the child node's times series is connected to changes in the parent node's time series. For example, node 102 may be linked to child nodes 108, 110, 112. In some cases, the child nodes 108, 110, 112 may contribute to the value stored in the parent node 102. For example, values in the time series of the child nodes 108, 110, 112 may predict or contribute to the time series in the parent node 102. However, a parent-child relationship need not always indicate a causal relationship between time series. In some cases, the time series stored in the parent node 102 may be related to the time series in the child nodes 108, 110, 112 in a non-causal way. For example, the time series in node 102 may be provided by an entity that is a parent organization to an organization providing the time series in node 108.

Beginning with the data structure 100, some embodiments may train models to predict the future values of an ongoing time series by using current or past values of other time series as inputs to the model. For example, future values of the time series in node 102 may be predicted by training a model using the time series in child nodes 108, 110, 112 as inputs. Some embodiments may also use the outputs of the model to determine whether an anomaly has taken place in the time series of node 102 by comparing the predicted values generated by the model with actual values recorded to the time series of node 102 as time moves forward. In this example, it is assumed that the child nodes 108, 110, 112 are related to the parent node 102 in a causal way, such that their time series can be used to predict the time series in node 102. Because of the parent-child relationships, the tree data structure 100 provides a good starting point for determining which nodes contribute to other nodes.

However, a technical challenge exists in relying only this type of data structure 100 to detect causal relationships. Specifically, the most significant causal relationships between nodes may not be accurately captured in the parent-child relationships of the data structure 100. For example, the time series of node 102 may be better predicted by the time series of node 114 and node 116. However, node 114 and node 116 are not connected via a parent-child relationship to node 102. This information is hidden in the data structure 100. In this example, a linear path between these two nodes may not even exist. The lack of an obvious connection makes it difficult to identify these important causal relationships that may be most beneficial when using a model to predict future values in a time series.

Another technical challenge exists in how to identify these causal relationships that are not immediately apparent in the tree data structure 100. Specifically, although the tree data structure 100 illustrated in FIG. 1 comprises only a small number of nodes, real-world examples of tree data structures 100 representing data collected for an organization may include thousands of individual nodes and relationships. Performing a many-to-many analysis to identify correlations between each node in the tree data structure 100 simply requires too much computing power for standard systems. Although such computations may be performed, they may not be performed regularly at frequent intervals. This means that data may become stale or no longer actionable. Furthermore, the relationships between nodes may change dramatically over time such that up-to-date data and frequent updates to models may be a necessity for providing useful, actionable information. Therefore, improvements are needed in the way that causal relationships are discovered in a plurality of nodes.

As used herein, the term "nodes" may represent a data structure that stores or links to a time series of information. The time series may include a plurality of data points and a plurality of corresponding times. In some cases, the time series may include a series of values without corresponding timestamps with the understanding that the values are recorded at regular intervals. Therefore, this disclosure may make reference to a node, and this reference may also refer to the time series and values/timestamps stored or referenced by the node. For example, stating that a node has a causal relationship with another node may be interpreted to mean that the time series within the first node may be used as an input to a predictive model trained to output the second time series.

Figure 2:
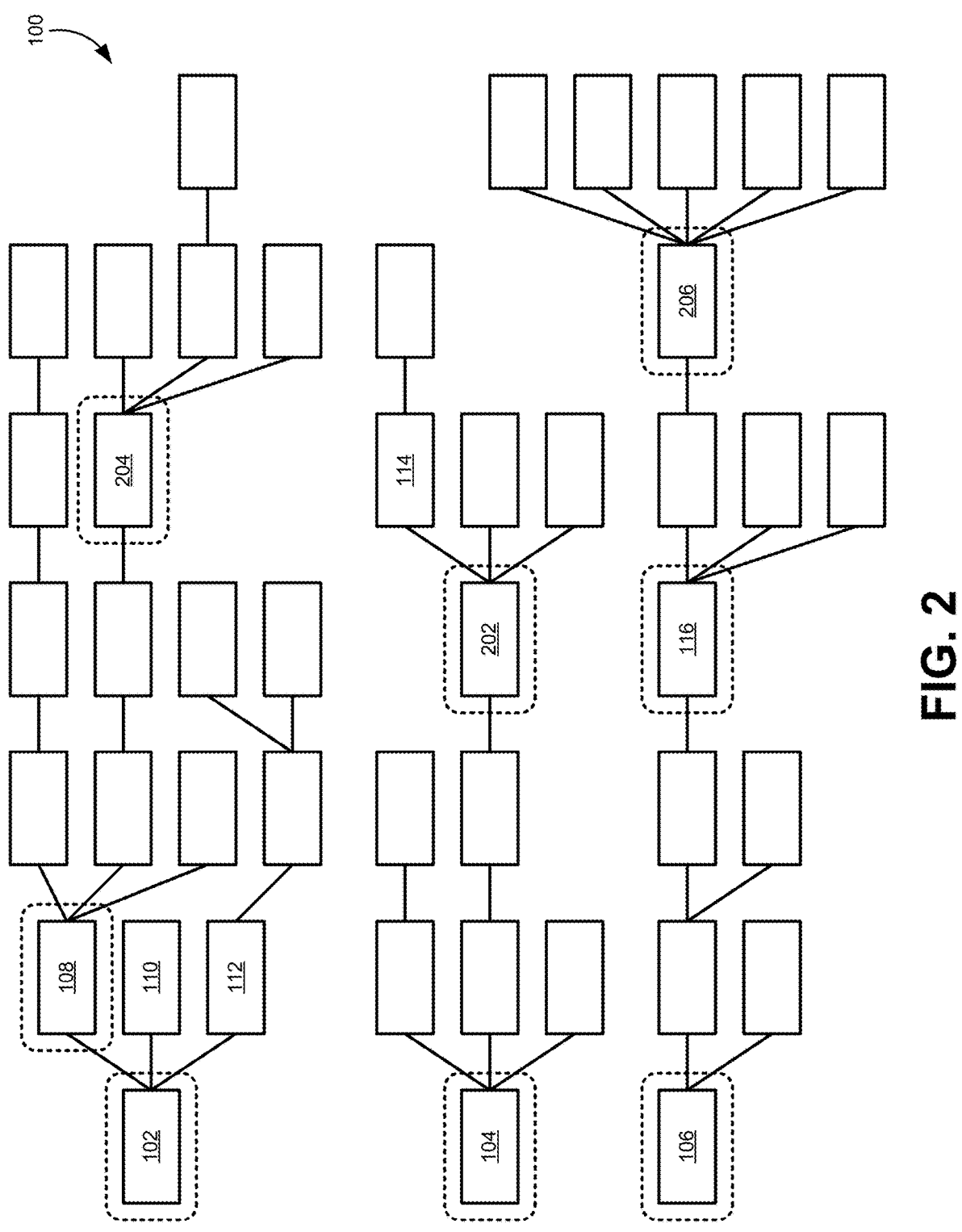
FIG. 2 illustrates how different methods can initially be used to reduce the search space for identifying hidden relationships in a network of nodes, according to some embodiments.

FIG. 2 illustrates how different methods can initially be used to reduce the search space for identifying hidden relationships in a network of nodes, according to some embodiments. A first step in identifying hidden causal relationships between nodes may include narrowing the search space for the search algorithms. As mentioned above, the data structure 100 may include thousands or even millions of nodes, and reducing the number of nodes considered by these algorithms can significantly increase the speed at which these algorithms can be completed and may make the complex model generation described below feasible on standard computing systems.

A first method for reducing the number of nodes considered by the algorithms described below may be to use domain expert information to initially select a number of nodes that should be considered. Experts in the type of organization represented by the time series of the nodes may be able to quickly identify an initial set of nodes that should be considered. In this example, a domain level expert may initially select nodes 102, 104, 106, 108, and 204 as nodes that are of interest to a particular analysis and which may be involved in one or more causal relationships between these nodes. Note that this step need not require human interaction or human input in order to select these nodes. Instead, some embodiments may use stored values that pre-identify nodes that should be considered in such an analysis. For example, each new analysis may draw from a library of pre-identified nodes that should be used specific to that type of analysis in the industry.

A second method for reducing a number of nodes in the search space may include receiving selections from a user that is performing the immediate analysis. Each individual analysis may be unique, and a user performing the analysis may be able to quickly identify additional nodes that are not part of the domain-expert set of nodes described above. In this example, an individual user may identify node 206 as an additional node that may be related to the existing set of nodes.

In addition to using explicit user selections, some nodes may be selected automatically based on previous usage patterns by users having similar roles. Some embodiments may retrieve a user role for a current user and use that information to identify a set of nodes that have been previously identified by other users having the same user role. For example, an administrative user may be provided with an initial selection of nodes in the data structure 100 based on usage patterns of nodes that were selected by previous administrative users. Some embodiments may train a model using machine learning techniques to identify node selections that take place with each type of user. This model may be trained over time to evolve with user preferences. Each different user role or user type may be associated with a corresponding trained model for generating an initial selection of nodes. This allows nodes to be selected that are identified over time as being useful for particular classes of users. This recommendation may include additional nodes, such as node 202 and node 116.

The combination of methods described above in relation to FIG. 2 may generate an initial selection of nodes as illustrated in FIG. 2. In this simplified example, the number of nodes to be searched has already been greatly reduced from the total number of nodes in the tree data structure 100. Some embodiments may also automatically respect the hierarchy and relationships inherent in the tree data structure 100 and/or data tables representing the individual time series. For example, a selection that includes node 102 may also automatically include nodes 108, 110, and/or 112 as suggested by the hierarchy of the tree data structure 100.

Figure 3:
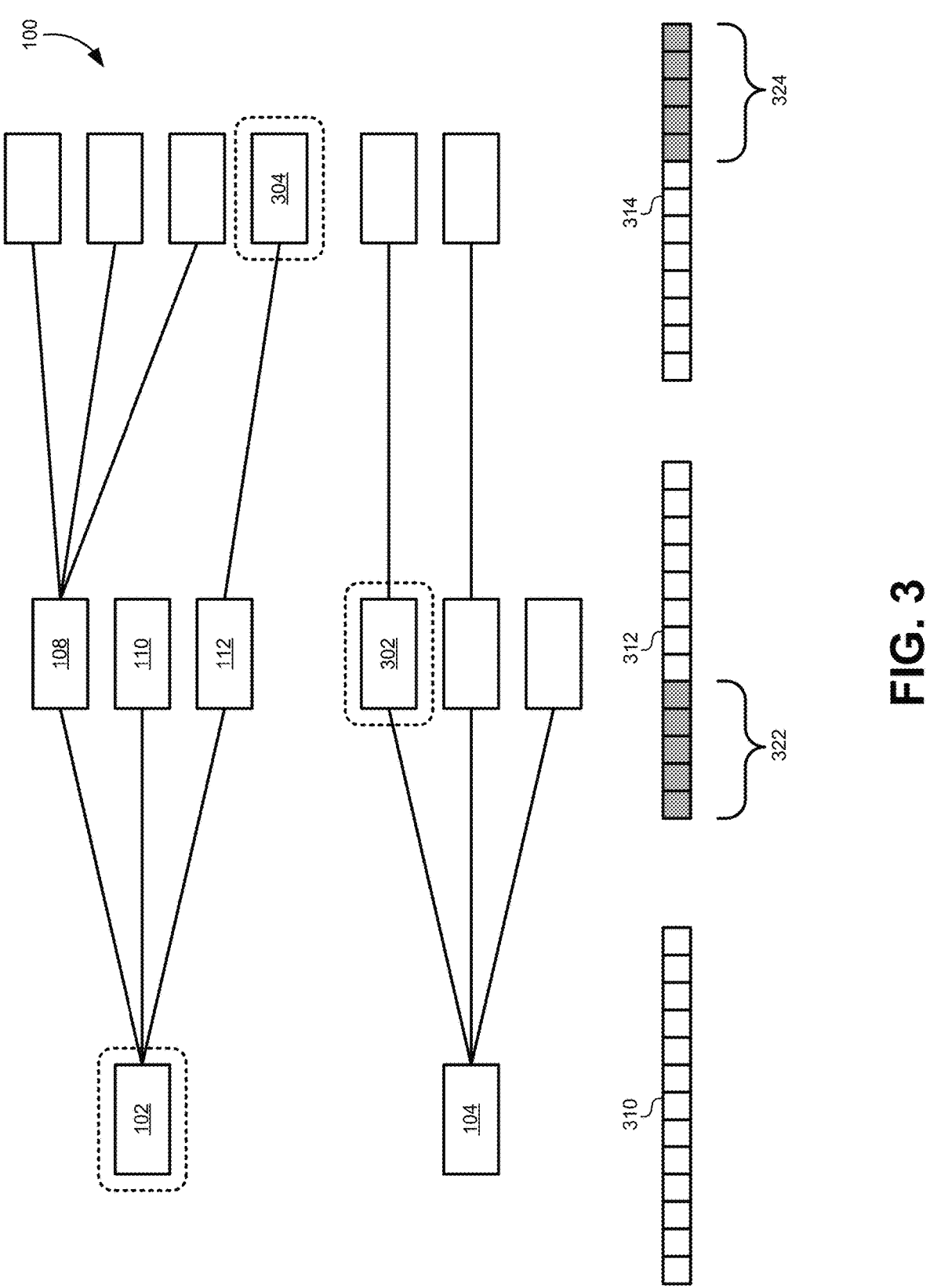
FIG. 3 illustrates how additional time series may be added to the pool of time series for analysis by identifying time relationships between time series, according to some embodiments.

FIG. 3 illustrates how additional time series may be added to the pool of time series for analysis by identifying time relationships between time series, according to some embodiments. Note that only a subset of the tree data structure 100 is provided in FIG. 3 for the sake of clarity. Although the purpose of the steps described above is to limit the size of the node pool under consideration, some embodiments may intelligently add additional nodes into the node pool as allowed by available computing resources.

For example, some embodiments may compare available CPU and memory resources with a current CPU/memory requirement based on the current size of the node pool. If an amount of CPU/memory resources available are at least two orders of magnitude greater than the requirements for the analysis of the current node pool, additional nodes may be added to the analysis. For example, if a computing system includes 500 16-core CPU equivalents and 100 TB of memory, and the current analysis requires 20 4-core CPU equivalents and 1 TB of memory, 10 times the number of existing nodes may be added as additional nodes to the node pool, compared to the existing node pool. A current computing resource requirement may be estimated and compared to an available computing resource measurement. If there are more than a threshold amount of available resources, then additional nodes may be added to the node pool.

As described above, an additional technical challenge involves maintaining a result set that is not stale or outdated as relationships between nodes change over time. Therefore, some embodiments may adjust the total number of nodes in the node pool based on a refresh rate of the analysis. For example, if the time expected for changes in relationships is least two orders of magnitude larger than the data refresh cycle of the analysis, 10 times the number of existing nodes may be added as additional nodes, compared to the existing number of nodes. If the data refresh cycle is daily, a broader search may be conducted with a larger node pool only once a quarter, or once every six months. This ensures that the data is refreshed before it becomes stale, with the compute time required to perform the analysis described below, at least in part, determining the refresh rate. Some embodiments allow trade-offs between refresh times and CPU memory scaling requirements. For example, using an order of magnitude more power/CPU/memory may deliver a refresh time only one order of magnitude longer than the data refresh time. Therefore, these two metrics may be balanced together to add additional nodes to the node pool.

In order to determine which nodes to add to the node pool if the compute/time requirements allow, some embodiments may identify nodes with overlapping time intervals in the data available that are significant for the particular problem under analysis. For example, node 102 may include a time series 310 that that is recorded over a time interval as described above. Similarly, node 302 may include a time series 312, and node 304 may include a time series 314. Node 102, node 302, and node 304 need not be related to each other in a linear, obvious relationship.

Despite the lack of a linear relationship, the possibility exists that these nodes 102, 302, 304 may still be causally related. After determining that the requisite compute/time resources exist, the algorithm may begin adding nodes that have overlapping time periods in the data which are significant for a particular problem identified by the user. Certain problem types may require recent overlapping data. A portion 322 of the time series 312 for node 302 may overlap with the time series 310 for node 102. Alternatively, some types of problems may have a delay between a node that affects another. For example, time series 314 may include a portion 324 of the time series 314 that occurred in the past, yet which may be relevant to a current time series 310 for node 102. The delay that may be used for identifying these time series may be defined by the problem and data under analysis. Different problem types and data sets may entail explicit identification of specified delays between time series, through user specification or a temporal causal relationship search using the principle that if previous values of X and Y together predict Y better than previous values of Y alone, then X is a causal factor for Y, and once such identification is done, those time-shifted time series may be included in the node pool, as the compute/time requirements allow.

The algorithm may continue adding time series as long as the system performance thresholds based on compute/time requirements are not breached. The algorithm may begin by including nodes where the overlap is greatest (i.e., greater than a threshold such as 90%) and may continue adding nodes using lower thresholds up to but not below 50%, if the compute/time requirements allow.

Figure 4:
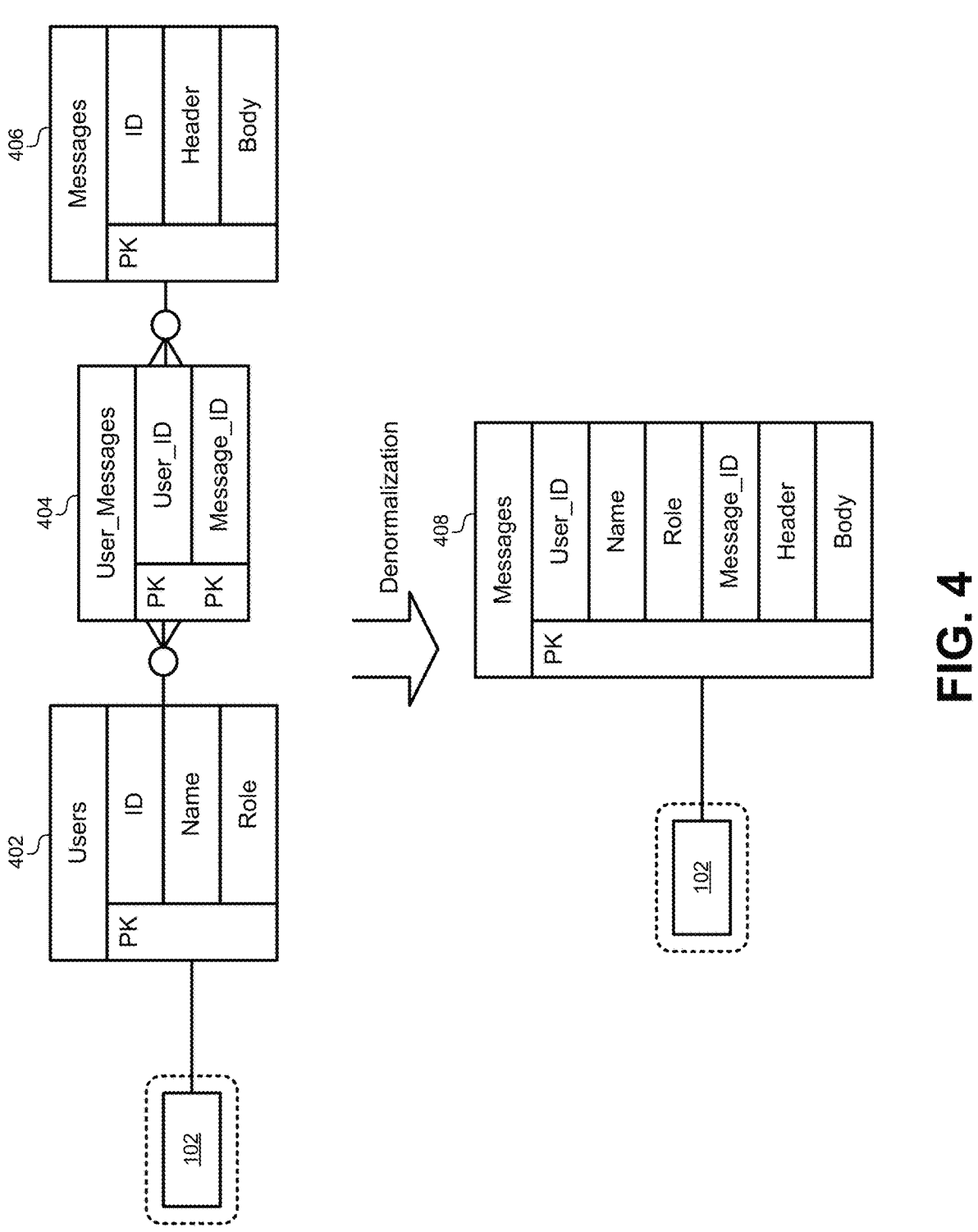
FIG. 4 illustrates how data tables representing the time series may be denormalized to improve performance, according to some embodiments.

FIG. 4 illustrates how data tables representing the time series may be denormalized to improve performance, according to some embodiments. Each time series may be associated with one or more data tables and may typically be associated with a plurality of data tables. Each data table may be associated with the node or sub node that contributes to variations in the current node. When these data tables are stored in a data warehouse, data in multiple tables may be denormalized and collected into a single table per node, with time stamps for each data point.

In the example of FIG. 4, node 102 may include a table 402 referencing a set of users. That table 402 may reference another table 404 storing information for a plurality of user messages. A third table 406 may store individual message texts. Using a denormalization algorithm, these tables may be combined into a single table 408 for node 102. By denormalizing each of the tables for the nodes included in the node pool under analysis, the algorithm described below for identifying causal relationships between nodes may be run significantly faster.

At this stage, a pool of relevant nodes has been identified for analysis. Again, it is not feasible to frame the analysis problem in terms of finding relationships between nodes in an all-to-all search, as that version of the problem is computationally intractable in its general form due to the exponential explosion in compute time and memory requirements. Rather, the algorithm now may begin with a set of denormalized seed tables identified using the methods described above. This allows the algorithm described below to identify causal relationships to be contained computationally and focused on the particular needs of the individual user. Note that this does not limit any super user with large CPU/memory resources available to perform a much broader/deeper search between additional nodes in the tree data structure 100 to find additional node relationships that may be missed in the smaller node pool. However, allowing a search that is too broad/deep runs the risk of finding spurious relationships that are highly correlated but not causal. Some embodiments may generate a warning or alert to users as the node pool size expands above a threshold amount. For example, if the number of nodes in the node pool expands to larger than a threshold number of nodes (e.g., 30 nodes) or more than a threshold percentage of nodes in the data structure 100 (e.g. 10% of the total number of nodes in the data structure 100), an alert may be generated indicating that the model complexity may lead to weaker discriminative power in the results.

As described above, each of the nodes represents a time series, and many of the causal dependencies discovered will be non-stationary over time. In other words, input distributions may tend to change over time and there may be changes in the relationships as processes change. Some embodiments may even change the data generating process over time such that values in the time series are distributed very differently than the values in the past. By shrinking the node pool as described above, these relationships may be identified much faster and more often to remain current.

Figure 5:
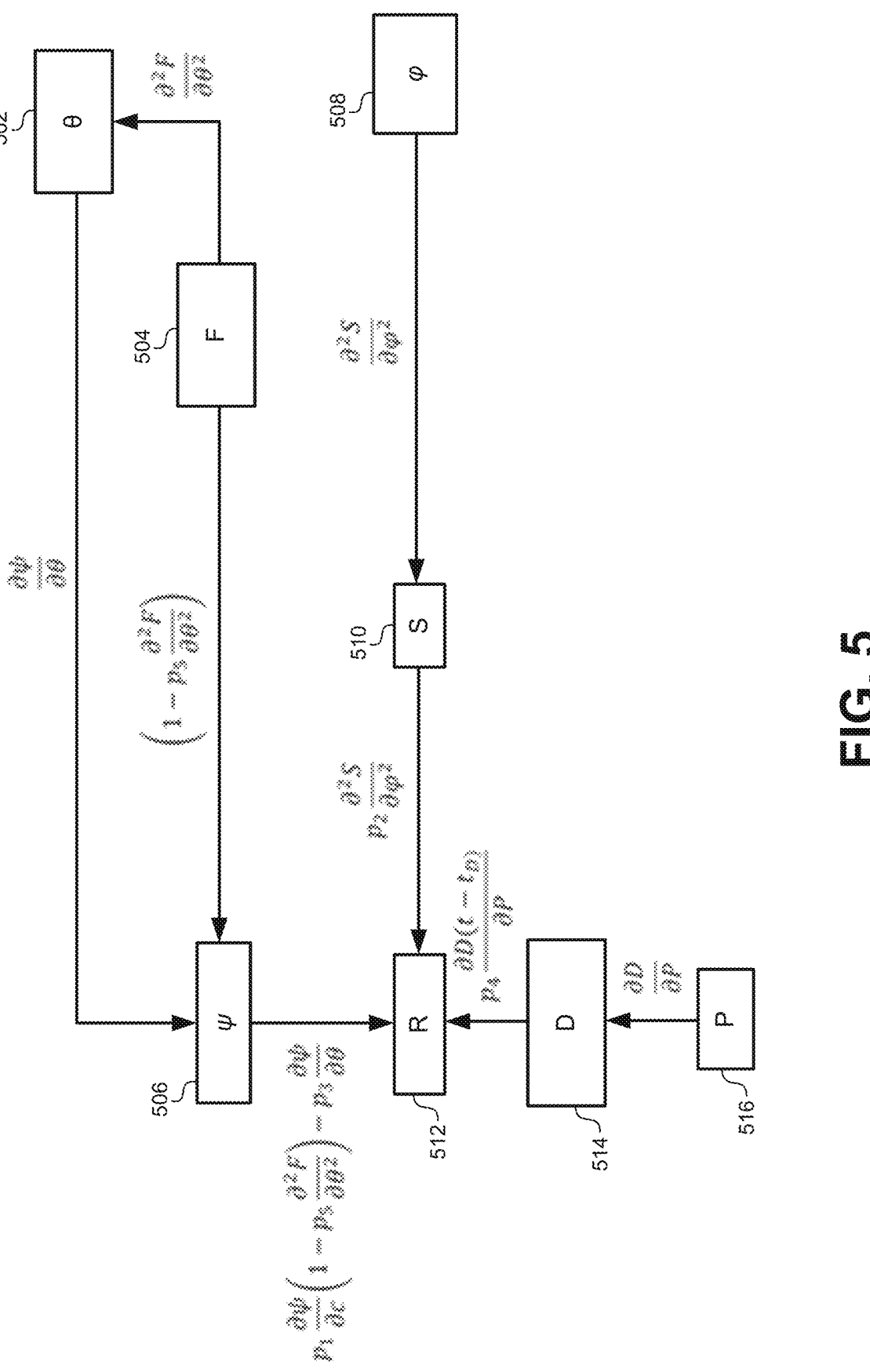
FIG. 5 illustrates how potential relationships between nodes may be represented as a set of partial delay differential equations, according to some embodiments.

FIG. 5 illustrates how potential relationships between nodes may be considered to be an approximation for representation as a set of partial delay differential equations, according to some embodiments. Only by way of example, some nodes may represent input values in an entity, and one of them may be considered an output for the purpose of modeling the relationships. Each of these input values may be stored as a time series in the nodes as described above. FIG. 5 illustrates partial derivative relationships between nodes that may exist within an entity to contribute causally to the node R. A partial delay differential equation representing a temporal causal model that embodies relationships in a very small part of the network for just one dependent variable may be expressed as:

$$\frac{\partial R}{\partial t} = p_1 \frac{\partial \psi}{\partial c}\left(1 - p_5 \frac{\partial^2 F}{\partial \theta^2}\right) + p_2 \frac{\partial^2 S}{\partial \varphi^2} - p_3 \frac{\partial \psi}{\partial \theta} + p_4 \frac{\partial D(t - t_D)}{\partial P}.$$

In this example, the symbols may represent the following time series variables: R=Revenue 512, P=Profit 516, S=Sales 510, F=Factory Downtime 504, D=Development Investment 514, c=Operational Costs, $\psi$=Production 506, $\varphi$=Market Demand 508, and $\theta$=Workforce Availability 502. In the equation above, the additional terms may be interpreted as follows.

$$\frac{\partial \psi}{\partial c}$$

may represent a rate of increase/decrease in production with a small change in operational cost.

$$\frac{\partial \psi}{\partial \theta}$$

may represent a rate of change in production with a small change in availability.

$$\frac{\partial D}{\partial P}$$

may represent a rate of rate of change in development with a small change in profit.

$$\frac{\partial^2 F}{\partial \theta^2}$$

may represent a rate of rate of change in factory downtime with a small change in workforce availability.

$$1 - p_5 \frac{\partial^2 F}{\partial \theta^2}$$

May represent a normalized rate of rate of change of uptime with respect to availability.

$$\frac{\partial^2 S}{\partial \varphi^2}$$

May represent a rate of rate of change of sales with respect to a change in production. The parameters $p_1$, $p_2$, $p_3$, $p_4$, $p_5$ may represent parameters that are fit from the actual data for each of these variables. $t_D$ may represent a time delay between the investment in product development and the effects appearing in production. The equivalent of multiple such equations, one for each variable or metric, may be embodied by the models described below, and the parameters or coefficients may be generated by the models.

Note that this equation and node variables in FIG. 5 are provided only by way of example and are not meant to be limiting. Again, the nodes may represent any type of time series data collected by an entity. However, the actual data set determines different types of relationships. The algorithms described herein are concerned with identifying any type of relationship that may be described using the equivalent of these types of partial delay differential equations.

Figure 6:
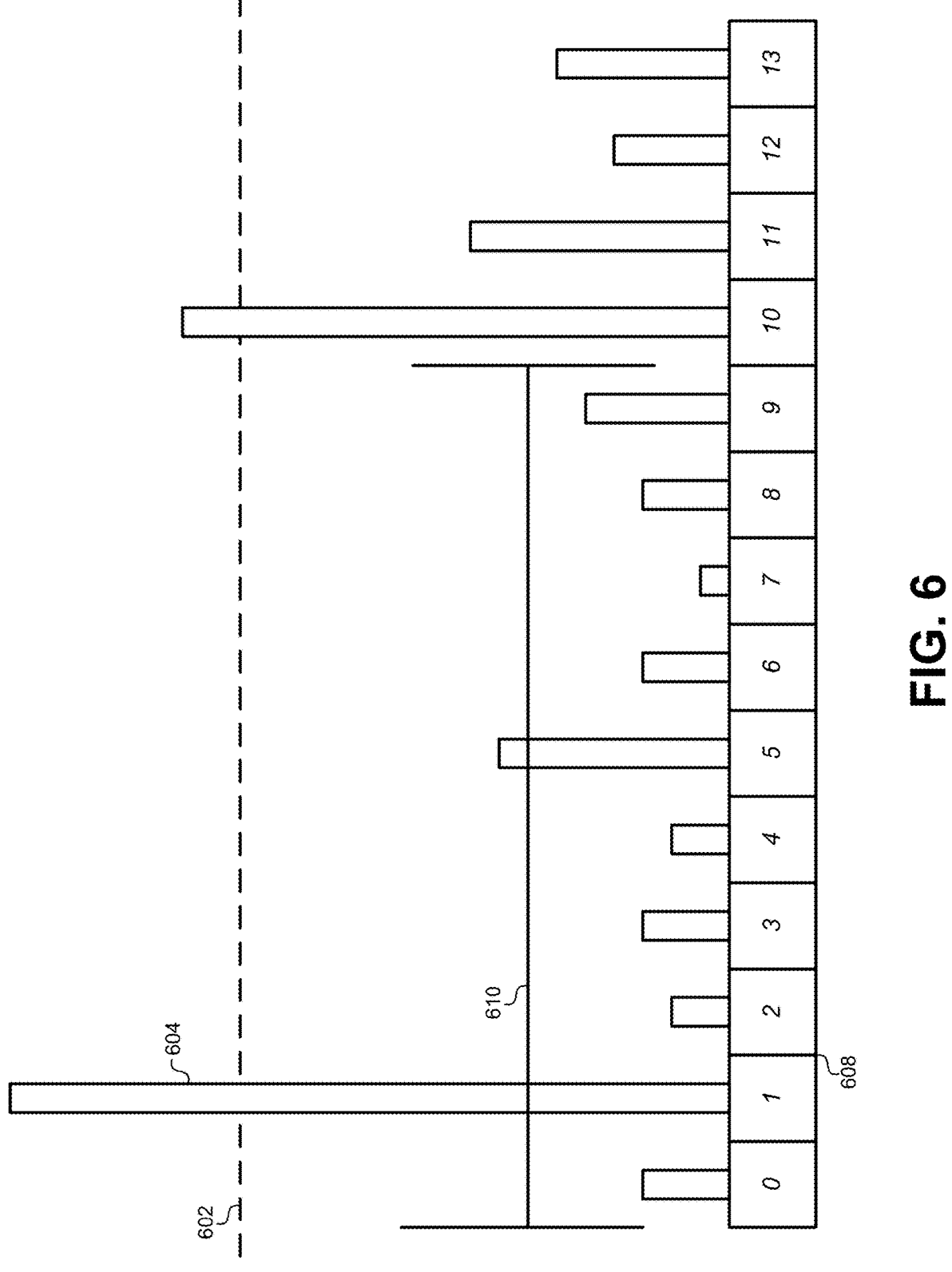
FIG. 6 illustrates one time series represented by a node that removes anomalies and normalizes the remaining values, according to some embodiments.

To begin processing the pool of nodes to identify relationships, some embodiments may first normalize each of the data sets. FIG. 6 illustrates one time series represented by a node that removes anomalies and normalizes the remaining values, according to some embodiments. A time series 608 may include a plurality of values having different magnitudes at each time. A threshold 602 may be established to remove outliers from the time series. These extreme point anomalies may be a limited by setting the threshold 602 a predetermined number of standard deviations away from the mean. For example, some embodiments may use a threshold 602 that is six sigma or nine sigma away (using domain specific requirements or based on factory requirements) from the mean of a surrounding subset of data points in the time series 608. These anomalies may represent real-world events that are themselves anomalies, such as a mass attrition event or a natural disaster that do not reflect a persistent influence of data generating process change within the data set.

Some embodiments may remove anomalies after accounting for them by setting the threshold 602 relative to a sliding window 610 of values within the time series 608. The sliding window may be a predetermined number of values within the time series 608. For example, some embodiments may use the 30 nearest neighbors in the window 610. Other embodiments may use the nearest 100 neighbors in the window 610. The position of the window 610 may begin at a most current data point in the time series 608 and extend backwards in time. The window 610 may be a sliding window that includes new values as they are received and removes old values as they become stale on a tail end of the window 610. In this example, a mean value or median value may be calculated using the data points in the window 610 to add a specified number of standard deviations to it to generate a threshold 602 that is six sigma above the calculated mean. Using this threshold 602, the algorithm may remove the value 604 from the time series 608. Some embodiments may remove the data point entirely, while other embodiments may replace it with the mean value or median value or most frequently occurring value instead.

In addition to removing anomalies, some embodiments may also normalize all of the input data in each of the time series using a self-normalized Z-score in terms of a number of standard deviations each data point is away from a median of the entire time series data set for each variable taken individually. This normalizes each of the time series with respect to themselves. Note that the anomaly values are removed as anomalies and the time series is self-normalized for purposes of applying this modeling algorithm only. The actual data in the time series 608 stored in the data warehouse typically do not need to be changed by this process. Only additional columns with this normalized data are included. After removing point anomalies and self-normalizing, each of the individual time series in the pool of nodes are ready to be processed.

At this stage, the algorithm may begin to identify nodes within the pool of nodes that may be of interest to the user for immediate visualization. Using the selection criteria described above, the pool of nodes may include a subset of the total number of nodes in the data structure 100 that may possibly be of interest. This step further narrows the list down to statistically determine whether a sufficient change has taken place within the time series within a recent time interval to be of interest to the user.

Figure 7:
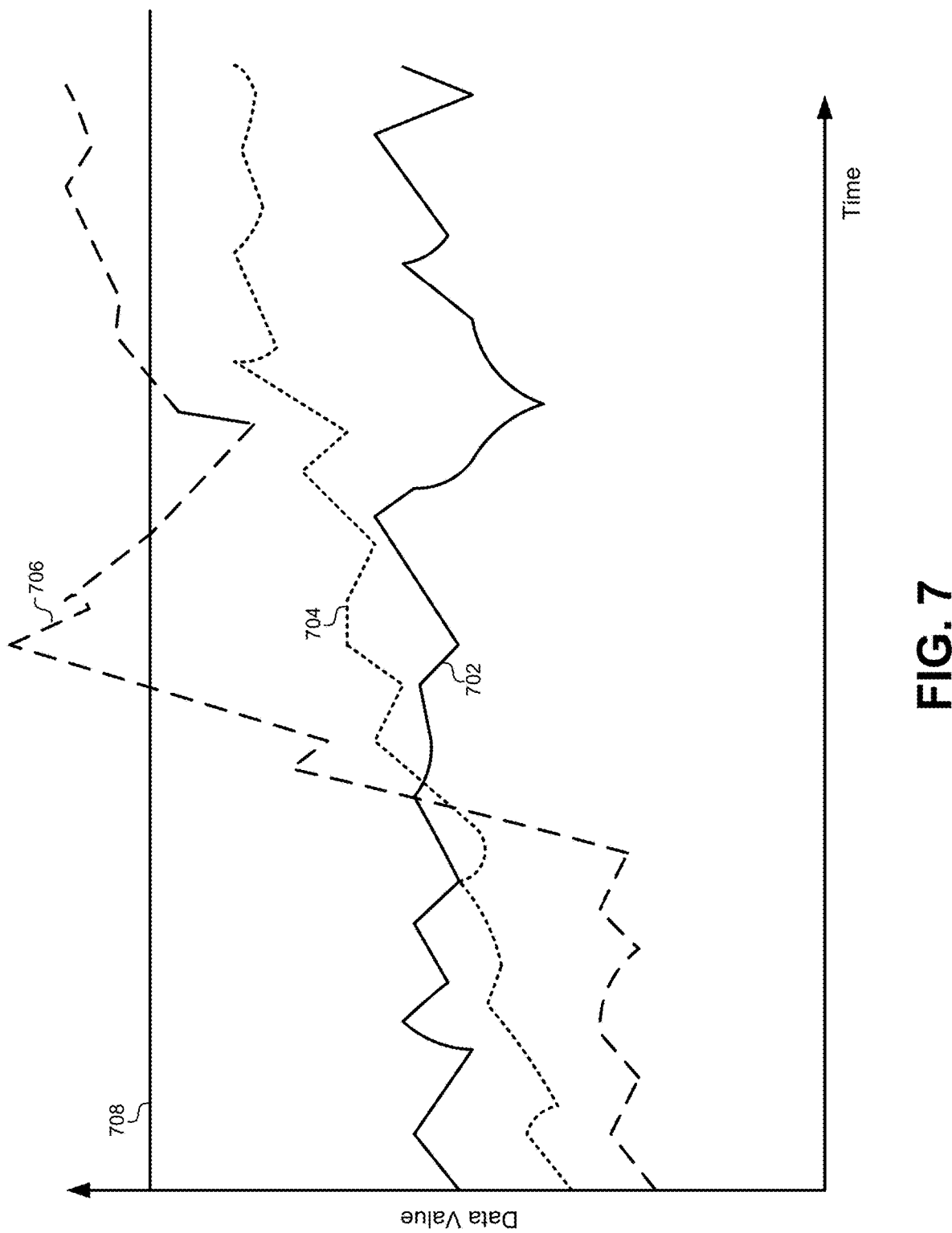
FIG. 7 illustrates a graph of values of three different time series, according to some embodiments.

FIG. 7 illustrates a graph 700 of values of three different time series, according to some embodiments. A first time series 702 may stay relatively stable during a time interval (e.g. during the last 90 days). A first test that may be carried out on this data is to determine whether the first time series 702 exhibits a statistically significant change across the time interval of interest to the user. For example, some embodiments may determine whether the cumulative changes exceed more than one standard deviation from the mean. As illustrated in FIG. 7, the cumulative changes of the first time series 702 do not exceed a standard deviation. Therefore, the node corresponding to the first time series 702 may be removed from the node pool. This indicates a node that, although of initial interest to a user, does not change significantly enough to continue to be of interest for presentation in a visualization.

A second time series 706 may also be analyzed using the same methodology. Specifically, it may be determined that the cumulative changes in the second time series 706 may exceed a threshold 708 determined by a number of standard deviations. Some embodiments may set the threshold 708 to be at a level of 1.0 standard deviation, 1.5 standard deviations, 2.0 standard deviations, and so forth. This may indicate that a statistically significant change has taken place within the data of that time series. This may indicate a change in the time series that may be of interest to the user for presentation in a visualization.

A third time series 704 may not exhibit a statistically significant change based on the threshold 708 alone. However, some embodiments may add a second criteria that instead analyzes individual changes between data points in the time series 704. For example, if more than a threshold number of the incremental changes occur in the same direction, the time series 704 may be considered to illustrate a gradual trend. This trend may indicate that something in the world has changed that drives the underlying data points consistently in a specific direction. In one embodiment, a threshold such as requiring that two thirds of the changes be in a same direction may be used.

After determining whether a deviation is statistically significant, some embodiments may also determine whether a deviation is practically significant. Practical significance may express how large the deviation is from normal distribution. For example, exceeding the threshold 708 may flag a data set for a further, more practical analysis. This further analysis may subject the time series 706 to an additional threshold. For example, if the time series 706 drifts more than two standard deviations, the extent of this deviation may be considered to be of practical significance. Some embodiments may also further calculate a cost due to the deviation. This cost may indicate a real-world impact on an organization, and this cost value may be compared to a cost threshold to further determine practical significance. Some embodiments may also determine practical significance by determining whether the deviation has occurred more than a threshold number of times in the past or more than for other variables. For example, if the deviation for the time series 706 occurs only once, this may indicate practical insignificance, whereas if the deviation for the time series 706 has occurred multiple times within a previous time interval, this may indicate practical significance. Alternatively, if a certain deviation has never occurred in the past, and it occurs multiple times, that may also indicate a change in the process worthy of examination by the end user.

At this stage, for the purpose of visualization, the node pool of data sets may be pared down to include data sets exhibiting a change that is both statistically significant and practically significant as described above. These time series are presented to the user with time series plots, showing thresholds and distributions. The data used for visualization here is the original unnormalized data without removing extreme anomalies.

Figure 8:
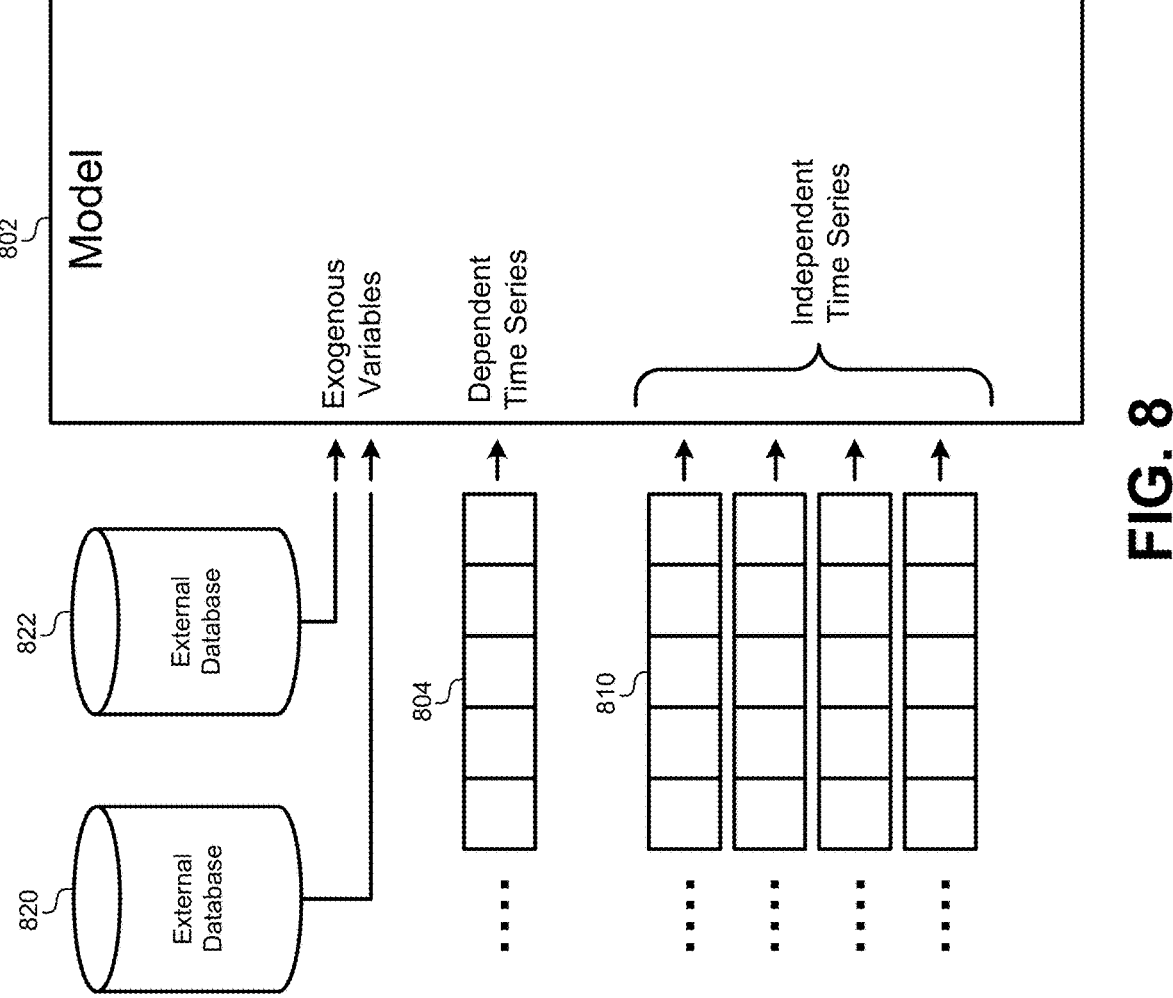
FIG. 8 illustrates a process for generating a model for each of the time series in the node pool, according to some embodiments.

The algorithm may now proceed to identifying relationships between the nodes in the selected and cleaned pool of nodes. FIG. 8 illustrates a process for generating a model 802 for each of the time series in the node pool, according to some embodiments. The model 802 may be generated for a single one of the time series 804 that will be considered a dependent variable. Each of the remaining time series 804 in the node pool may be considered independent variables by the model 802. This process described below may execute for each of the time series in the node pool to generate a trained model for each. The models may be trained by fitting parameters to a weighted combination of each of the independent variables received by the model 802.

First, the model 802 may function autoregressively. To function in this manner, the model 802 may predict future values of the time series 804 based at least in part on previous values of the time series 804. This type of model 802 tends to be well-suited for real-world time series data, as previous values for many data points rely on previous data points. At this step, the modeling process may also identify seasonality and trends in each of the variables.

To establish a causal relationship aside from the previous values of the same time series 804, some embodiments may use a model 802 that also identifies other time series 810 that improve this prediction. The model 802 may function under the basic principle that if the time series 804 is better predicted by previous values of the time series 804 and previous values of a second time series than a prediction of the time series 804 based on the previous values of the time series 804 alone, then there is a causal relationship between the second time series and the time series 804. This is known as the Granger causality test. Stated another way, if a prediction model 802 for the time series 804 is more accurate by including the second time series as an input, then the second time series may have a causal relationship with the time series 804.

The model 802 may also function by integrating time series 810 in order to identify integrated causalities. For example, acceleration data may not necessarily be correlated with distance data or velocity data when viewed as a single time series. However, when integrating acceleration data, the time series will now be heavily correlated with velocity data. A second integration may cause the acceleration time series to also be heavily correlated with distance data. Many real-world time series show strong correlations with other time series when one or more integrations take place in the model 802. A number of integrations performed may reveal dependencies that extend up the hierarchy in FIG. 1 multiple levels.

To better identify similarities between time series, some embodiments of the model 802 may also impose a moving average on the time series. A moving average may smooth each of the time series 804, 810 under consideration to remove small variations, may prevent noise from accumulating, and may instead allow the model to identify causal relationships due to movement trends that are exposed after this type of low-pass filter is applied to remove as much noise as possible.

Some embodiments may also incorporate exogenous variables that are outside of the data structure 100. The time series represented by these exogenous variables may be retrieved from outside data sources 820, 822. Analyzing of the effect of exogenous variables may attempt to provide an explanation for time series changes within an organization due to variables that are not tracked in the time series nodes of the data structure 100. Instead, these changes in time series may be explained by larger forces outside of the organization (e.g., macroeconomic indicators, an unemployment rate, census data, climate/weather data, CPI, GDP, etc.).

Combining these model features, the model 802 may be generated by calculating how a weighted sum of previous states of independent time series 810, some of which may be integrated one, two, or more orders of integration over time, determines a current state of the dependent time series 804. In this specific example, the model 802 may operate by calculating how a weighted sum of previous states of other time series 810 and any of the exogenous variables affect the time series 804 under consideration.

Figure 9:
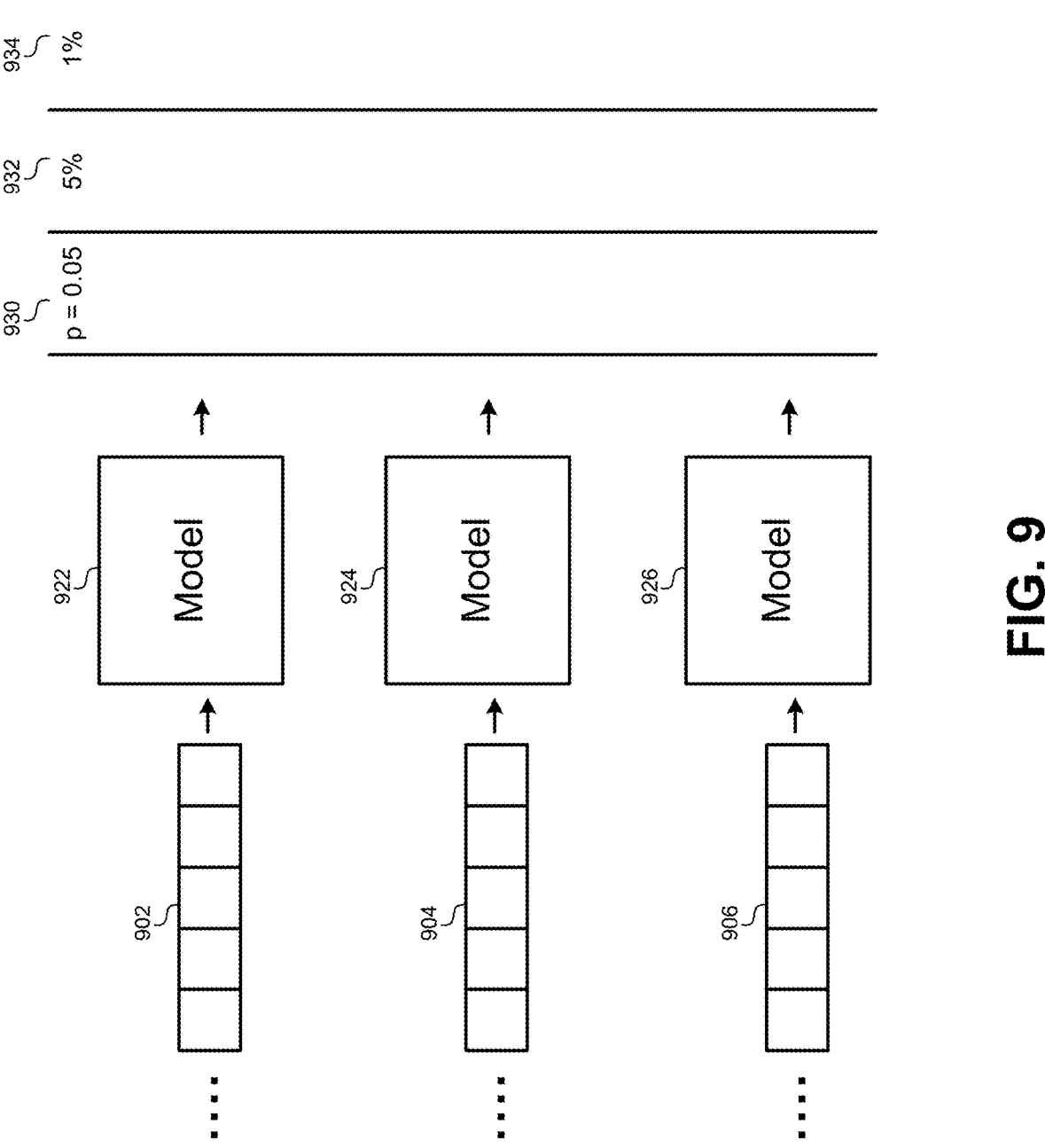
FIG. 9 illustrates how a model may be generated for each of the time series under consideration, according to some embodiments.

FIG. 9 illustrates how a model may be generated for each of the time series under consideration, according to some embodiments. Using the process described above in FIG. 8, a model may be generated for each individual time series. For example, time series 902 may be associated with a model 922, time series 904 may be associated with its own model 924, time series 906 may be associated with its own model 926, and so forth. Note that only three models 922, 924, 926 are illustrated in FIG. 9 as examples. It will be understood that at least as many additional time series and model pairs may be present as there are time series, and those are not expressly illustrated here.

Instead of generating a model for every time series, some embodiments may first eliminate any collinear time series from consideration. Collinear time series may follow very similar trajectories (i.e., may have a similar shape, movement, and distributional characteristics). If two time series are considered collinear within a threshold amount (e.g. greater than 95% the same with respect to specific statistical criteria such as correlation or Kullback-Leibler like divergence measures), then only one of these two time series needs to be considered as a dependent variable for its own model. These collinear time series may also be eliminated as independent variables for other time series models. One of the collinear time series may be maintained while the others are eliminated just for the purpose of modeling for a given dependent variable. The choice as to which time series may be maintained may be based on domain knowledge of the user. Certain variables in a collinear time series pair or group may be more fundamental to the process, and are thus retained, while the rest in the pair or group are considered derived.

As described above, one of the parameters that may be set for the models 922, 924, 926 is the number integrations to be performed for each of the independent time series inputs. Although any number of integrations may be used, it has been found in these embodiments that a maximum of three levels of integration may produce stable models. Above this, the causal relationships detections tend to become sensitive to deterministic chaotic behavior of the underlying equations, and less likely to indicate a real-world relationship. Therefore, some embodiments may limit the number of integrations performed to three or fewer.

At this stage, the models may indicate which of the independent inputs have causal relationships with the dependent input using the Granger causality test. For example, model 922 may indicate which of the other time series have causal relationships with time series 902. In practice many time series will have some relationship with other time series. Therefore, some embodiments may apply additional filters or adjust additional parameters in the models 922, 924, 926.

One filter 930 that may be applied to the outputs of the models may include a statistical significance of the causal relationship. This statistical significance may be represented by the p parameter of the model. In some embodiments, it has been discovered that an optimal cutoff point is approximately $p=0.05$ or lower. The p-value gives a measure of the likelihood that in a scenario where there is no relationship between the variables, how likely is it that observed data will show the relationship, or the likelihood that those correlations or statistical relationships or measures occur at the level that they do just by pure chance or random noise, and not due to some systematic real world connection. If the probability that the null hypothesis is true is less than 0.05, then in the scenario where the null hypothesis that the relationship does not exist is true, there is only a 5% chance of observing the observed data, and therefore, the null hypothesis should be rejected if we accept this 5% level of significance. The null hypothesis in this case is that there is no relationship found between variables. The lower the p-value, the more surprising the evidence is, the more ridiculous our null hypothesis becomes. Again, real-world examples may have hundreds of thousands of data points. This filter allows the system to present the most important causal relationships to a user rather than all possible relationships that may be found by the models.

Additionally, as the number of data points in each time series grows smaller, the p value may be adjusted. The value for p may go one order of magnitude lower for each order of magnitude with which the number of data points is reduced. For example, if a time series has a few thousand data points, the system may instead use $p=0.005$. In contrast, if the system has only a few hundred data points, the system may instead use $p=0.0005$, and under 100 data points may use $p=0.00005$. If the system has fewer than 30 data points, then the system might use $p=0.00001$. The value for p used for significance threshold may also be adjustable by expert users depending on domain-specific knowledge, but in general, the number of data points may depend on the length of the time window that the user chooses, along with the amount of data accumulated over time in the data warehouse storing the time series.

The p value filter 930 may be used to indicate statistical significance. An additional filter 932 may be applied to also require a level of practical significance for each causal relationship identified by a model. For all independent variables that pass the statistical significance filter above, a practical significance filter 932 may be applied using the size of the contribution by the independent variable to affect a change in the dependent variable. Especially in very large data sets, even small changes may be found to be statistically significant. However, the embodiments described herein are mainly concerned with drivers of large changes in a time series. Therefore, some embodiments may use one or more threshold levels as a cutoff for practical significance.

For example, the filter 932 may be tailored for presentation to the user. This may serve to eliminate data from specific variables from presentation to the user. In some embodiments, each of the independent variables represented by other time series may require a minimum size of contribution by that specific independent variable to a change in the dependent variable, for meriting presentation to the end user. Although any value may be used as a threshold, a value of 5% or more of a contribution to changes in the dependent variable based on the coefficient of the independent variable has been used to determine if that particular independent variable will be shown in a visualization displayed to the user. While this filter 932 may affect the presentation of the user, eliminated independent variables in this step are not necessarily eliminated from the model. Instead, these variables are only excluded from the display of a result set to the user, while they are able to still continue affecting the model.

In contrast, another filter 934 may use a much lower or stricter threshold to remove independent variables from the model altogether. For all independent variables that passed the statistical significance filter 930 but failed the practical significance filter 932, the system may perform an additional filter 934 at a smaller level of contribution to determine whether the variable should be kept in the model at all. For example, a minimum of 1% contribution to changes in the dependent variable may be required in order to keep the independent variable in the model. This filter may be important for further optimizing the performance of the algorithm, and implementing the scientific principle of Occam's razor. Eliminating independent variables allows these variables to be removed from the in-memory storage, which reduces memory requirements and increases the speed with which the collective set of time series may be processed. The filter 934 also has the effect of removing unnecessary noise from the model to improve performance with respect to memory and CPU usage. Note that some embodiments may allow these thresholds for filter 932 and filter 934 to be adjusted by administrative users for different implementations.

Figure 10:
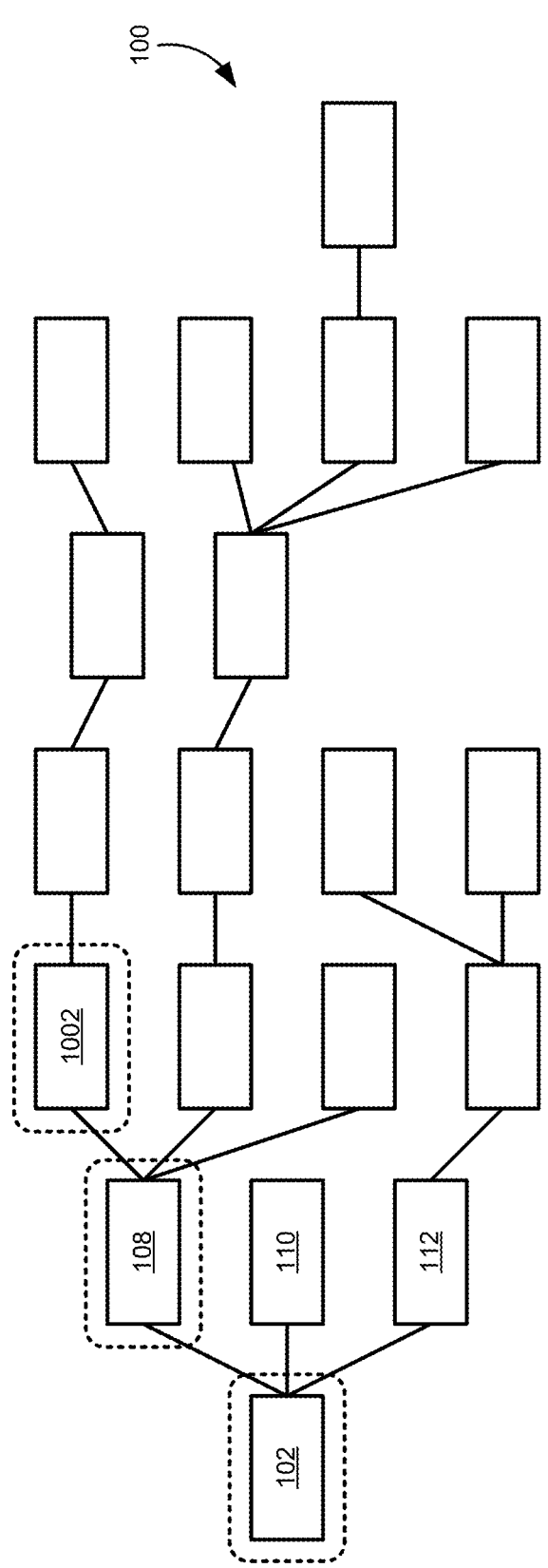
FIG. 10 illustrates how this algorithm may be executed recursively for each node in the hierarchy to generate a model and identify a final set of causal relationships for each node, according to some embodiments.

FIG. 10 illustrates how this algorithm may be executed recursively for each node in the hierarchy to generate a model and identify a final set of causal relationships for each node, according to some embodiments. FIG. 10 illustrates a subset of the data structure 100 from FIG. 1. Recall that not all of the nodes that are part of the data structure 100 have been included in this analysis. For each node included in the analysis, the process described above in FIGS. 8-9 may be executed recursively in a manner that is ordered by the hierarchy of the data structure 100. This recursive execution may be performed in a breadth-first manner rather than a depth-first manner.

In this example, the algorithm may begin with the time series of node 102. This time series may be provided to a model along with the time series from each of the other nodes under consideration. The model may be fit to identify which of those nodes has a causal relationship with node 102 that is of both practical and statistical significance as described above. The inputs may be funneled such that some time series may be removed from the model as described above.

After the causal relationships are identified for node 102, each of the nodes in the second level (e.g. node 108, node 110, node 112) that are part of the analysis group of nodes may be processed. This algorithm may traverse recursively through each of the different levels. In order to avoid cyclical recursion, the algorithm may stop this recursion at each node whenever a significant causal relationship is discovered that already exists in the set of relationships. The algorithm may then carry on to the next node in the breadth-first search.

Performing a breadth-first search as opposed to a depth-first search may be important for a number of reasons. First, traversing the data structure 100 from top to bottom allows circular dependencies to be detected and stop the recursion. Second, performing a depth-first search is computationally riskier compared to a breadth-first search, as it can lead to a traversal of unlikely tree branches, without first finding the most important relationships that affect the top level variables. Finally, it has been discovered that a depth-first search can often times identify long distance anecdotal relationships in the graph. Therefore, the breadth-first search is more efficient for this problem.

Figure 11:
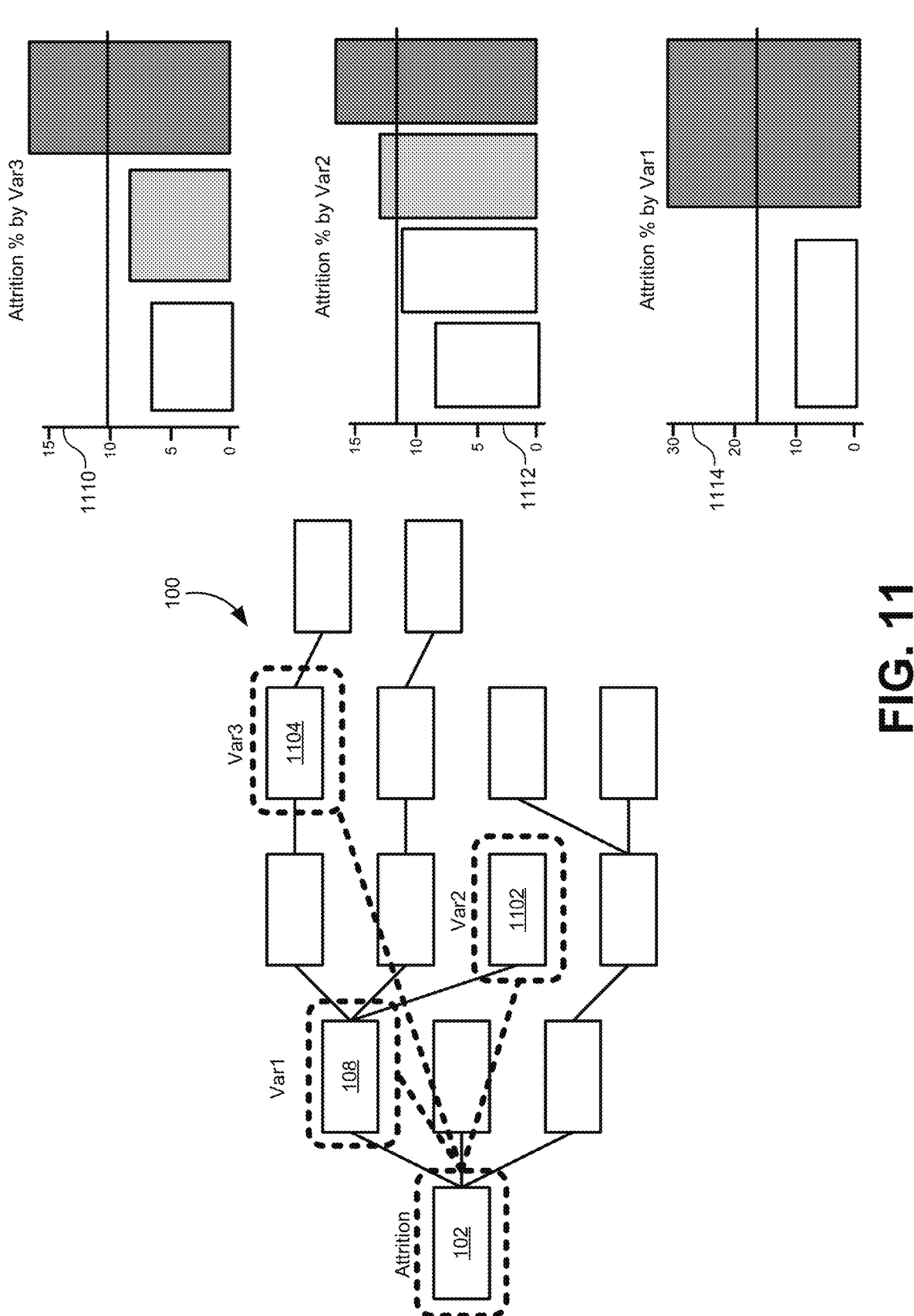
FIG. 11 illustrates how results of the algorithm described above can be displayed in a usable fashion for a user, according to some embodiments.

FIG. 11 illustrates how results of the algorithm described above can be displayed in a usable fashion for a user, according to some embodiments. After having identified the most relevant causal relationships for a node 102, all of these causal relationships may be compiled together into a list of other nodes in the data structure 100 that drive the node 102. In the simplified example of FIG. 11, the three other nodes may be identified as driver nodes that have a causal relationship with node 102. These driver nodes may include node 108, node 1102, and node 1104.

After identifying the list of driver nodes, the driver nodes may be ranked according to their statistical contribution to the node 102. In some embodiments, the model may generate a weighted combination of independent variable inputs. Each of those variable inputs may have a coefficient assigned that is fitted by the modeling process. The magnitude of the coefficient may directly indicate a contribution to a variation in the node 102 as all the variables are self-normalized. Each of the driver nodes may be ordered based on the relative size or magnitude of their coefficient in the model for node 102.

Various methods may be used to display this information to the user in a usable fashion. In the example of FIG. 11, a bar graph for each node is displayed in the order determined above through the magnitude of the coefficients. For example, node 1104 (e.g. Var3) may have the largest coefficient and may therefore contribute the most to changes in the node 102. Bar graph 1110 may be displayed at the top of a result list. Each of the bars in the bar graph 1110 illustrate a value assigned to node 1104 in the time series. This allows the user to see which values in the time series of node 1104 have the most effect on the time series in node 102. Similarly, bar graph 1112 may be associated with node 1102, and bar graph 1114 may be associated with node 108 in that order.

The result of the process above is a determination as to which time series in the data structure 100 are the drivers of change in a particular node. This process automatically identifies those time series and ranks them in order of importance. This ranking may be used to display the results in order of importance to the user. This represents a technical improvement in the way that data is generated and displayed. This type of meaningful ordering of the data by strength of relationships was not previously available, and could not be automatically isolated by users from the overwhelming amount of data that may be present in the data structure 100. As stated above, the data structure 100 may include hundreds of thousands of time series, and the sheer number of weak correlative relationships would be so overwhelming as to be useless to a user looking to make decisions based on insights from the data. The embodiments described above not only efficiently process all of these time series, but they also generate a display of information that is much more useful and that was not previously available.

Figure 12:
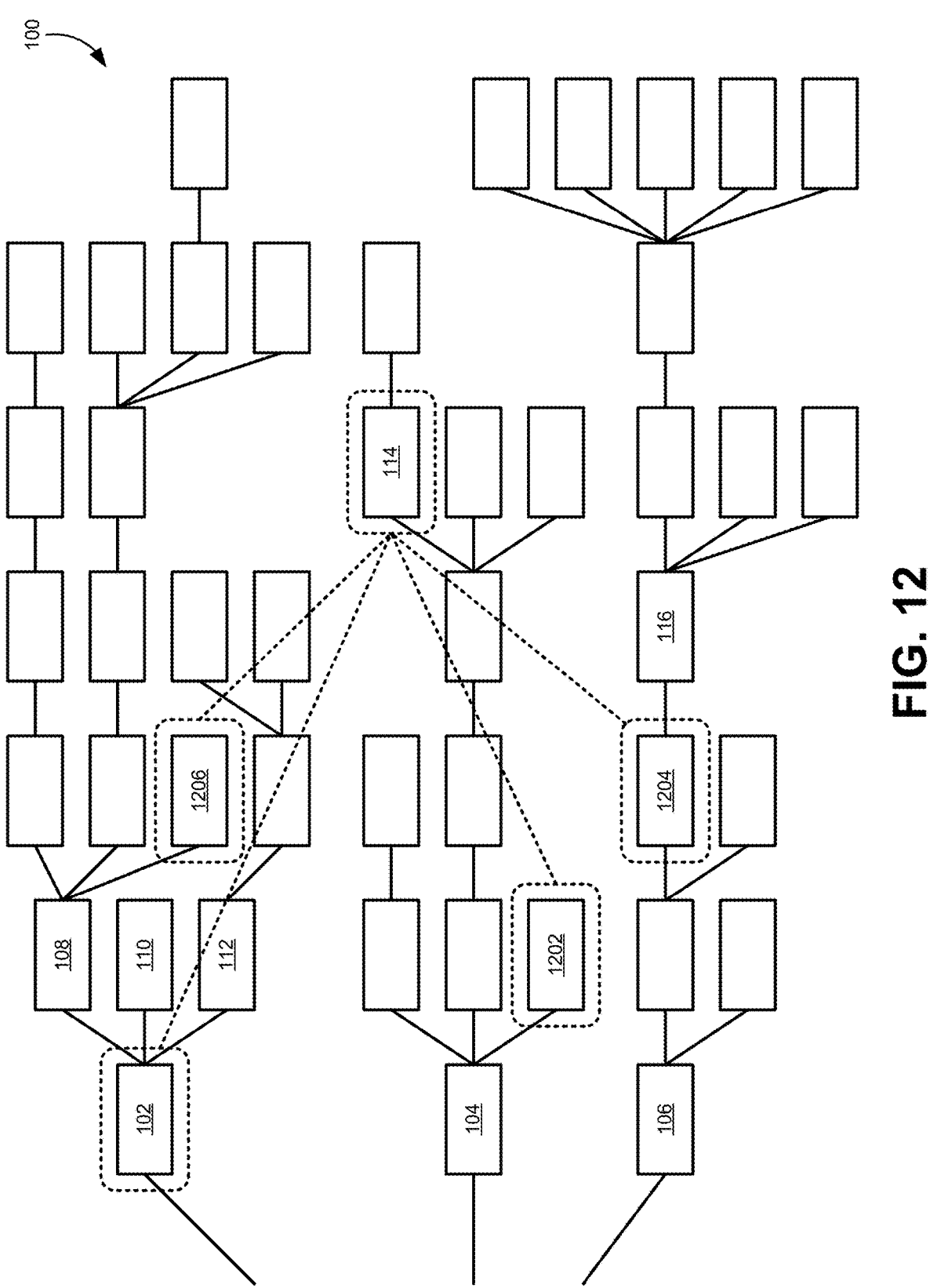
FIG. 12 illustrates how identifying driver nodes in the data structure may be used to identify master regulator nodes, according to some embodiments.

FIG. 12 illustrates how identifying driver nodes in the data structure 100 may be used to identify master regulator nodes, according to some embodiments. After a list of drivers have been identified for each of the nodes in the analysis above, a second search may be performed among these nodes to identify nodes that are drivers for multiple higher level nodes. These reverse connections may be aggregated for each node, and nodes that have the most influence within the data structure 100 may be identified. These influential nodes may be referred to as master regulator nodes, as they serve to regulate many different time series within the data structure 100.

In some embodiments, the algorithm may search for single nodes which are second, third, fourth, etc. level nodes in the data structure 100 which are also drivers of multiple other nodes. The algorithm may begin by identifying nodes that are drivers for two or more nodes and use tighter bounds for statistical and practical significance as more are found. These master regulators may then be identified. In a path prescription model, these master regulators may serve as both enablers of making large-scale changes within various time series in the data structure 100, as well as potential roadblocks for otherwise making well-directed change in these time series.

After creating an acyclic graph of relationships between nodes, the algorithm may begin by identifying lower-level nodes that directly explain more than a 5% variability in at least two higher level nodes. Similar to how filters for practical significance and statistical significance were used above, a threshold may be applied to identify nodes that have both a practically and statistically significant influence on multiple nodes. To classify these nodes as master regulator nodes, the influence on practical changes in higher-level nodes may be raised to a higher threshold, such as 10%.

In the example of FIG. 12, node 114 may be identified as producing at least a 5% effect on changes found in node 102, node 1202, node 1204, and node 1206. Because more than two of these significant relationships exist for node 114, node 114 may be labeled as a master regulator node in the data structure 100. Also note that exogenous variables may be identified as master regulator nodes outside of the data structure 100, although they are not shown explicitly in FIG. 12. These exogenous variables would be identified by the models described above in the same manner as the time series nodes have been identified.

Figure 13:
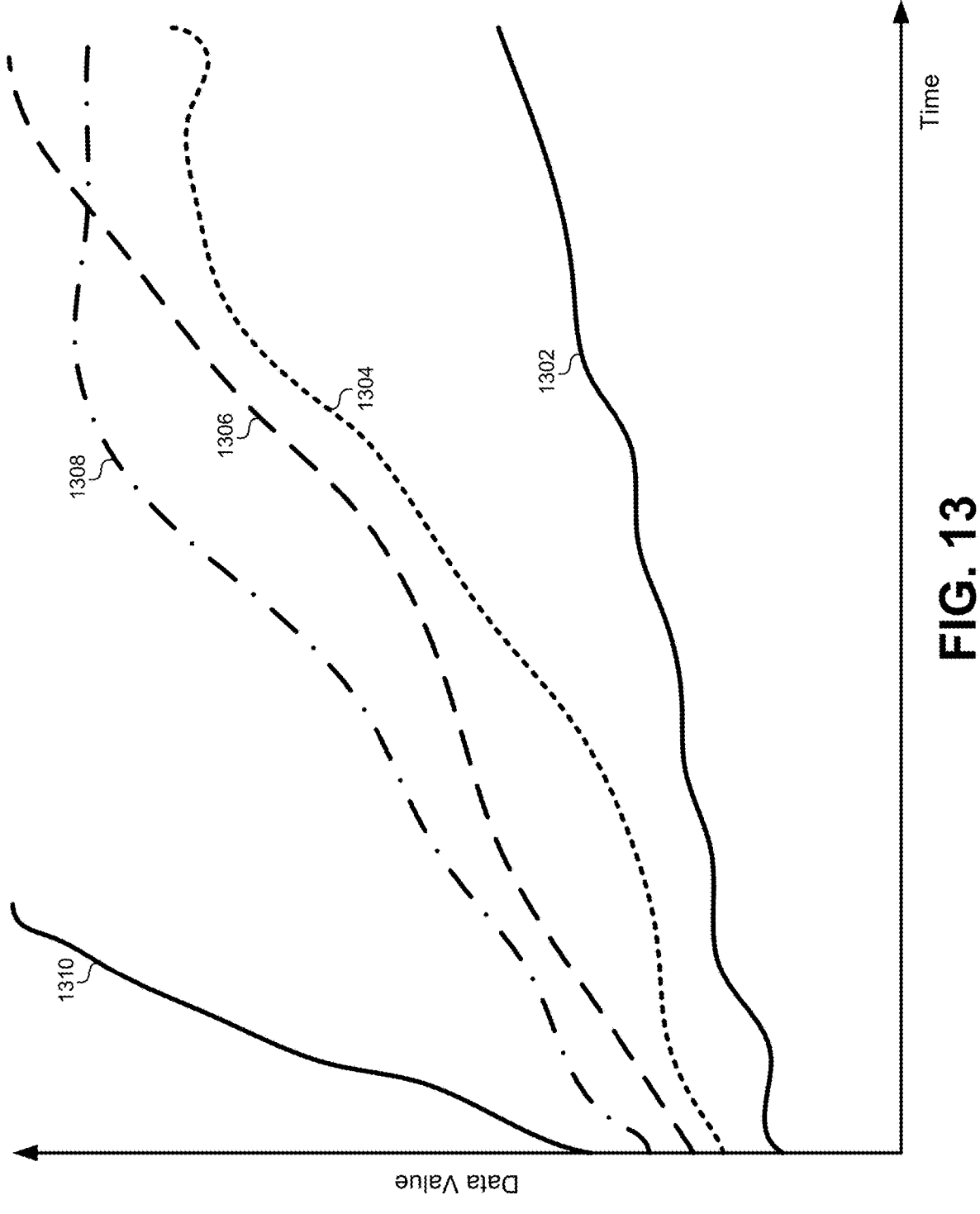
FIG. 13 illustrates how a simulation of using the models for each time series may be used to illustrate the effects of a master regulator node, according to some embodiments.

FIG. 13 illustrates how a simulation of using the models for each time series may be used to illustrate the effects of a master regulator node, according to some embodiments. Once the master regulator nodes are identified, simulations may be used to visualize the effect that those nodes may have on other nodes in the data structure 100. Specifically, new future predictions in the time series may be generated for a master regulator node and added to the time series. These new predictions in the time series for the master regulator nodes can then be input to models created above to generate output predictions for each of the higher-level nodes influenced by the master regulator node.

In some cases, a different model may be generated and used once the master regulator nodes are identified. Since there will be relatively few of these in the data structure 100, these master regulator nodes may have new models generated for them that may generate more precise results. For example, a new model may be generated using VARFIMA or LSTM models that are more computationally expensive, yet which are more computationally feasible at this stage.

The new data input provided to the model for the master regulator node may represent proposed changes to calculate what might happen in what-if scenarios in a real-world system or structure that is represented by the time series. For example, the time series may represent a real-world type of working condition for employer. This working condition may strongly influence a plurality of higher-level time series metrics, representing metrics such as retention, productivity, satisfaction, and so forth. Test data may be generated that changes this working condition as represented by the time series. This time series may be provided as an input to the models for each of the higher-level nodes that are affected by this master regulator node. These models may then generate predicted outputs based on the new inputs for the master regulator node.

In FIG. 13, new input data may be provided for the master regulator node as illustrated by curve 1302. For example, this data may represent an increase or improvement in a particular working condition. Each of the nodes that depend on the master regulator node (e.g., node 102, node 1202, node 1204, node 1206) may have their outputs predicted by their respective models, and the data may be presented next to the data for the master regulator node. For example, the simulated results of node 102, node 1202, node 1204, node 1206 may be displayed as curves 1304, 1306, 1308, 1310, respectively, alongside curve 1302 for node 114.

The simulations may also be governed using real-world constraints as boundary conditions imposed on the values that may be provided in the different scenarios being simulated. For example, simulations may generate an optimal value for the master regulator node that would not be feasible in real-world scenarios. Although mathematically correct, the real-world implementation of the resulting time series may not work. Therefore, some boundaries on the simulated values for the master regulator node may be imposed to maintain real-world results that are feasible. Providing such boundaries also reduces the search space for the optimization.

These lower-level master regulator nodes may be displayed with the data for the higher-level nodes that they strongly influence. This may demonstrate the systemic impact of changes in these lower-level nodes. These may be used to generate multiple "what if" predictions by simulating each model out a few points at a time to show an upward cascade of effects driven by these master regulator nodes. In some embodiments, a path predictor algorithm may be used to identify a shortest path to a desired outcome in one of the nodes that is influenced by the master regulator node. An optimal value may be identified for the master regulator node using the simulations described above. This optimal value may then be used as a starting point in a path predictor algorithm to find the shortest path to recovery. This represents a technical improvement, as previous attempts to use such path predictor algorithms did not have an optimal starting point for their algorithm. This allows the range of values for the master regulators in the path predictor algorithm to remain stable while varying other values to find an optimal path, rather than trying to change all variables at once which is not realistic for a real world scenario of trying to control an enterprise system.

Figure 14:
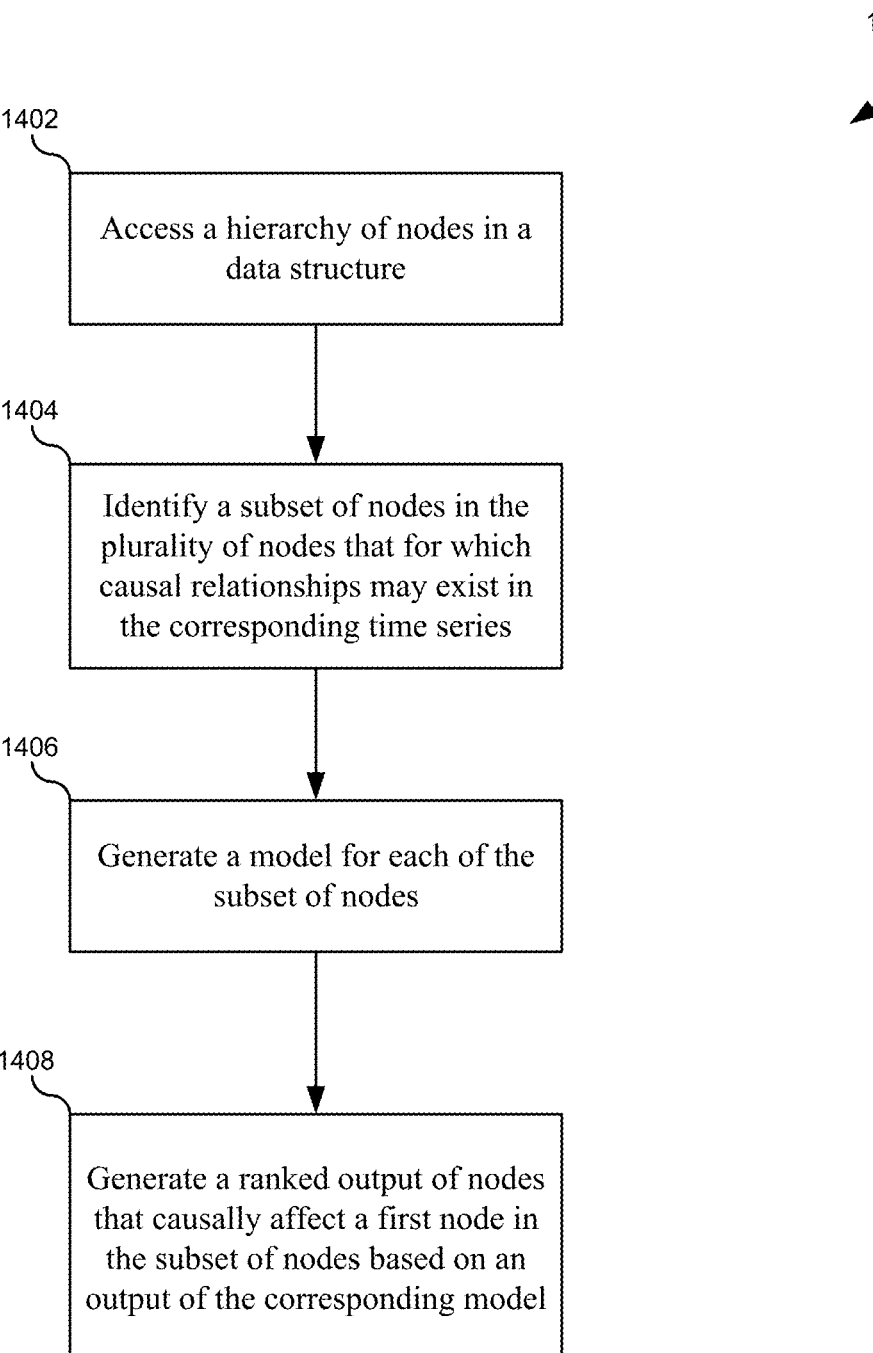
FIG. 14 illustrates a flowchart of a method for identifying causal relationships in a plurality of nodes, according to some embodiments.

FIG. 14 illustrates a flowchart of a method for identifying causal relationships in a plurality of nodes, according to some embodiments. The method may include accessing a hierarchy of nodes in a data structure (1402). Each node in the plurality of nodes may include a time series of data as described above in FIG. 1.

The method may also include identifying a subset of nodes in the plurality of nodes for which causal relationships may exist in the corresponding time series (1404). This subset may be identified as described above in FIGS. 2-7. Each of the steps in relation to these figures may be performed to identify a subset of nodes and otherwise process those nodes to be ready for subsequent steps in this method. This may include normalization, filtering, using user roles or machine learning to identify patterns of nodes, and so forth.

The method may additionally include generating a model for each of the subset of nodes (1406). The model may receive the subset of nodes and may generate coefficients for each of the subset of nodes indicating how strongly each of the subset of nodes causally affects a first node in the subset of nodes. This step may be carried out as described above in relation to FIGS. 8-11.

The method may further include generating a ranked output of nodes that causally affect a first node in the subset of nodes based on an output of the corresponding model (1408). This step may be carried out as described above and elation to FIGS. 10-13.

It should be appreciated that the specific steps illustrated in FIG. 14 provide particular methods of identifying causal relationships in a plurality of nodes according to various embodiments. Other sequences of steps may also be performed according to alternative embodiments. For example, alternative embodiments may perform the steps outlined above in a different order. Moreover, the individual steps illustrated in FIG. 14 may include multiple sub-steps that may be performed in various sequences as appropriate to the individual step. Furthermore, additional steps may be added or removed depending on the particular applications. Many variations, modifications, and alternatives also fall within the scope of this disclosure.

Simplifying the Casual Model for Efficient Simulation

Turning back briefly to FIG. 1, recall that the overall data structure 100 may be used to store a plurality of nodes each representing individual time series. Also recall from FIG. 5 that the potential relationships between nodes and/or time series may be represented as a set of partial delay differential equations. For example, a partial delay differential equation may represent a temporal causal model that embodies how delays between different time series may have a causal effect on a particular node. However, the model using partial delay differential equations illustrated in FIG. 5 represents only a small part of the network for a single dependent variable. Although partial delay differential equations could be written for every relationship in the data structure 100, this would be computationally impractical—and in most cases impossible—to solve or simulate. Therefore, a practical simulation of relationships to predict future values in the time series within commonly available computational resources of CPUs, GPUs and RAM memory space was not possible prior to this disclosure.

However, using the process described above, the relationships identified as causal relationships from the driver nodes may be used to simplify the partial delay differential equation model to the point that it can be simulated and used to generate future results in a practical amount of time. Specifically, partial delay differential equations can be used to simulate results for a particular node using only the driver nodes that most heavily influence the particular node. This may limit many of the relationships between nodes that otherwise complicate the simulation equations. Instead of simulating every relationship, the process described above identifies the relationships that are most important, as the driver nodes contribute most significantly to the changes in their parent node.

Figure 15:
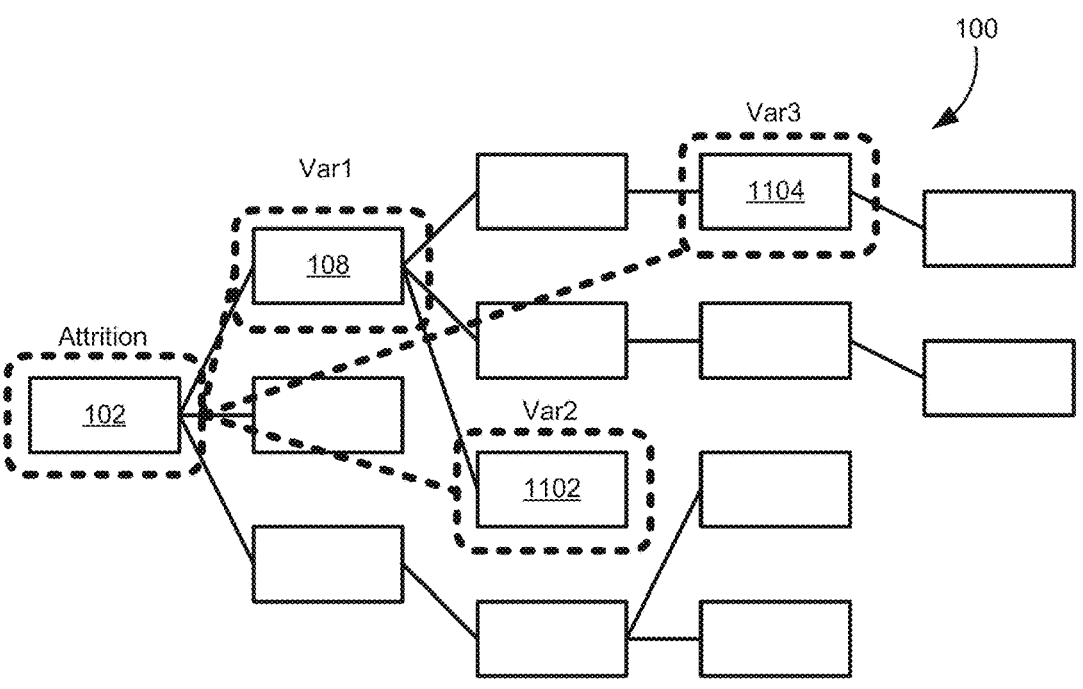
FIG. 15 illustrates how the complete data structure of all nodes can be reduced to a linear model of most significant driver nodes, according to some embodiments.
Figure 15:
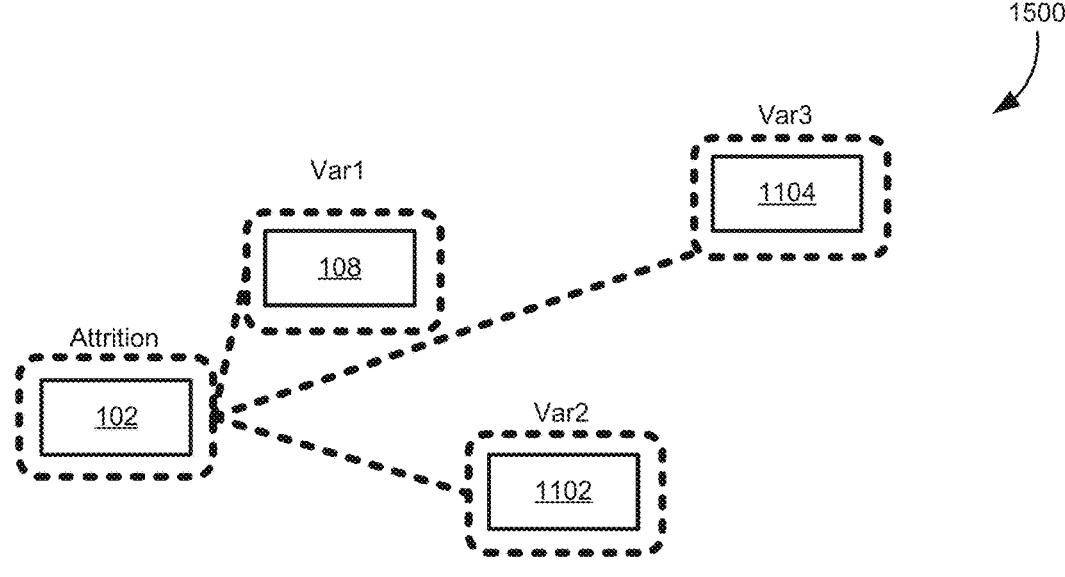

FIG. 15 illustrates how the complete data structure 100 of all nodes can be reduced to a linear model of most significant driver nodes, according to some embodiments. At the conclusion of the process described above, one or more nodes in the data structure 100 may have a set of driver nodes identified. For example, node 102 may a set of driver nodes 108, 1102, and 1104 identified. Although many other potential relationships between node 102 and other nodes in the data structure 100 may exist, the impact of these relationships may be relatively small compared to the causal relationship between the driver nodes 108, 1102, 1104 and the node 102. Therefore, some embodiments may reduce the relationships in the data structure 100 to only include driver nodes that contribute to changes in the node 102 more than a threshold amount. Thus, some embodiments may apply another thresholding operation to the driver nodes 108, 1102, 1104 to select only the most significant contributing driver nodes.

This may generate a linear model of relationships between nodes, or in some computationally expensive embodiments, non-linear models of the relationships, where such relationships are used from prior domain knowledge or established from prior data analysis. Note that the reduced data structure 1500 in FIG. 15 shows only the resulting simplified network for node 102 for the sake of clarity. Generally, embodiments will include many additional nodes that have simplified their set of driver nodes to a most significant set of driver nodes using the process described above. Thus, the embodiment of FIG. 15 may include additional nodes in the network that are not explicitly shown. At this stage, the model is causal (i.e., it identifies a cause-and-effect relationship between nodes), but the model is not dynamical (i.e., it does not represent how the effect of these relationships change the node values over time). Although the causal linear model may perform simple forecasting (e.g., less than approximately 5-10 time steps into the future), complex forecasting that captures and shows the evolution of the system over time is not possible with the linear model. For example, the linear model can provide linear proportional and/or inverse proportional relationships between driver nodes and parent nodes. However, the values and differential equations that precisely model the expected behavior are not provided in the linear model (e.g., where simple weights are associated with each relationship). By overlaying the partial delay differential equations to the model to create a causal dynamical model, more precise values can be forecasted into the future by adding minimally complex functional forms beyond the linear equations to each relationship instead of just simple linear weights. Some embodiments may also use if-then-else rules or other programmatic structures to represent relationships in addition to or as an alternative to equations and partial delay differential equations. These equations may include second-order effects, time-delay effects, circular relationships between nodes, positive/negative feedback loops, and so forth.

The process described below for generating path prescriptions may be carried out using a single variable (e.g., node 102) in some embodiments, while other embodiments may perform this process for multiple variables in the data structure 100 and/or the reduced data structure 1500. By way of example, the following figures and discussion will focus on node 102 alone for clarity. However, this same process may be recursively applied to multiple parent nodes or to a data structure that includes multiple parent nodes with their corresponding driver nodes, with recurrence of connections leading to termination of the recursion.

At this point, the process can generate causal, dynamical models for the remaining relationships between driver nodes and parent nodes. Thus, some embodiments may limit all relationships in the reduced data structure 1500 except for the most significant driver relationships between nodes. The causal, dynamical model may be used for forecasting, which simulates time series into the future using full partial delay differential equation models to capture time dependencies. The causal, dynamical model may also be used to prescribe different actions that may be taken in the driver nodes to cause or prevent a simulated result in the parent node. For example, if the time series represented by the parent node drops out of a desired range (as happens in factory process control), the simulation may vary values in the driver nodes to determine an optimal prescribed path to prevent the parent node from dropping out of the desired range in the future. Conversely, varying the values in the driver nodes may also determine an optimal prescribed path to achieve a desired value in the parent node. This process for generating path prescriptions is described in detail below. For example, some embodiments may limit the number of relationships/variables to between 8 and 10 relationships for the simulation.

Figure 16:
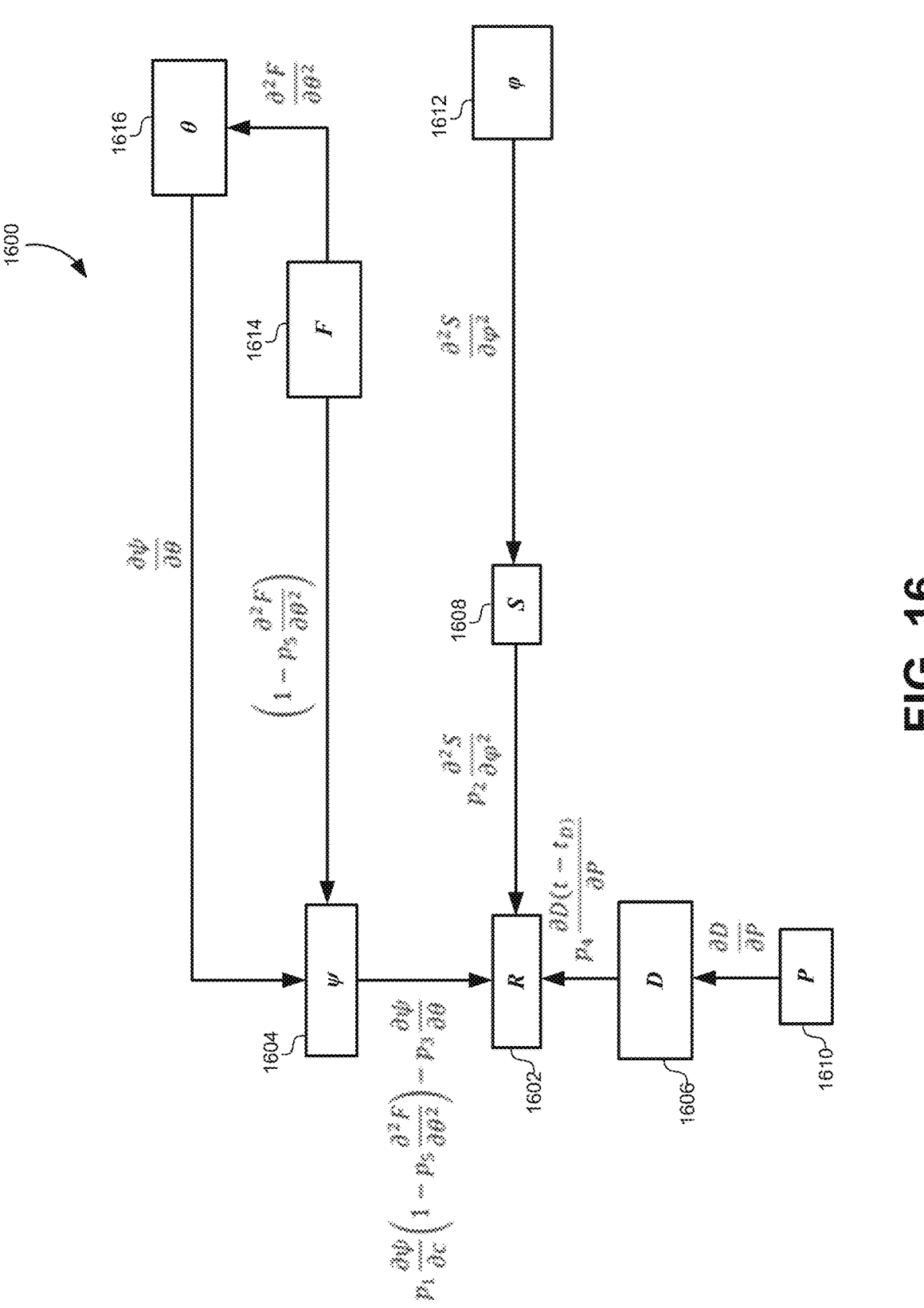
FIG. 16 illustrates a simplified network with added partial delay differential equations representing the relationships between driver nodes and a parent node, according to some embodiments.

FIG. 16 illustrates a simplified network with added partial delay differential equations representing the relationships between driver nodes and a parent node, according to some embodiments. The simplified network 1600 has exchanged the direct linear relationships between nodes with dynamical expressions, such as partial delay differential equations that describe the relationships between the time series represented by these nodes. These dynamical expressions are provided only by way of example and are not meant to be limiting. It is possible to hypothesize multiple alternative models of relationships using a combination of partial delay differential equations and/or rules (e.g., if-then-else constructs).

Formulating partial delay differential equations and/or rules that describe the relationships between time series will be a time-series-specific process and will be very specific to each type of application. The example illustrated in the simplified network 1600 is also described above in FIG. 5. The values of the different time series for the various nodes (e.g., R, D, P, F, etc.) are provided as one enabling example for how partial delay differential equations may be used to describe various time series values using real-world data. However, each relationship between time series in other implementations may be different. One having ordinary skill in the art can take the example of time-series values in FIG. 5 and repeated in FIG. 16 as a guide for specifying partial delay differential equations and/or rules for other time series in different applications.

In this example, node 1602 has had the extraneous relationships to other nodes removed in the simplified network 1600. Therefore, the driver nodes 1604, 1606, 1608 for node 1602 may be nodes that are left from the procedure described above for identifying the most significant driver nodes for each node. Similarly, node 1612 may be identified as a significant driver node for node 1608, and so forth. Although the simplified network 1600 has reduced the original network of the data structure 100 down to a finite number of relationships, the simulation of all of these partial delay differential equations and/or rules is still too complex to simulate for multiple future predictions. Instead, some embodiments may continue to simplify the variable space to enable fast and accurate simulations to predict future time series data.

Figure 17:
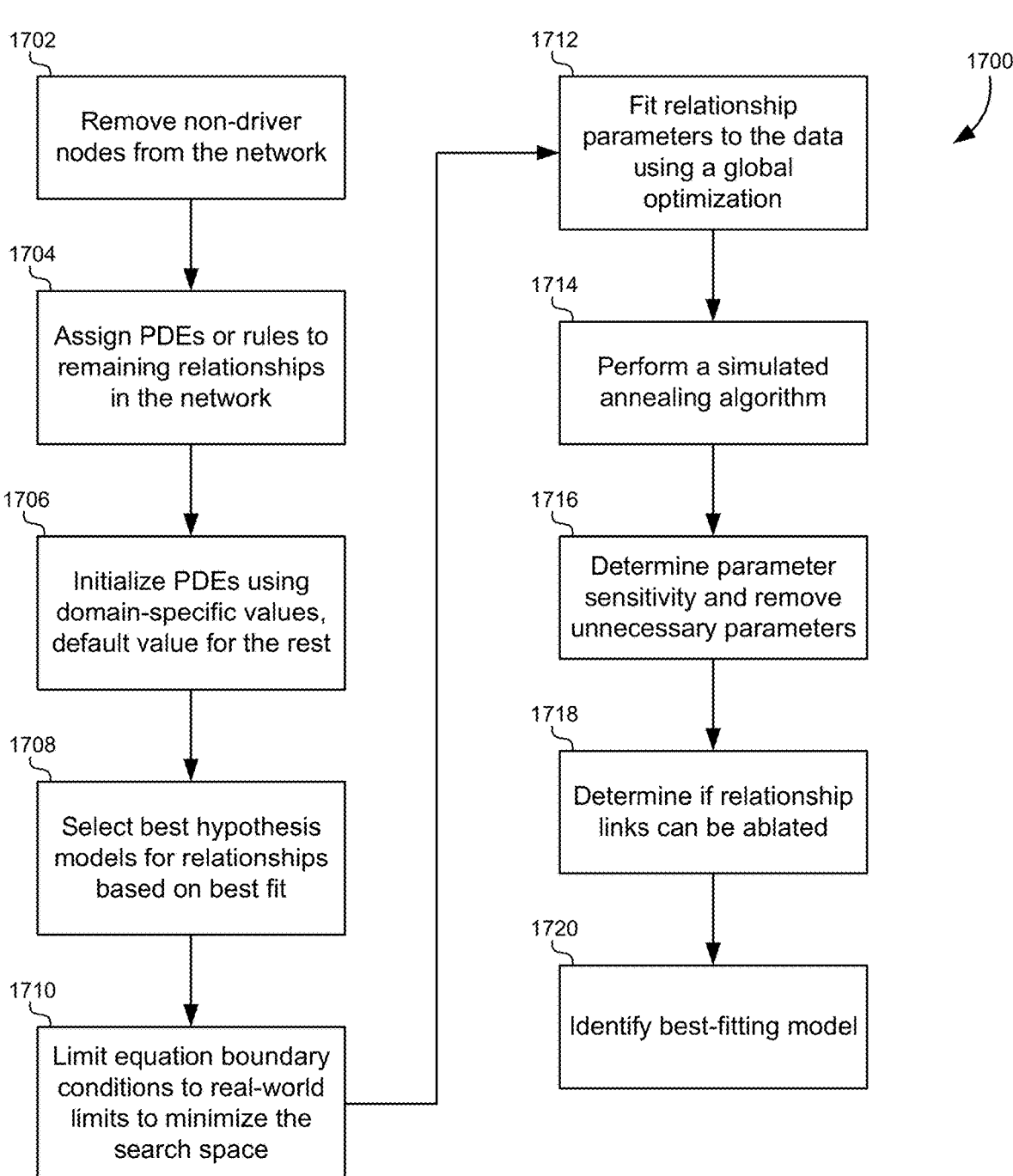
FIG. 17 illustrates a flowchart of a method for simplifying a causal, dynamical network of time series nodes, according to some embodiments.

FIG. 17 illustrates a flowchart 1700 of a method for simplifying a causal, dynamical network of time series nodes, according to some embodiments. As described above, the method may include removing non-driver nodes from the network (1702) and assigning partial delay differential equations and/or rules to remaining relationships in the network (1704).

The method may further include initializing the partial delay differential equations using domain-specific values and/or assigning a default value for remaining initial values (1706). Correctly choosing the initial values for the simulation of a partial delay differential equation can greatly simplify the simulation process by reducing the search space for a solution and starting the simulation closer to optimal solutions. In theory, the initial values can be set to any numerical value. However, because the partial delay differential equations and/or rules describe relationships between real-world time series values, domain-specific knowledge may be used to initialize the partial delay differential equations and thus greatly simplify the process.

Domain-specific knowledge includes knowledge that is related to the real-world values that make up the time series represented by each node and the relationships between nodes. Therefore, the specific values to which the partial delay differential equations may be initialized will depend on each particular application. For example, initial values for coefficients may be set by using real-world information about relationships. For example, reducing the number of users by 10% may result in a 1% increase in efficiency. This 0.1 value may be used as a coefficient in the relationship between these two time series variables in related nodes. This process improves the functioning of the end-to-end simulation by allowing the algorithm to run much faster and avoid getting stuck in local minima that are mere artifacts of model complexity rather than being representative of real-world observations.

For values that do not have easily-assigned initial values, the method may instead assign a value of 0.5 for any remaining initial values that are normalized to begin with. Recall that the process above normalizes each of the time series values in each node. Therefore 0.5 may represent an initial value that does not make a judgment that would limit the outcome of the situation, but rather starts at an initial value that can move towards an optimal solution (e.g., a local min/max) that is near the other assigned initial values. Note that this value is approximate and represents a middle value for a range of variable values after normalization. Other embodiments may use different default values that represent median, average, or middle values for different ranges of time-series variables.

The method may also include selecting the best hypothesis models for relationships based on best-fit (1708). Turning back briefly to FIG. 16, a partial delay differential equation or rules-based relationship has been established for each other relationships in the network. However, some embodiments may propose multiple hypothesis models for each relationship. Since the relationships in the network represent real-world relationships between time-series values, it is likely that multiple equations and/or rules may be devised that describe each relationship. For example, first-order, second-order, etc., relationships may be used to describe a relationship that take into account different delay values, use different constants, and/or otherwise use different mathematical expressions to describe the relationship. Each of these different hypothesis models may be developed based on curve-fitting or may use common models that may be applied to different relationship types. These embodiments may select among all of the different hypothesis models for relationship models that exhibit the best fit to the real-world data in the time series of each node. For example, the values in the time series of a driver node may be provided to the relationship model (e.g., the partial delay differential equation) and evaluated to generate a result set. The results that may then be compared to the actual time-series values recorded in the parent node. This process may be repeated to identify the best-fit hypotheses for each relationship. For example, a standard deviation may be calculated for each relationship model and compared to a threshold to select the three best hypothesis models for each relationship in the network.

The method may additionally include limiting equation boundary conditions to real-world limits to minimize the search space (1710). Human experts may know boundaries of certain time series that the values will typically fall between. For example, a time series representing a number of human users may have a realistic range of between 500 and 1500 users. This may be used to set the boundaries and/or initial conditions for simulating the PDEs. (E.g., It may not be realistic to reduce the number of users below a lower boundary.) In another example, most time-series values may be initialized to exclude negative numbers when they represent real-world scores or counts of discrete objects or measurements. This type of boundary constraint is made possible by linking the domain knowledge of the realistic time-series values to the boundary conditions for the partial delay differential equation solutions. Without this domain-specific information, the variable ranges in the partial delay differential equations would remain unconstrained and would greatly increase the time required to generate simulated results with values that make sense in the real-world context.

The method may further include fitting the equation parameters with the data using a global optimization algorithm (1712). Using the initial values and boundary conditions based on domain-specific knowledge, the equation parameters may be fit to the actual time-series data using techniques such as a Levenberg-Marquardt algorithm (equivalent to a Gauss-Newton using a trust region) or the Nelder-Mead algorithm. This algorithm uses a damped least-squares method to solve non-linear least-squared problems and fit curves/equations to existing data. Some embodiments may alternatively use a non-linear Conjugate-Gradient algorithm or Biconjugate Gradient method, or other similar curve-fitting algorithms.

The method may also include performing a simulated annealing algorithm (1714). The simulated annealing algorithm may include a probabilistic technique for approximating a global optimum value that prevents the solution from getting stuck in a local min/max. While the technique of simulated annealing is often used by biologists or physicists for optimization problems in these fields, this algorithm has not been applied in optimizing parameters in equations describing relationships between different time-series values recorded for an organization. For example, simulated annealing has been used in equations where an energy of the system (thermal energy, kinetic energy, potential energy and/or other forms of physical energy) is optimized. This method uses the simulated annealing algorithm in a new context in which it has not been used before. Instead of optimizing on physical energy, these embodiments optimize based on the error or loss function.

The method may additionally include determining parameter sensitivity and removing unnecessary parameters (1716). Parameters, such as constants or other values in the system of partial delay differential equations, may be tested for sensitivity. In other words, the values of these parameters may be adjusted up/down with an input time series, and the resulting output time series may be evaluated to determine the effect of the adjustment. Values that affect the output of simulated values less than a threshold amount may be removed.

Figure 18:
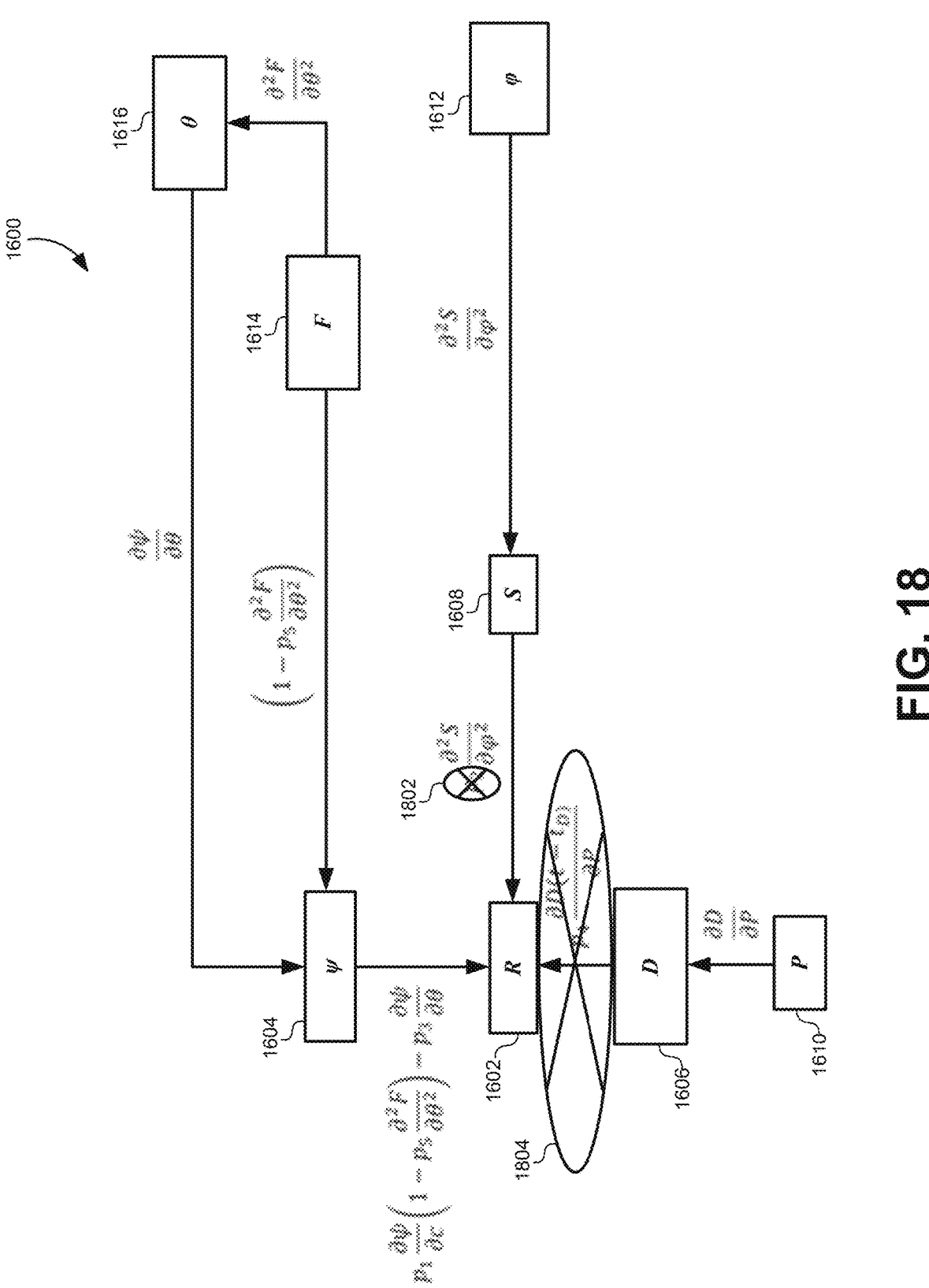
FIG. 18 illustrates an example of how a parameter may be removed from a relationship equation based on sensitivity, according to some embodiments.

FIG. 18 illustrates an example of how a parameter may be removed from a relationship equation based on sensitivity, according to some embodiments. In this example, the partial delay differential equation in the relationship between parent node 1602 and driver node 1608 may include a parameter $p_2$. This parameter 1802 may be adjusted, for example, with values ranging from 0.10 to 100.0. Using the time series from node 1608 as an input, the result can be evaluated to determine how the resulting time series changes as the value of the parameter 1802 is adjusted. If adjustment for the value of the parameter 1802 through the full range of values produces very little change in the resulting output time series (i.e., less than a threshold amount), that parameter 1802 may be determined to have a negligible effect on the simulation within the range of the input values. In order to simplify the set of equations, the parameter 1802 may be removed or set to a default value, such as 0 or 1. This same process may be used for each parameter in the set of equations of the network to greatly reduce the overall simulation time after this optimization is completed. For example, in practice, a simulation that took an order of weeks to complete was reduced to instead be completed in a few hours by determining that there were a very large number of parameters to which the system had very small sensitivity, and dropping those parameters from the simulations, effectively deleting those connections between the variables. For instance, changing the duration of employee breaks and shifts had a very large influence on factory productivity, but multiple parameters including, incoming non-catastrophic shipment delays, and/or employee training days less than a week had a negligible impact in the period simulated.

The method may further include determining if any relationship links can be ablated or removed from the model (1718). Turning back to FIG. 18, the same process described above for determining the sensitivity for parameters in relationship equations may also be used to eliminate entire links in the network. Although the remaining relationships have all been identified as driver relationships, the contribution of some driver relationships may be insignificant compared to the other driver relationships. In this example, the sensitivity of a parent node 1602 for each of the relationships of the driver nodes 1604, 1606, 1608, may be determined by eliminating each relationship from the model and recalculating the resulting output time series values. If the solution still converges and results in approximately the same output, then the relationship may be determined to be unnecessary. In this example, the relationship 1804 may be removed for parent node 1602, as the values of the time series in node 1602 may be dominated by the relationships from driver nodes 1604, 1608. Using this method, each of the relationships in the network may be removed one by one and the resulting convergence of the solution and/or effect on the output time series values may be evaluated. This effectively removes relationships that affect the parent node less than a threshold amount. Any relationship falling below a threshold level of sensitivity may be removed to again simplify the overall model.

Finally, the method may include identifying the best-fitting model after parameter sensitivity and link ablation has been performed (1720). Recall that this process may have been carried out using more than one hypothesis model for the relationships. At this stage, each hypothesis model may undergo the parameter sensitivity and link ablation tests described above (1716), (1718). Now, the best-fitting model may be identified by comparing the output of the model to the actual time series values in the parent nodes of the network. This model may be used going forward for simulating future values of the time series.

At this stage, a final model has been prepared that can efficiently be used to simulate causal, dynamical future values for time series values. Before the optimization process was performed in FIG. 17, the model was limited to purely linear, first-order relationships. The result of the optimization process is a proper model that can be effectively and efficiently simulated to generate accurate future values.

Generating Action Pathways

Figure 19:
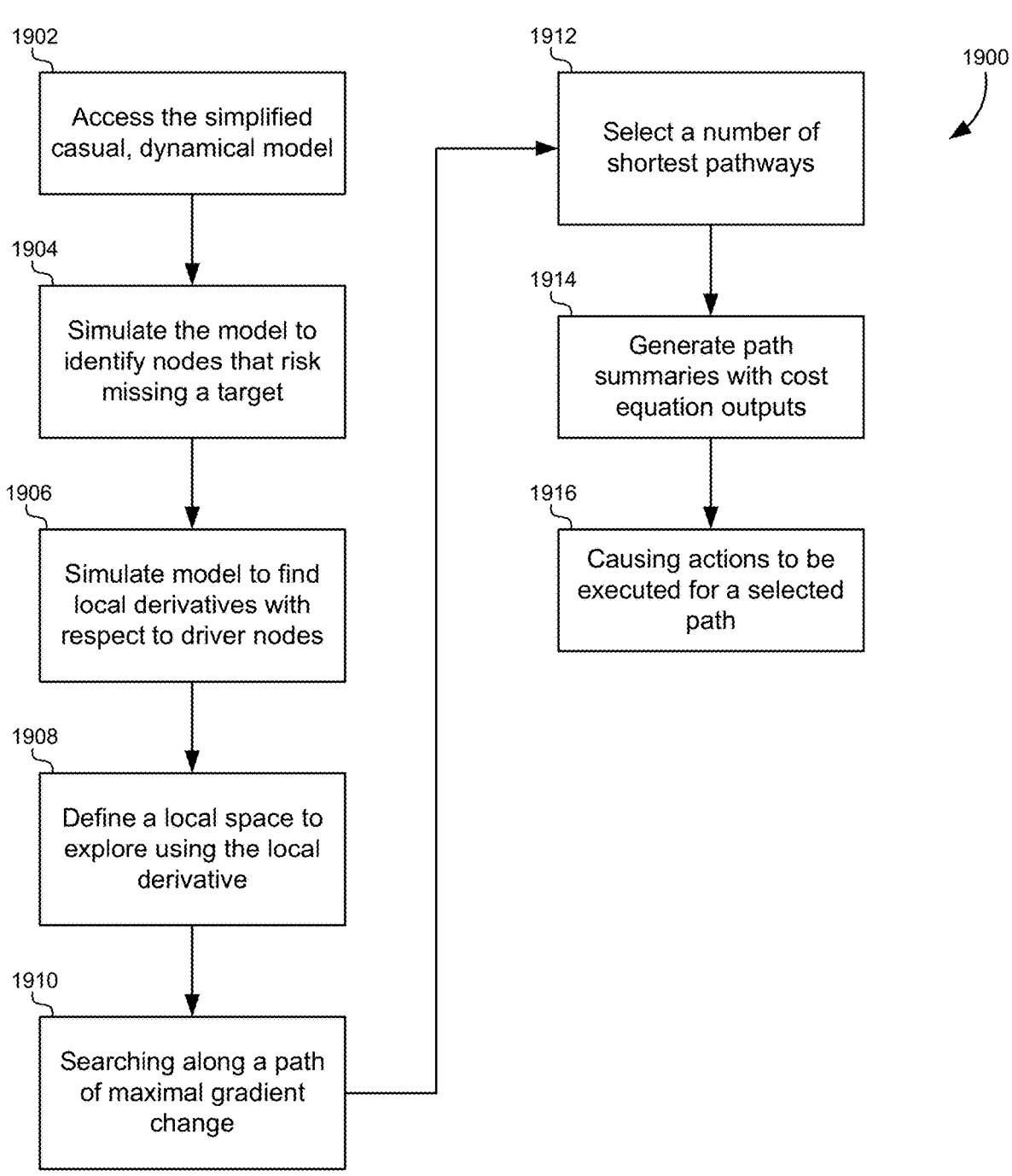
FIG. 19 illustrates a flowchart of a method for generating action paths, according to some embodiments.

FIG. 19 illustrates a flowchart 1900 of a method for generating action paths, according to some embodiments. As used herein, an action path may include one or more actions to be taken relative to time series values in driver nodes to effect a predetermined change in a parent node. The method may include accessing a simplified causal, dynamical model of a system (1902). This model may be derived using the process described above to identify the most significant driver nodes for nodes of interest in the network. The model may be refined and simplified to remove any parameters and/or relationships that do not contribute more than a threshold amount to each node using the process described above. This class of model significantly reduce simulation time by orders of magnitude, depending on the number of parameters found to be below thresholds of significance (typically set at 5% sensitivity or higher) and eliminated from the models. For example, one test eliminated 35% of the parameters of a memory limited model, which resulted in an 8-fold reduction in processing time, and a 15-fold reduction when 64% of the variables were eliminated with a only marginal decrease in model accuracy metrics.

The method may also include simulating the model to identify nodes where there is a risk of missing a target value or range (1904). One or more of the time series represented by nodes in the network may be associated with a human-defined target. For example, a total value over a time interval for a particular time series may have a target value associated with it, such as a number of inputs, number of outputs, a number of client device connections, a number of new customers, and so forth. When simulating the network to generate future values for these nodes, the simulated future values can be compared to the target value to determine whether the target will be met based on the simulation. Some embodiments may use other metrics to determine whether a simulated future time series will deviate from a desired range. For example, some embodiments may identify a time series where a value exceeds a predefined number of standard deviations of the time series distribution. If the simulated future values deviate more than one, two, three, etc., standard deviations of the distribution of values in the time series, these time series may also be identified falling outside of a desired or target range, even if such a range has not been human-specified explicitly a priori. This generates a list of nodes in the network that should be of concern, as they are likely to produce undesirable results according to the simulated future values.

The method may additionally include simulating the network to find local derivatives for each of the nodes at risk for missing a future target with respect to their associated driver nodes (1906). Recall that the model may be constructed from a plurality of relationships defined by partial delay differential equations. Instead of finding a global derivative that would be computationally difficult to calculate, local derivatives can be identified with respect to each driver node for a node at risk of missing a target value. For example, the model may be simulated to identify a derivative of a node with respect to a first driver node. The model may then be simulated to identify a derivative of the node with respect to a second driver node, and so forth until local derivatives with respect to each driver node have been identified.

The method may further include using the local derivative with respect to each driver node to define a local space in which to explore various solutions (1908). For example, the space defined by the top few (typically less than ten) variables may be selected with respect to which target variable has the largest gradient, ordered from the largest to the smallest gradient. The search may then be limited to only these variables, such that the dimensions of the local search space are made up of only these variables. This dramatically speeds up the search for solution paths. In some embodiments, the local derivative of just these ten or fewer variables may define a local area around a time series of values that can be explored as possible alternative future inputs for generating alternative future outputs in the parent node. Stated another way, the local derivative may define changes that can be made to the input values in the driver nodes that will change the future output values of the parent node. These can be used to determine whether a solution exists that can cause the future time series in the parent node to hit its target range. For example, a change in the time series of a driver node can be hypothesized within the local area defined by the local derivative. These values can then be simulated using the model to observe future output values that result from the changing inputs. As discussed below, these new input values can be used to define solution paths or action paths to cause the parent node to be more likely to hit its target value.

The method may also include searching along a path of maximal gradient change (1910). A plurality of paths may exist within the local space defined by the local derivative. Instead of considering all of these paths, pathways may be selected that have a maximal gradient change. Stated another way, the method may select a number of paths that cause the greatest observed change in the simulated output values of the parent node. For example, a pathway may include a change in a trajectory or direction of a time series input over the future time interval. The changes in trajectory or input values that generate the maximum change in the simulated future output values of the parent node may be identified. A "pathway" may define the maximal gradient path, which may be the shortest-length series or chaining of successive changes in one or more input variables conjointly or severally that lead to the minimal change in the target variable such that it is large enough to be within its specified target range. Changes to the input values may be increased/decreased until the resulting simulated future values of the parent node are back within one standard deviation of the previous values or within the specified target range. In other words, the length of the time interval for which the changed input values should continue may be based on an amount of time it takes for the simulation of future output values of the parent node to return to the desired range.

The method may additionally include selecting a number of shortest paths (1912). A predetermined number of the selected paths may be chosen and presented as possible solution pathways for solving the missed target in the parent node. For example, some embodiments may select the shortest two, three, four, etc. pathways to be presented as possible solution pathways. A shortest pathway may be defined as a smallest Euclidean distance or vector magnitude of the pathway until the simulated future output values fall back within the target range. As will be described below, a cost equation may be associated with each path, and a user may benefit from balancing the trade-off between path length/latency and cost.

The method may further include generating path summaries with cost equation outputs (1914). Each pathway may be associated with changes that are made to generate the time series values in the driver nodes that effectuate the change in the parent node. The changes to these values may be associated with a cost. For example, a user may provide a cost for each incremental change to an input time series, and the total cost may be calculated by multiplying the incremental cost by the total change in the values of the time series over the time interval. For example, a cost may be provided that describes an amount of a resource required for each additional customer. If a pathway prescribed adding 100 new customers in the next three months, that cost may be multiplied by the 100 customers to generate a total cost for effectuating the change in the driver node. In some embodiments, the path summaries with corresponding costs (if available) may be provided through a user interface.

Figure 20A:
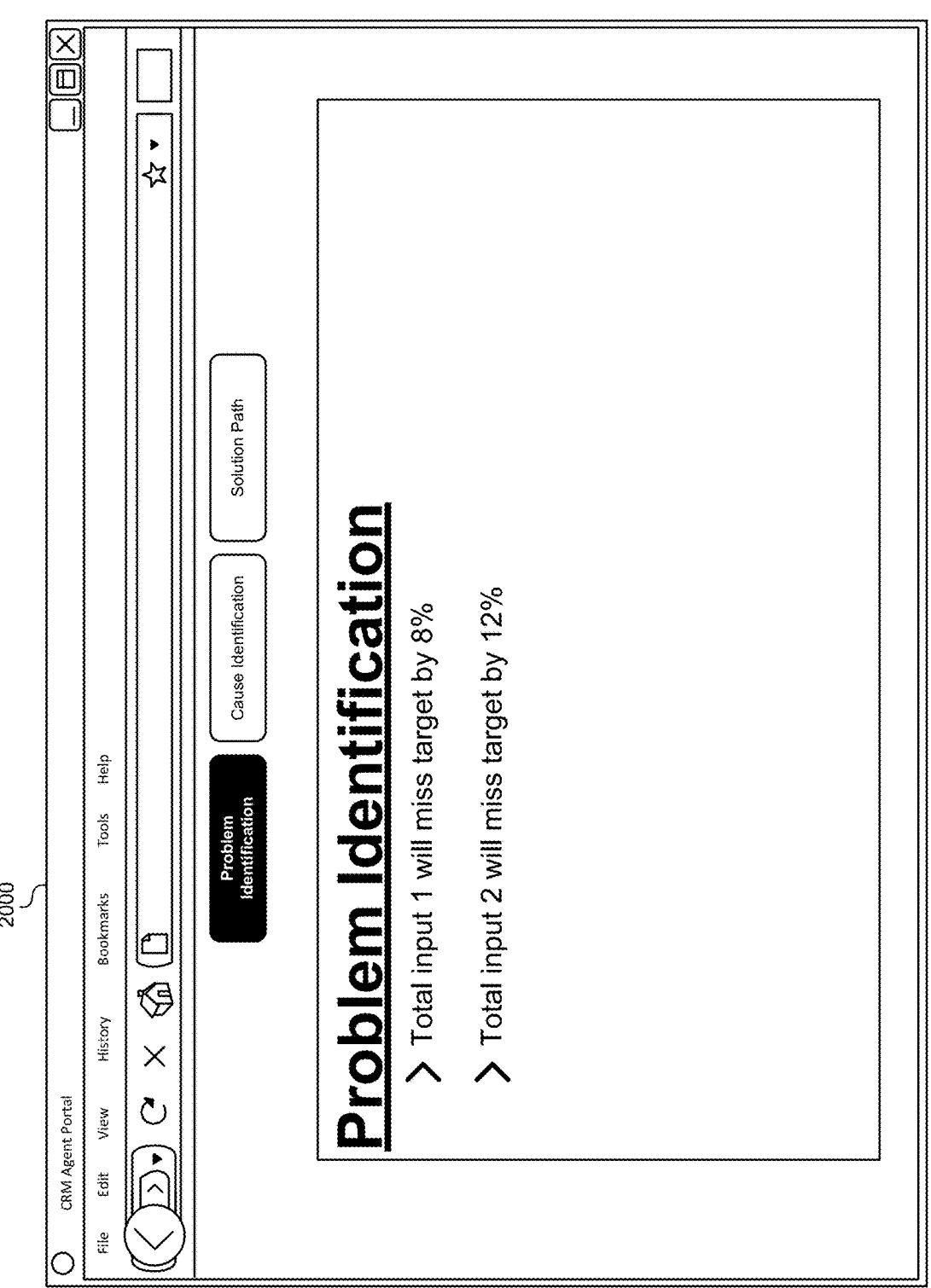
FIGS. 20A-20C illustrate various user interfaces that provide problem identification, causes, and solution paths, according to some embodiments.

FIG. 20A illustrates a user interface 2000 that provides an output of a problem identification, according to some embodiments. As described above, the method may include identifying driver nodes that risk missing a target value or range or deviate by more than two standard deviations based on a simulation that generates future time-series values. After identifying these nodes that risk falling outside the target range, the system may generate plain-English problem identification statements that characterize the type of values stored in the time series and an amount by which they may miss the target value. And output line of text may be generated for each node in the simulation that misses the target value or deviates by more than two standard deviations, for example.

Figure 20B:
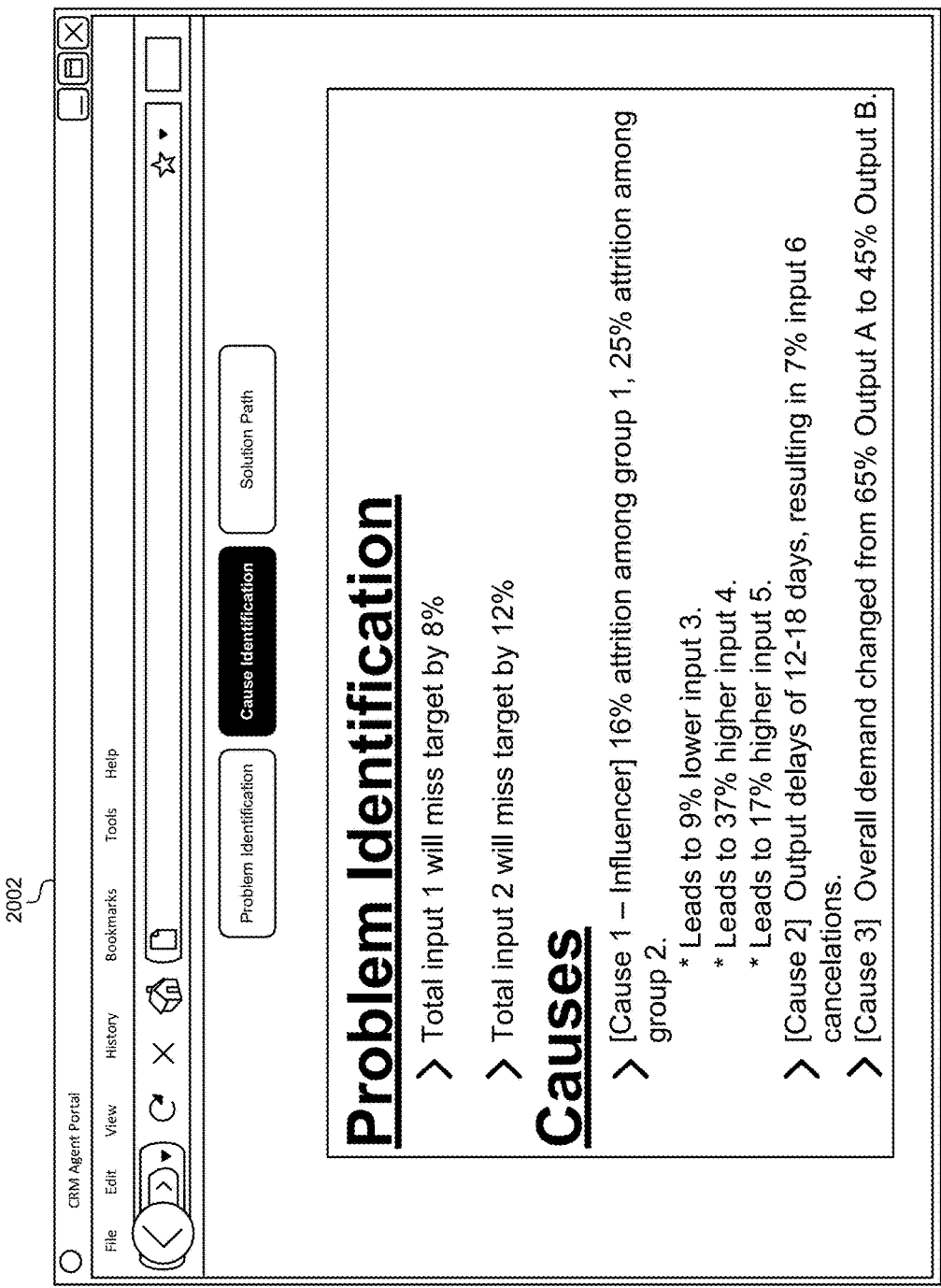

FIG. 20B illustrates a user interface 2002 that identifies the causes of the problems identified in FIG. 20B, according to some embodiments. For each of the parent nodes identified as problems, the driver nodes may also be translated into plain-English statements that characterize the values represented in the time series of the driver nodes. In other words, the trajectory of the values in the driver nodes may be characterized as causes for the parent node missing the target range. In cases where the driver nodes are master influencer nodes (i.e., nodes that significantly influence more than one parent node), list of the effects that this influencer node has on other parent nodes may also be listed. For example, Cause 1 may include a time series that characterizes attrition numbers of one or more groups over time. This master influencer node may also lead to lower/higher outputs for a number of different parent nodes (characterized in FIG. 20B as input 3, input 4, and input 5). Cause 2 and Cause 3 may be related to other driver nodes that strongly influence the parent node identified as missing its target value.

Figure 20C:
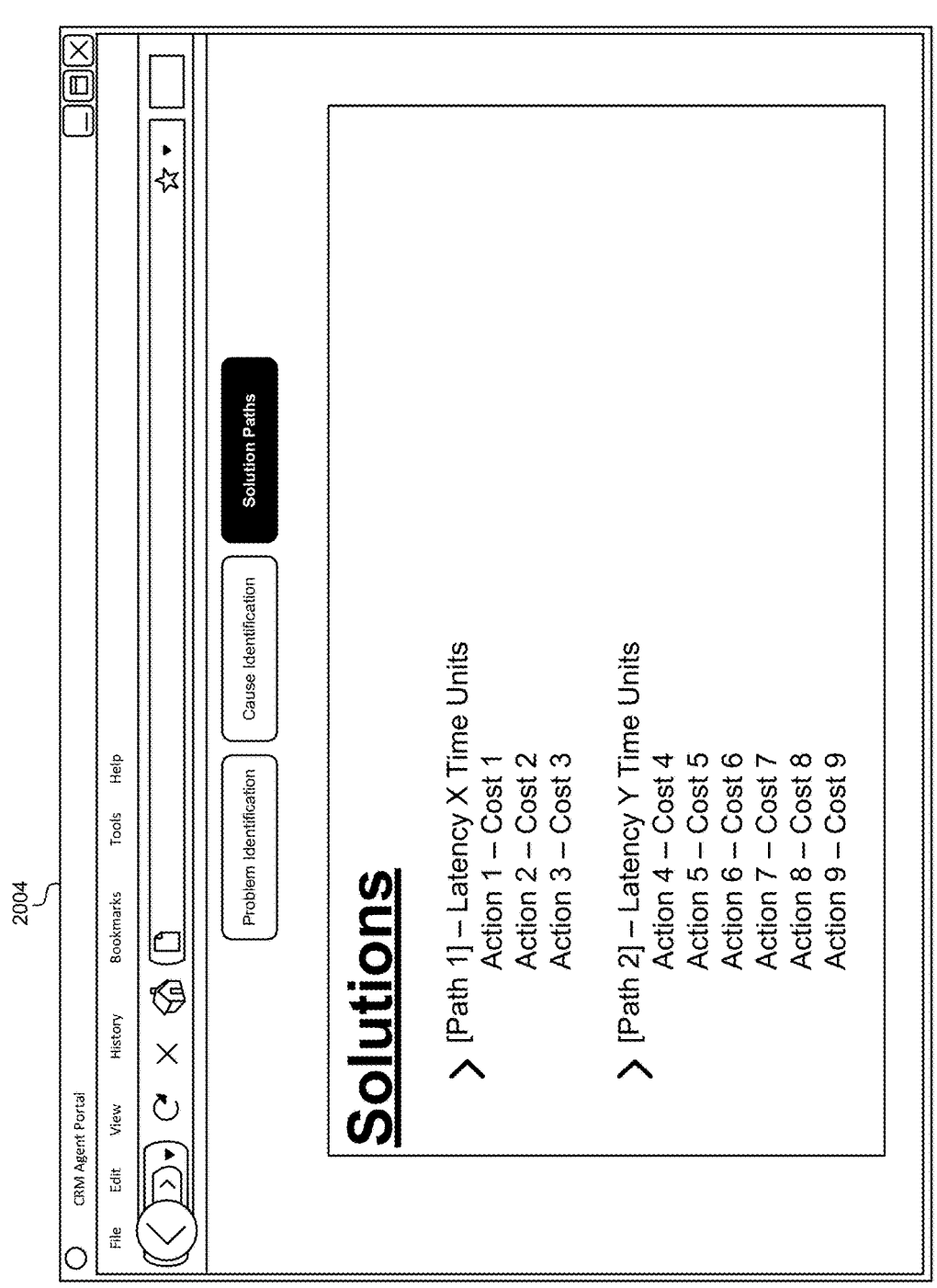

FIG. 20C illustrates a user interface 2004 that presents solution paths calculated to cause the time series of the parent node to move back into a target range, according to some embodiments. The changes made to the future time series represented by each of the driver nodes may be translated into a plain-English statement that describe the change. In this example, each driver node may be translated into a corresponding action with a corresponding cost. For example, increasing a number of customers may be represented by Action 1. This may be multiplied by a cost as described above to generate a cost output. Additionally, a latency or time interval required for the one or more actions to take effect may also be displayed for each solution pathway. For example, Path 1 may take three months to implement, while Path 2 may take six months to implement. However, the total cost associated with Path 2 may be significantly less than the total cost associated with Path 1. This allows the user to select a path that best balances the trade-off between latency and cost.

Turning back briefly to FIG. 19, the method may further include causing a selected action path to be executed (1916). A selected action path may include implementing changes to the values of the time series provided by the driver nodes. In some embodiments, this may be an automatic process, in that the system sends commands to other computer systems that automatically generate the indicated changes to these time series. For example, these actions may include allocating computer resources, subscribing to cloud services, generating invoices or other agreements, and/or the like. In some embodiments, causing these actions to be executed may include displaying the actions on a display device to be executed by one or more human users.

Natural Language Insights for Action Pathways

In the processes described above, a hierarchy of nodes may be analyzed to generate a simplified causal dynamical model of relationship between nodes. The time series represented by these nodes may be analyzed to identify extreme point anomalies or trend anomalies that would indicate missing a target value, exceeding a threshold, or venturing outside of a distribution range defined by number of standard deviations, for a defined time interval. Further "what-if" analyses may be performed to identify action paths or pathways that may be executed to remedy the anomaly identified using the simulations of the causal dynamical model. A diagnosis of the problem with the existing time series trajectory, as well as a description of the action pathway may be output to a display device as illustrated in FIGS. 20A-20C above in a user interface. Specifically, the values and situations identified by the model may be translated into a natural language representation to be presented to a user.

However, translating identified mathematical relationships, trend and point anomalies, and series of specific action paths that may be executed by human and/or computer processes is not a simple or intuitive task. This may require translating these mathematical concepts, time series representations, and numerical values into natural-language statements that can be both understood and executed by the user. Existing solutions may use stringent templates and/or other hard-coded solutions that produce rigid outputs that are very formulaic and "robotic" in their presentation. In short, although they generate accurate descriptions of a problem/solution statement, existing natural language processing methods used in the industry are limited in their expressivity such that they generate pre-scripted outputs that are intuitively and subconsciously identified by users as being machine-generated rather than being human-generated. Human users tend to discount or skim through text that was obviously computer-generated, or that simply combines numbers with boilerplate text in a regurgitated form, offering no additional insight beyond what is otherwise available from raw numbers and graphs. However, when output text has significant novel insights derived from the data, and the text is generated based on a large training corpus such that it appears to approximate the insights that are likely to be provided by a human analyst, users tend to give more credence to the proposed solutions. Generating problem statements and descriptions of prescriptive action pathways are most effective when generated using language output processes that approximate prior natural language expressions.

Therefore, a technical problem exists in the art of natural language processing. Specifically, existing models and/or templates generate text that is formulaic and easily identified as machine-generated. Although the output solutions may be accurate, they do not provide enough novel insight, and they are not provided in a form that can most readily be understood or acted upon by human users. The embodiments described herein solve this and other technical problems in the art by using a semantic discourse grammar including but not limited to approaches based on the FrameNet-based seed mapping of semantic tags (that have specific meanings pre-assigned) to syntactic tags (words or phrases) in text generation. This may be significantly augmented using Transformer-based language models to generate an expanded set of syntactic tags and sentence structures, which create natural-sounding text outputs by finding syntactic tags in the Transformer models that have smallest distances (e.g. cosine distance) to the word embedding vectors of the initial templatized syntactic tags. For example, time series values may be analyzed as described above to identify nodes that may miss a future target value by simulating future values using the simplified causal dynamical model. Values from the nodes representing the time series, along with values from a data structure describing the target values may be used to populate predefined templates of text describing (1) a problem with simulated future values in relation to the target, (2) causes in different time series represented by driver nodes of the problem node, and/or (3) prescriptive action pathways used to remedy the anomaly. These semantic discourse grammar instantiations in the form of multiple structured lists of syntactic tags may then be provided to a Transformer-based natural language model that is trained to receive specific fragments of the input text and to output reworded versions of the input text. The Transformer-based model may reword all and/or portions of the template output text, as some parts may be numbers or specific analysis outputs, statistical data, names of entities from the data, and so forth. The remaining text may include strings that may be modified by synonym-sets of phrases or words with a high similarity in a word sense and/or a phrase sense of meaning. The resulting conversational output text may include phrasing and language variations that vary over time, avoiding repetition and formulaic structures and thus appearing to be closer to natural language in their presentation.

Figure 21:
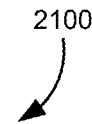
FIG. 21 illustrates a flowchart of a method for generating a natural language variations from nodes representing time series and target values, according to some embodiments.
Figure 21:
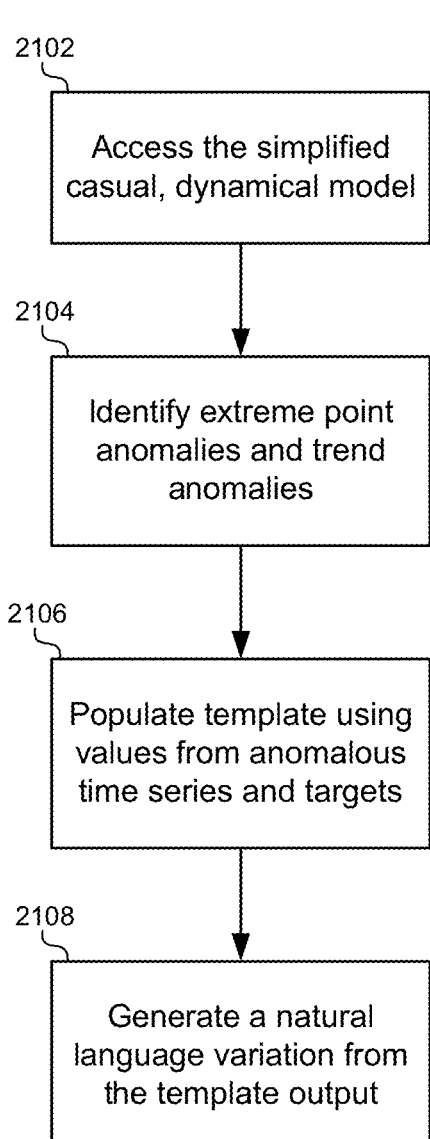

FIG. 21 illustrates a flowchart 2100 of a method for generating a natural language variations from nodes representing time series and target values, according to some embodiments. The method may include accessing a simplified causal dynamical model of a system (2102). This model may be derived using the process described above to identify the most significant driver nodes for nodes of interest in the network. The model may be refined and simplified to remove any parameters and/or relationships that do not contribute more than a threshold minimum proportion to variation in each node using the process described above. This class of models significantly reduces simulation time by orders of magnitude, depending on the number of parameters found to be below thresholds of significance (typically set at 5% sensitivity or higher) and eliminated from the models. For example, one test eliminated 35% of the parameters of a memory-limited model, which resulted in an 8-fold reduction in processing time, and a 15-fold reduction when 64% of the variables were eliminated with a only marginal decrease in model predictive accuracy metrics in forecasts up to 3-6 time steps out.

The method may also include identifying extreme point anomalies and/or trend anomalies (2104). For example, an extreme point anomaly may include values that deviate from historical values or from a threshold value or the distribution of a sequence of values may lie outside a past distribution of values based on tests such as the Kullback-Leibler Divergence test. Trend anomalies may identify trends in time series values that consistently trend in a single direction. For example, a trend anomaly may identify a time series where values predominantly increase over time. Even though individual value differences may increase and decrease, the predominant trend may be in the increasing direction in the aggregate. These anomalies may identify situations where the time series represented by the node is at risk for missing a target value or range as described above, or violating rules such as the Western Electric rules and their derivatives. One or more of the time series represented by nodes in the network may be associated with a human-defined target or an automatically determined excursion of a business process as calculated using statistical process control techniques. For example, a total value over a time interval for a particular time series may have a target value associated with it, such as a number of inputs, number of outputs, a number of client device connections, a number of new customers, and so forth. When simulating the network to generate future values for these nodes, the simulated future values can be compared to the target value to determine whether the target will be met or threshold will be crossed based on the "what-if" simulation. Some embodiments may use other metrics to determine whether a simulated future time series will deviate from a desired range. For example, some embodiments may identify a time series where a value exceeds a predefined number of standard deviations of the time series distribution. If the simulated future values deviate more than one, two, three, etc., standard deviations of the distribution of values in the time series, these time series may also be identified falling outside of a desired or target range, even if such a range has not been human-specified explicitly. This generates a list of nodes in the network that should be of concern, as they are likely to produce undesirable or anomalous results according to the simulated future values. As described below, a target may be represented by a data structure that stores names, entity associations, and target values for a particular type of time series value.

The method may further include the preliminary step of pre-populating a semantic discourse grammar based template, replacing the semantic tags with appropriate syntactic tags using values from the anomalous time series and/or targets (2106), along with thesauri or synsets with similar word senses from, for example, WordNet. This may be used as a seed input to a Transformer based pipeline that inserts phrases that are "close" in terms of word embedding vector distances (e.g., the cosine distance, Earth Mover Distance (EMD), Word Mover's Distance (WMD), Relaxed Word Moving Distance (RWMD), etc.).

Figure 22:
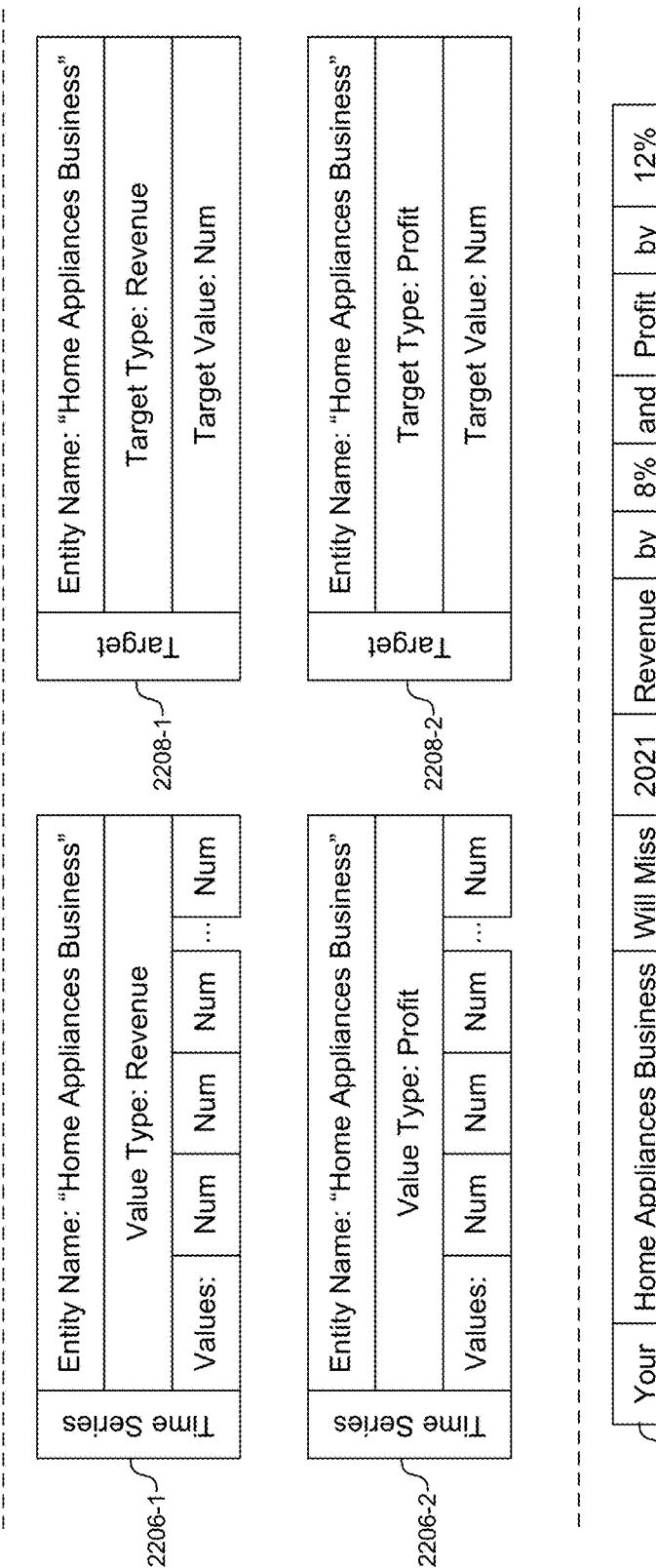
FIG. 22 illustrates an example of how a template may use time series values and target values to generate a natural language output to describe an anomalous time series, according to some embodiments.

FIG. 22 illustrates an example of how a template may use time series values and target values to generate a natural language output to describe an anomalous time series, according to some embodiments. A template 2200 may include language text 2202 in a natural language that are used to generate a sentence output. For example, the language text 2202 may include English-language words, phrases, fragments, sentences, etc., which are syntatic tags that could potentially take the place of semantic tags in the domain semantic discourse grammar. The template 2202 may also include one or more placeholders 2204. The placeholders are semantic tags that may reference values that may be found in nodes representing time series and/or in data structures represented targets. Note that the English language is used here only by way of example, and other embodiments may freely use any language for which a template and/or model may be designed or generated.

In order to populate the template 2200, the template 2200 may first be selected from among a plurality of templates stored by the system. For example, templates may be generated for different types of anomalies, based on a point anomaly, trend, context or distributional shift that is detected. The template 2200 illustrated in FIG. 22 may be associated with a time series missing a target value. The placeholder semantic tags 2204 in the template 2200 may be populated with corresponding values that now become syntactic tags from any time series 2206 and/or any target 2208. Thus, the seed template 2200 may be reused for different types of time series and/or targets that share the same type of anomaly (e.g., missing a target value). Other templates may be generated and stored for exceeding a target value, missing a target range, and so forth. These templates may be generated from statistical generalizations from existing sentence structures of outputs generated by human analysts in reports using sentence parsing, part-of-speech identification, and entity type recognition using natural language parsers. Common sub-sentence structural motifs may then be determined that accompany certain classes of anomalies or other reportable analytical entities.

When the anomalous time series is identified, the type of anomaly may also be determined as described above. The corresponding template 2200 may then be selected from the plurality of templates stored by the system. The template 2200 may then be populated using values from the anomalous time series 2206-1 and/or the identified target 2208-1. In this example, the time series 2206-1 may include an entity name associated with a business, organization, or other entity. The entity name may be associated with a specific target 2208-1 that is also associated with the same entity name. Values from the time series 2206-1 and the target 2208-1 may be used to fill in the placeholders 2204 in the template 2200. For example, the <Time Series Entity> may be populated using the entity name from the time series 2206-1. The placeholder 2204-2 for the year may be populated using a current year and/or a year from the target 2208-1. In some cases, placeholders may be populated with values that are calculated from values in the time series 2206-1 and the target 2208-1. For example, the <Amount> placeholder in the template 2200 may be populated by using a predicted or forecast value from the what-if simulation of the time series 2206-1 calculated using the simplified causal dynamical model, and a target value from the target 2208-1 to determine a percentage shortfall. The template 2200 may include mathematical operators or instructions that may be executed to extract values from the time series 2206-1 and/or the target 2208-1 to generate the value for the placeholder.

In some embodiments, nodes associated with the same entity may include multiple anomalous time series. In this example, the time series 2206-1 and the time series 2206-2 may both be associated with the same entity. These predictions from the two time series 2206 may also both be identified as anomalous for missing corresponding targets 2208. Some templates may accommodate multiple anomalous time series associated with a same entity experiencing the same anomaly type. For example, the template 2200 may accommodate multiple anomalous time series that are associated with a same type of anomaly. Specifically, the template 2200 allows multiple instances of anomalies associated with targets that miss a target value. This allows multiple anomalies to be described by a single text output for a single entity.

After calculating values and populating the placeholders 2204 in the template 2200, a natural language text output 2208 may be generated and displayed by the display device. Note that the sentence produced by the natural language text output 2208 appears as a plain-English text statement. However, this text statement would be generated in the same way using the same language every time the template 2200 is used. While the template 2200 provides a very precise output, it does not produce an output that sounds like a conversational element produced by a human user. As described above, this problem may cause the natural language text output 2208 to be discounted by a user.

Figure 23:
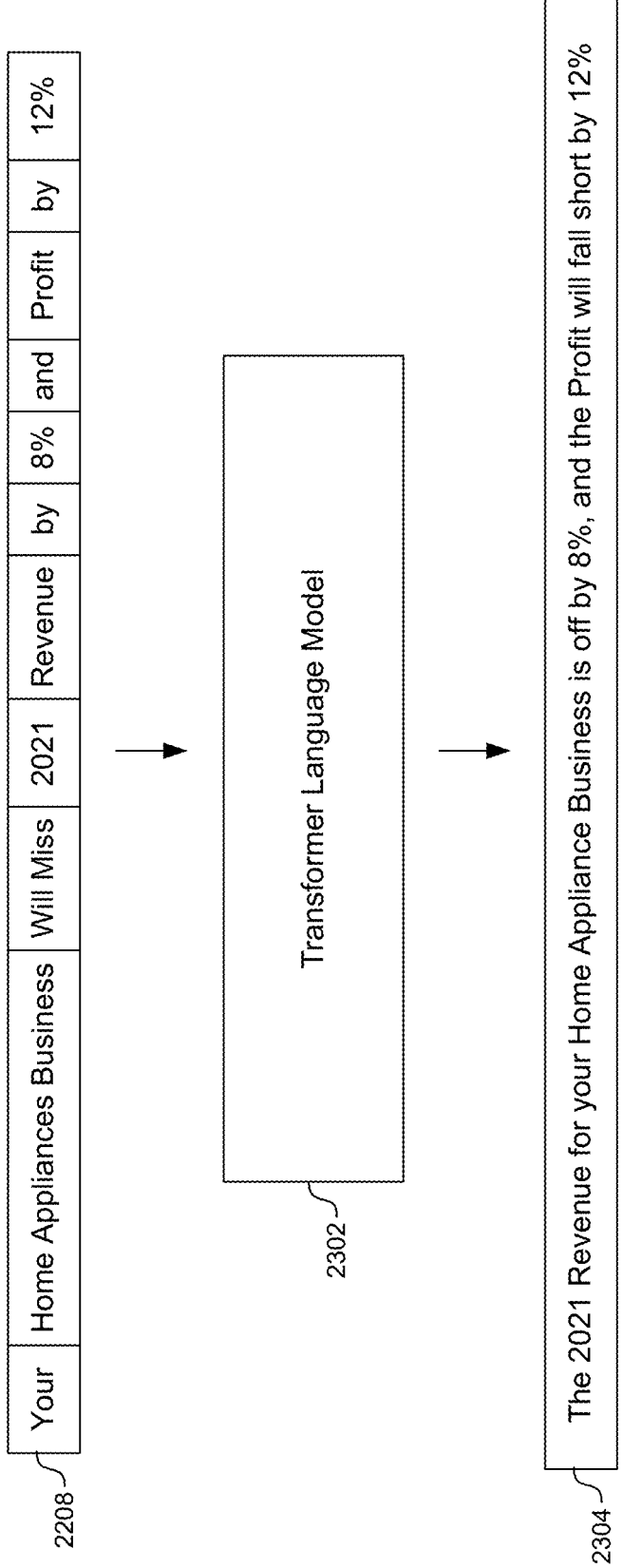
FIG. 23 illustrates how variations on a template output may be generated using a Transformer-based language, according to some embodiments.

Turning back briefly to FIG. 21, the method may further include generating a natural language variation from the template output (2108). FIG. 23 illustrates how variations on a template output may be generated using a Transformer-based language, according to some embodiments. A Transformer is a deep-learning model that utilizes a mechanism known as attention as a way to weight different parts of the input data. Akin to recurrent neural networks (RNNs), transformers may be designed to handle sequential data as is often found in natural languages. However, transformers do not require that the sequential data be processed in order. Different types of Transformer-based language models are available, such as the GPT-2 and/or GPT-3 models, any of which may be used with these embodiments.

The natural language text output 2208 generated from the template 2200 may be provided as an input to the Transformer language model 2302, where a plurality of sets of syntactic tag groups take the place of semantic tags in the semantic discourse grammar. This process may create word embedding vectors from these syntatic tag groups as synsets representative of the natural language expressions. For example, any fungible phrases or utterances in the text output 2208 may be reformulated using synonym words from a dictionary (e.g., WordNet) to generate multiple syntactic phrases all meaning essentially the same thing. The groups or synsets representative of a single natural language expression may then be converted into word vectors that are used as a seed or input to the Transformer model. This provides better output coverage than using a single version of the phrase alone, although some embodiments may simply use the syntax from the template without creating multiple alternatives. Note that these synsets are created using substitutes for individual words, not necessarily substitutes for the entire phrase. For example, "business" may be replace with department, entity, organization, etc.

These may be used in the context of a specific sub-sentential utterance as the query word vector, and that query may be sent to the Transformer model to generate completion text alternatives drawn from the sequence to sequence models. In some embodiments, the model may return a top n list of similarity-ordered target word vectors, which may replace word embedding vectors in the generated text. The process may then use the phrases composed of corresponding words in a stochastic manner, to give an appearance of a natural utterance. In this way, the process may use the word embedding vector similarity for phrases as a proxy for similarity in semantic intent to provide a richer user experience. The Transformer language model 2302 may then generate an conversational-sounding output based on the similarity of meaning with the syntactic tags presented in the natural language text output 2208, enabling a chatbot equivalent interface with the analytics consuming user. The resulting output from the Transformer language model 2302 may include a reworded version of the natural language text output 2208 as described above. The Transformer language model 2302 may be trained using transfer learning techniques for using conversational language inputs from specific user's domain of interest to include domain-specific terminology, utterances, idioms, and even jargon. Therefore, the Transformer language model 2302 may utilize the formulaic, strict, unchanging style of the natural language text output 2208 to generate a more conversational output 2304.

The Transformer language model 2302 may be continuously trained over time with domain natural language text from the customer/user, along with the corpus of questions submitted by the end users. Therefore, the conversational output 2304 may change over time, even when the same inputs are provided in the natural language text output 2208. This not only provides a conversational language output that feels more natural to a user, it also avoids the repetition and formulaic outputs that appear to be machine generated.

Although the example of FIG. 23 receives the entire natural language text output 2208 as an input to the Transformer language model 2302, not all embodiments require such. Some embodiments may only provide specific words/ phrases to the Transformer language model 2302 from the natural language text output 2208. For example, some embodiments may only provide some of the language text 2202 that is expressed as a semantic discourse grammar that is instantiated in the templates such as template 2200, or some of the phrases using mappings of syntactic tags and semantic tags inherent in discourse utterance that entail the semantic discourse grammar. The Transformer language model 2302 may then generate variations of the language text 2202 that may be inserted back into the conversational output 2304. Thus, the Transformer language model 2302 may be used to generate natural sounding improvements of certain portions of the output from the model 2200.

As used herein, a "semantic tag" includes a tagger symbol that represents a meaning rather than a specific set of syntax. In any language, multiple ways exist to express a similar semantic meaning. The semantic tag represents all of the different ways in which the underlying meaning expressed in a particular language. In short, the semantic tag represents a class of words or phrases that may express a similar meaning. In contrast, a syntactic tag is a specific arrangement of words or phrases, i.e., the actual syntax used in an expression. Multiple syntactic tags may be used to replace a semantic tag.

Figure 24:
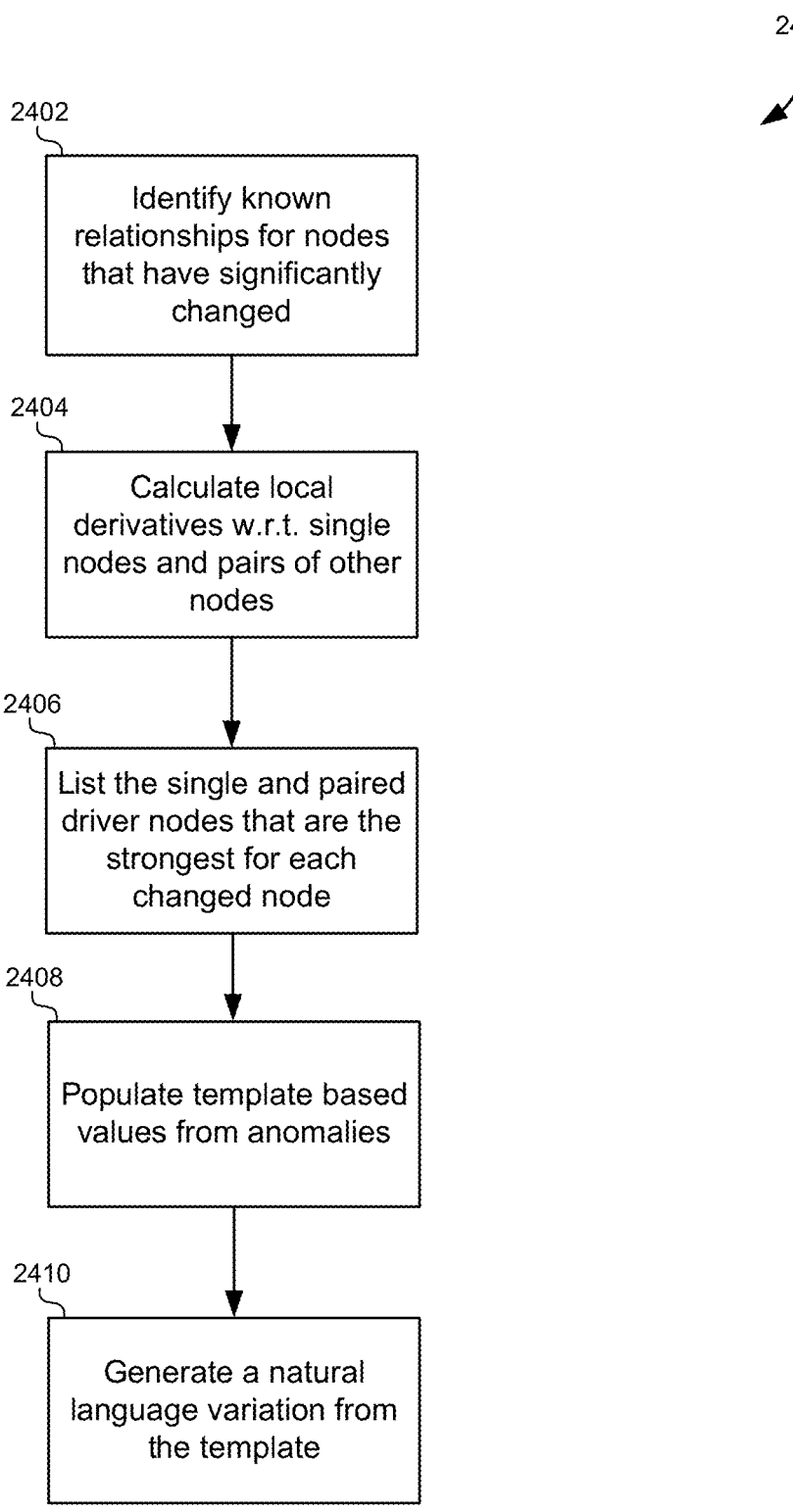
FIG. 24 illustrates a flowchart of a method for generating a conversational output for anomaly causes, according to some embodiments.

FIG. 24 illustrates a flowchart 2400 of a method for generating a conversational output for anomaly causes, according to some embodiments. As described above, the outputs depicted in the user interfaces in FIGS. 20A-20C may include text strings that identify an anomaly or problem in a time series based on simulated future values, identify underlying causes based on driver nodes for that time series, and/or identify action pathways that may be executed to remedy the anomalous values for the time series. The process described above using templates combined with Transformer language models may be used for generating any of these natural-language descriptions of problems, causes, and/or solutions.

For example, generating conversational text descriptions of underlying anomaly causes represented by driver nodes may include identifying known relationships for nodes that have changed significantly by more than a threshold amount (2402). Local partial derivatives in the form of local gradients may then be calculated for top-level nodes with respect to other single driver nodes or pairs of driver nodes (performed recursively until the process traverses back to a higher node again) using the process described in detail above (2402). As also described above, the method may include identifying single or pairs of driver nodes that are most significant for each of the changed parent nodes (1206).

In order to generate and display a natural-language-like text string displaying the change in the parent node, the process described above in FIG. 21 may be carried out for each identified cause. For example, FIG. 20B illustrates three causes for the anomalies identified in the user interface. The time series for each of these three driver nodes may be used to populate corresponding templates that generate the formulaic statements illustrated in FIG. 20B using values from the time series, along with values from the data structures representing the targets themselves. These values may then be used to populate a template (2408). Finally, the natural language output text from the template may be provided to a Transformer language model to generate a natural language variation or conversational output from the model.

To emphasize the importance of the more conversational output from the Transformer language model, note that the text strings generated in FIG. 20B for Cause 1, Cause 2, and Cause 3 use different language structures, different grammatical patterns, and different phrase ordering to create a more conversational output than would otherwise be available from mere templates alone. By creating these variations in the text output, the interest of the user is maintained while reading through each of the three Causes. Some embodiments may provide each sentence describing each of the Causes individually to the Transformer language model. Tentatively, other embodiments may provide the sentences together as a single text input, allowing the Transformer language model to consider the causes as a whole and generate refashioned text accordingly.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 25:
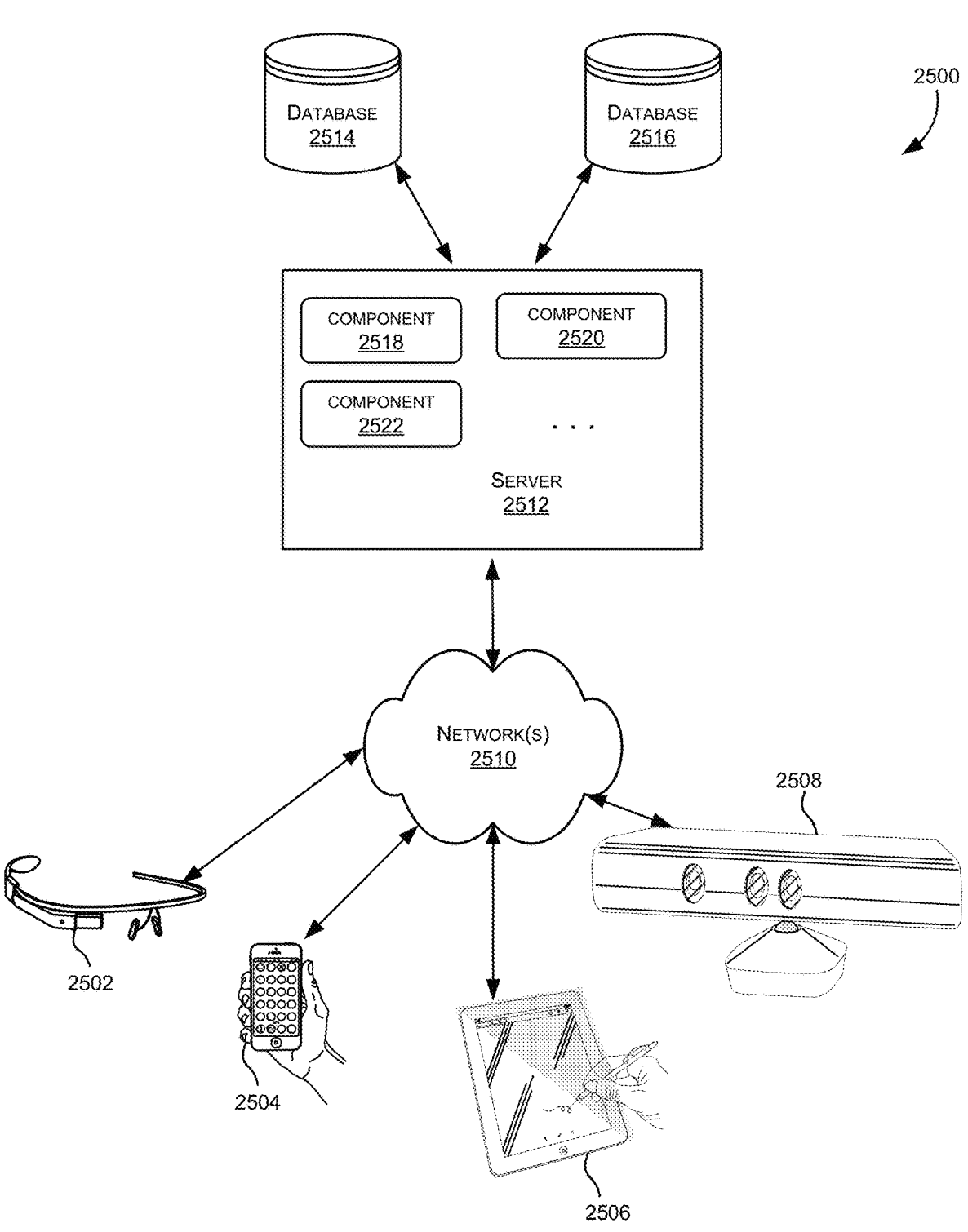
FIG. 25 illustrates a simplified block diagram of a distributed system for implementing some of the embodiments.

FIG. 25 depicts a simplified diagram of a distributed system 2500 for implementing one of the embodiments. In the illustrated embodiment, distributed system 2500 includes one or more client computing devices 2502, 2504, 2506, and 2508, which are configured to execute and operate a client application such as a web browser, proprietary client (e.g., Oracle Forms), or the like over one or more network(s) 2510. Server 2512 may be communicatively coupled with remote client computing devices 2502, 2504, 2506, and 2508 via network 2510.

In various embodiments, server 2512 may be adapted to run one or more services or software applications provided by one or more of the components of the system. In some embodiments, these services may be offered as web-based or cloud services or under a Software as a Service (SaaS) model to the users of client computing devices 2502, 2504, 2506, and/or 2508. Users operating client computing devices 2502, 2504, 2506, and/or 2508 may in turn utilize one or more client applications to interact with server 2512 to utilize the services provided by these components.

In the configuration depicted in the figure, the software components 2518, 2520 and 2522 of system 2500 are shown as being implemented on server 2512. In other embodiments, one or more of the components of system 2500 and/or the services provided by these components may also be implemented by one or more of the client computing devices 2502, 2504, 2506, and/or 2508. Users operating the client computing devices may then utilize one or more client applications to use the services provided by these components. These components may be implemented in hardware, firmware, software, or combinations thereof. It should be appreciated that various different system configurations are possible, which may be different from distributed system 2500. The embodiment shown in the figure is thus one example of a distributed system for implementing an embodiment system and is not intended to be limiting.

Client computing devices 2502, 2504, 2506, and/or 2508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 2502, 2504, 2506, and 2508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 2510.

Although exemplary distributed system 2500 is shown with four client computing devices, any number of client computing devices may be supported. Other devices, such as devices with sensors, etc., may interact with server 2512.

Network(s) 2510 in distributed system 2500 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 2510 can be a local area network (LAN), such as one based on Ethernet, Token-Ring and/or the like. Network(s) 2510 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 2512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 2512 may be adapted to run one or more services or software applications described in the foregoing disclosure. For example, server 2512 may correspond to a server for performing processing described above according to an embodiment of the present disclosure.

Server 2512 may run an operating system including any of those discussed above, as well as any commercially available server operating system. Server 2512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2512 may include one or more applications to analyze and consolidate data feeds and/or event updates received from users of client computing devices 2502, 2504, 2506, and 2508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 2512 may also include one or more applications to display the data feeds and/or real-time events via one or more display devices of client computing devices 2502, 2504, 2506, and 2508.

Distributed system 2500 may also include one or more databases 2514 and 2516. Databases 2514 and 2516 may reside in a variety of locations. By way of example, one or more of databases 2514 and 2516 may reside on a non-transitory storage medium local to (and/or resident in) server 2512. Alternatively, databases 2514 and 2516 may be remote from server 2512 and in communication with server 2512 via a network-based or dedicated connection. In one set of embodiments, databases 2514 and 2516 may reside in a storage-area network (SAN). Similarly, any necessary files for performing the functions attributed to server 2512 may be stored locally on server 2512 and/or remotely, as appropriate. In one set of embodiments, databases 2514 and 2516 may include relational databases, such as databases provided by Oracle, that are adapted to store, update, and retrieve data in response to SQL-formatted commands.

Figure 26:
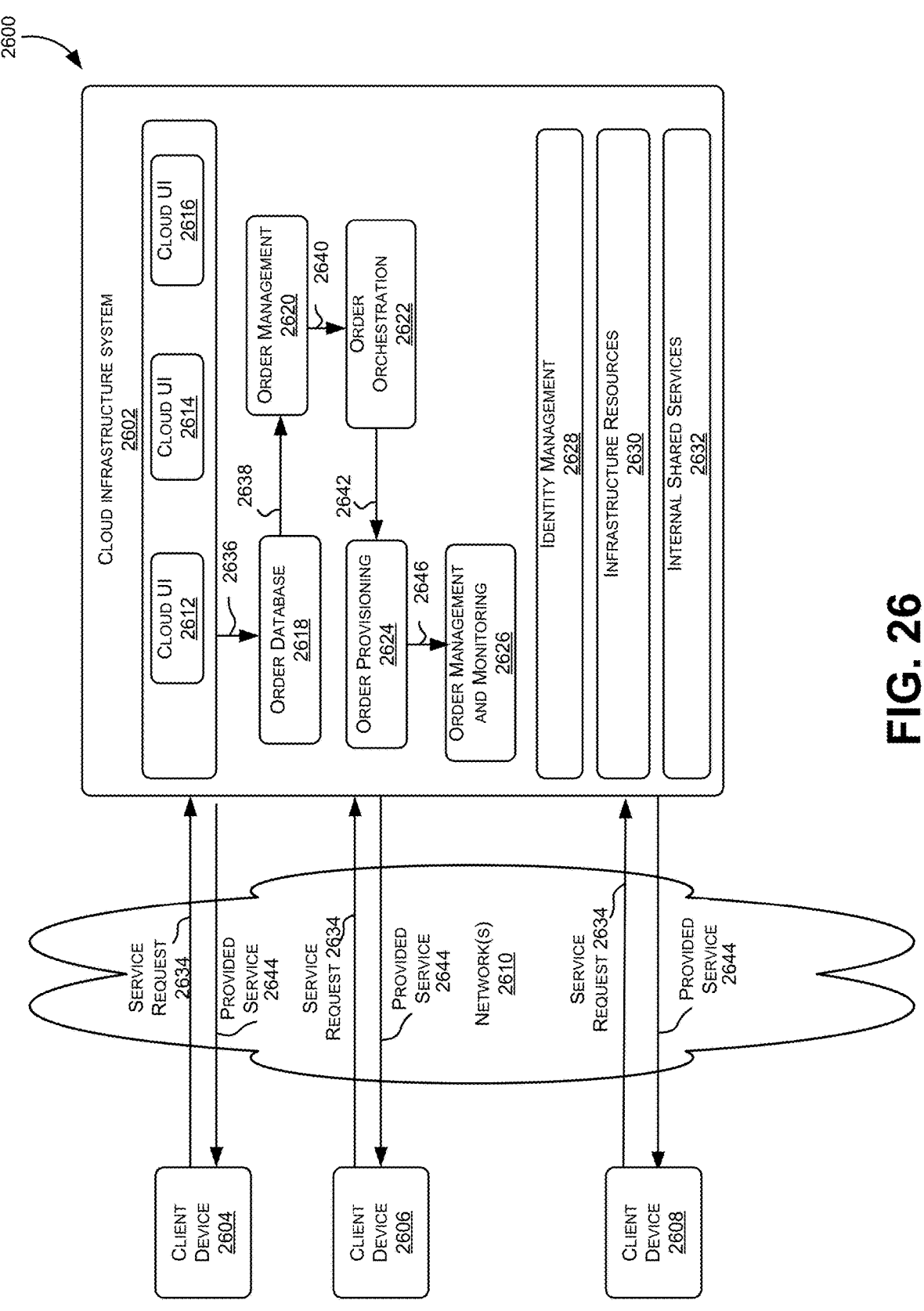
FIG. 26 illustrates a simplified block diagram of components of a system environment by which services provided by the components of an embodiment system may be offered as cloud services.

FIG. 26 is a simplified block diagram of one or more components of a system environment 2600 by which services provided by one or more components of an embodiment system may be offered as cloud services, in accordance with an embodiment of the present disclosure. In the illustrated embodiment, system environment 2600 includes one or more client computing devices 2604, 2606, and 2608 that may be used by users to interact with a cloud infrastructure system 2602 that provides cloud services. The client computing devices may be configured to operate a client application such as a web browser, a proprietary client application (e.g., Oracle Forms), or some other application, which may be used by a user of the client computing device to interact with cloud infrastructure system 2602 to use services provided by cloud infrastructure system 2602.

It should be appreciated that cloud infrastructure system 2602 depicted in the figure may have other components than those depicted. Further, the system shown in the figure is only one example of a cloud infrastructure system that may incorporate some embodiments. In some other embodiments, cloud infrastructure system 2602 may have more or fewer components than shown in the figure, may combine two or more components, or may have a different configuration or arrangement of components.

Client computing devices 2604, 2606, and 2608 may be devices similar to those described above for 2502, 2504, 2506, and 2508.

Although exemplary system environment 2600 is shown with three client computing devices, any number of client computing devices may be supported. Other devices such as devices with sensors, etc. may interact with cloud infrastructure system 2602.

Network(s) 2610 may facilitate communications and exchange of data between clients 2604, 2606, and 2608 and cloud infrastructure system 2602. Each network may be any type of network that can support data communications using any of a variety of commercially-available protocols, including those described above for network(s) 2510.

Cloud infrastructure system 2602 may comprise one or more computers and/or servers that may include those described above for server 2512.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 2602 may be adapted to automatically provision, manage and track a customer's subscription to services offered by cloud infrastructure system 2602. Cloud infrastructure system 2602 may provide the cloud services via different deployment models. For example, services may be provided under a public cloud model in which cloud infrastructure system 2602 is owned by an organization selling cloud services (e.g., owned by Oracle) and the services are made available to the general public or different industry enterprises. As another example, services may be provided under a private cloud model in which cloud infrastructure system 2602 is operated solely for a single organization and may provide services for one or more entities within the organization. The cloud services may also be provided under a community cloud model in which cloud infrastructure system 2602 and the services provided by cloud infrastructure system 2602 are shared by several organizations in a related community. The cloud services may also be provided under a hybrid cloud model, which is a combination of two or more different models.

In some embodiments, the services provided by cloud infrastructure system 2602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2602. Cloud infrastructure system 2602 then performs processing to provide the services in the customer's subscription order.

In some embodiments, the services provided by cloud infrastructure system 2602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2602 may also include infrastructure resources 2630 for providing the resources used to provide various services to customers of the cloud infrastructure system. In one embodiment, infrastructure resources 2630 may include pre-integrated and optimized combinations of hardware, such as servers, storage, and networking resources to execute the services provided by the PaaS platform and the SaaS platform.

In some embodiments, resources in cloud infrastructure system 2602 may be shared by multiple users and dynamically re-allocated per demand. Additionally, resources may be allocated to users in different time zones. For example, cloud infrastructure system 2630 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2632 may be provided that are shared by different components or modules of cloud infrastructure system 2602 and by the services provided by cloud infrastructure system 2602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 2602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 2602, and the like.

In one embodiment, as depicted in the figure, cloud management functionality may be provided by one or more modules, such as an order management module 2620, an order orchestration module 2622, an order provisioning module 2624, an order management and monitoring module 2626, and an identity management module 2628. These modules may include or be provided using one or more computers and/or servers, which may be general purpose computers, specialized server computers, server farms, server clusters, or any other appropriate arrangement and/or combination.

In exemplary operation 2634, a customer using a client device, such as client device 2604, 2606 or 2608, may interact with cloud infrastructure system 2602 by requesting one or more services provided by cloud infrastructure system 2602 and placing an order for a subscription for one or more services offered by cloud infrastructure system 2602. In certain embodiments, the customer may access a cloud User Interface (UI), cloud UI 2612, cloud UI 2614 and/or cloud UI 2616 and place a subscription order via these UIs. The order information received by cloud infrastructure system 2602 in response to the customer placing an order may include information identifying the customer and one or more services offered by the cloud infrastructure system 2602 that the customer intends to subscribe to.

After an order has been placed by the customer, the order information is received via the cloud UIs, 2612, 2614 and/or 2616.

At operation 2636, the order is stored in order database 2618. Order database 2618 can be one of several databases operated by cloud infrastructure system 2618 and operated in conjunction with other system elements.

At operation 2638, the order information is forwarded to an order management module 2620. In some instances, order management module 2620 may be configured to perform billing and accounting functions related to the order, such as verifying the order, and upon verification, booking the order.

At operation 2640, information regarding the order is communicated to an order orchestration module 2622. Order orchestration module 2622 may utilize the order information to orchestrate the provisioning of services and resources for the order placed by the customer. In some instances, order orchestration module 2622 may orchestrate the provisioning of resources to support the subscribed services using the services of order provisioning module 2624.

In certain embodiments, order orchestration module 2622 enables the management of business processes associated with each order and applies business logic to determine whether an order should proceed to provisioning. At operation 2642, upon receiving an order for a new subscription, order orchestration module 2622 sends a request to order provisioning module 2624 to allocate resources and configure those resources needed to fulfill the subscription order. Order provisioning module 2624 enables the allocation of resources for the services ordered by the customer. Order provisioning module 2624 provides a level of abstraction between the cloud services provided by cloud infrastructure system 2600 and the physical implementation layer that is used to provision the resources for providing the requested services. Order orchestration module 2622 may thus be isolated from implementation details, such as whether or not services and resources are actually provisioned on the fly or pre-provisioned and only allocated/assigned upon request.

At operation 2644, once the services and resources are provisioned, a notification of the provided service may be sent to customers on client devices 2604, 2606 and/or 2608 by order provisioning module 2624 of cloud infrastructure system 2602.

At operation 2646, the customer's subscription order may be managed and tracked by an order management and monitoring module 2626. In some instances, order management and monitoring module 2626 may be configured to collect usage statistics for the services in the subscription order, such as the amount of storage used, the amount data transferred, the number of users, and the amount of system up time and system down time.

In certain embodiments, cloud infrastructure system 2600 may include an identity management module 2628. Identity management module 2628 may be configured to provide identity services, such as access management and authorization services in cloud infrastructure system 2600. In some embodiments, identity management module 2628 may control information about customers who wish to utilize the services provided by cloud infrastructure system 2602. Such information can include information that authenticates the identities of such customers and information that describes which actions those customers are authorized to perform relative to various system resources (e.g., files, directories, applications, communication ports, memory segments, etc.) Identity management module 2628 may also include the management of descriptive information about each customer and about how and by whom that descriptive information can be accessed and modified.

Figure 27:
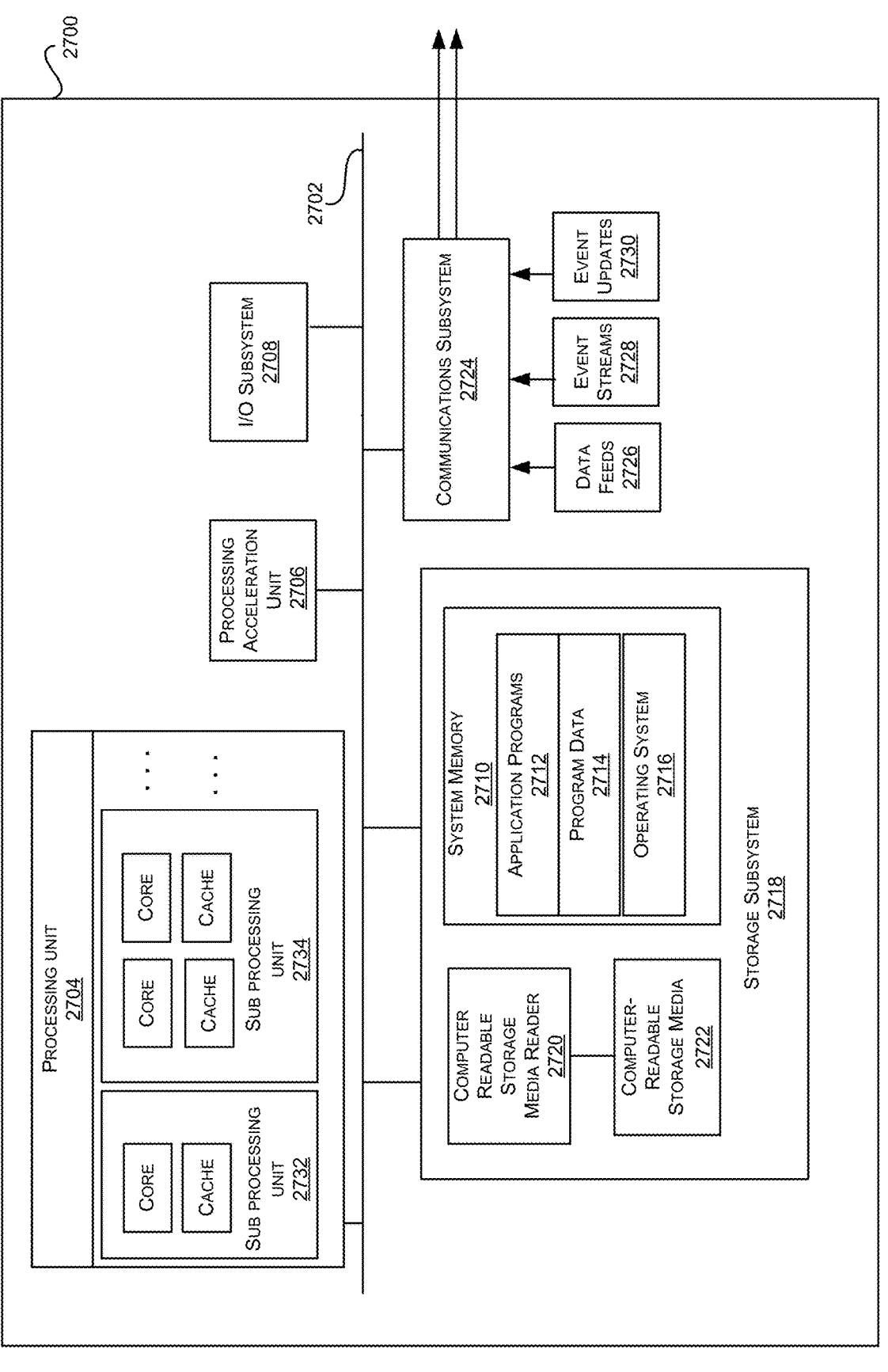
FIG. 27 illustrates an exemplary computer system, in which various embodiments may be implemented.

FIG. 27 illustrates an exemplary computer system 2700, in which various embodiments may be implemented. The system 2700 may be used to implement any of the computer systems described above. As shown in the figure, computer system 2700 includes a processing unit 2704 that communicates with a number of peripheral subsystems via a bus subsystem 2702. These peripheral subsystems may include a processing acceleration unit 2706, an I/O subsystem 2708, a storage subsystem 2718 and a communications subsystem 2724. Storage subsystem 2718 includes tangible computer-readable storage media 2722 and a system memory 2710.

Bus subsystem 2702 provides a mechanism for letting the various components and subsystems of computer system 2700 communicate with each other as intended. Although bus subsystem 2702 is shown schematically as a single bus, alternative embodiments of the bus subsystem may utilize multiple buses. Bus subsystem 2702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2704, which can be implemented as one or more integrated circuits (e.g., a conventional microprocessor or microcontroller), controls the operation of computer system 2700. One or more processors may be included in processing unit 2704. These processors may include single core or multicore processors. In certain embodiments, processing unit 2704 may be implemented as one or more independent processing units 2732 and/or 2734 with single or multicore processors included in each processing unit. In other embodiments, processing unit 2704 may also be implemented as a quad-core processing unit formed by integrating two dual-core processors into a single chip.

In various embodiments, processing unit 2704 can execute a variety of programs in response to program code and can maintain multiple concurrently executing programs or processes. At any given time, some or all of the program code to be executed can be resident in processor(s) 2704 and/or in storage subsystem 2718. Through suitable programming, processor(s) 2704 can provide various functionalities described above. Computer system 2700 may additionally include a processing acceleration unit 2706, which can include a digital signal processor (DSP), a special-purpose processor, and/or the like.

I/O subsystem 2708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2700 may comprise a storage subsystem 2718 that comprises software elements, shown as being currently located within a system memory 2710. System memory 2710 may store program instructions that are loadable and executable on processing unit 2704, as well as data generated during the execution of these programs.

Depending on the configuration and type of computer system 2700, system memory 2710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2704. In some implementations, system memory 2710 may include multiple different types of memory, such as static random access memory (SRAM) or dynamic random access memory (DRAM). In some implementations, a basic input/output system (BIOS), containing the basic routines that help to transfer information between elements within computer system 2700, such as during start-up, may typically be stored in the ROM. By way of example, and not limitation, system memory 2710 also illustrates application programs 2712, which may include client applications, Web browsers, mid-tier applications, relational database management systems (RDBMS), etc., program data 2714, and an operating system 2716. By way of example, operating system 2716 may include various versions of Microsoft Windows®, Apple Macintosh®, and/ or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2718 may also provide a tangible computer-readable storage medium for storing the basic programming and data constructs that provide the functionality of some embodiments. Software (programs, code modules, instructions) that when executed by a processor provide the functionality described above may be stored in storage subsystem 2718. These software modules or instructions may be executed by processing unit 2704. Storage subsystem 2718 may also provide a repository for storing data used in accordance with some embodiments.

Storage subsystem 2700 may also include a computer-readable storage media reader 2720 that can further be connected to computer-readable storage media 2722. Together and, optionally, in combination with system memory 2710, computer-readable storage media 2722 may comprehensively represent remote, local, fixed, and/or removable storage devices plus storage media for temporarily and/or more permanently containing, storing, transmitting, and retrieving computer-readable information.

Computer-readable storage media 2722 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2700.

By way of example, computer-readable storage media 2722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2722 may include, but is not limited to, Zip® drives, flash memory cards, universal serial bus (USB) flash drives, secure digital (SD) cards, DVD disks, digital video tape, and the like. Computer-readable storage media 2722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2700.

Communications subsystem 2724 provides an interface to other computer systems and networks. Communications subsystem 2724 serves as an interface for receiving data from and transmitting data to other systems from computer system 2700. For example, communications subsystem 2724 may enable computer system 2700 to connect to one or more devices via the Internet. In some embodiments communications subsystem 2724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2724 can provide wired network connectivity (e.g., Ethernet) in addition to or instead of a wireless interface.

In some embodiments, communications subsystem 2724 may also receive input communication in the form of structured and/or unstructured data feeds 2726, event streams 2728, event updates 2730, and the like on behalf of one or more users who may use computer system 2700.

By way of example, communications subsystem 2724 may be configured to receive data feeds 2726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2724 may also be configured to receive data in the form of continuous data streams, which may include event streams 2728 of real-time events and/or event updates 2730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2724 may also be configured to output the structured and/or unstructured data feeds 2726, event streams 2728, event updates 2730, and the like to one or more databases that may be in communication with one or more streaming data source computers coupled to computer system 2700.

Computer system 2700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have beeen described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of generating natural language outputs, the method comprising:

accessing a model of a system, wherein the system is represented by a hierarchy of nodes in a data structure, and nodes in the hierarchy of nodes comprise time series of data;

identifying a time series represented by a node in the data structure that will generate a future anomaly;

accessing a template that is selected from a plurality of templates based on a corresponding to a type of the time series, wherein the template comprises semantic tags;

populating the semantic tags in the template using data from the time series;

sending a phrase from the template to a natural language model;

receiving a plurality of similar phrases having a same semantic meaning as the phrase from the natural language model;

selecting one of the plurality of similar phrases and replacing the phrase in the template; and causing language from the template to be displayed on a display device.

2. The method of claim 1, wherein identifying the time series that will generate the future anomaly comprises:

simulating the model of the system to generate a simulated future time series; and determining that the simulated future time series includes data points that fall outside of a threshold region.

3. The method of claim 1, wherein identifying the time series that will generate the future anomaly comprises:

identifying a trend such that the time series increases or decreases in a single direction in an aggregate.

4. The method of claim 1, wherein the template comprises semantic tags that are replaced by data points in the time series.

5. The method of claim 1, wherein the time series comprises an entity name, a value type, and a plurality of values.

6. The method of claim 1, wherein the natural language model comprises a Transformer model.

7. The method of claim 1, further comprising:

selecting the plurality of similar phrases from a plurality of output phrases from the natural language model, wherein the plurality of similar phrases are selected based on a being above a threshold.

8. The method of claim 1, wherein selecting the one of the plurality of similar phrases and replacing the phrase in the template comprises:

randomly selecting one of the plurality of similar phrases.

9. A non-transitory computer-readable medium comprising instructions that, when executed by one or more processors, cause the one or more processors to perform operations comprising:

accessing a model of a system, wherein the system is represented by a hierarchy of nodes in a data structure, and nodes in the hierarchy of nodes comprise time series of data;

identifying a time series represented by a node in the data structure that will generate a future anomaly;

accessing a template that is selected from a plurality of templates based on a corresponding to a type of the time series, wherein the template comprises semantic tags;

populating the semantic tags in the template using data from the time series;

sending a phrase from the template to a natural language model;

receiving a plurality of similar phrases having a same semantic meaning as the phrase from the natural language model;

selecting one of the plurality of similar phrases and replacing the phrase in the template; and causing language from the template to be displayed on a display device.

10. The non-transitory computer-readable medium of claim 9, further comprising:

generating a plurality of phrases from the phrase before sending the phrase to the natural language model.

11. The non-transitory computer-readable medium of claim 10, wherein the plurality of phrases are generated from the phrase by substituting words in the phrase with synonym words.

12. The non-transitory computer-readable medium of claim 11, wherein the plurality of phrases are converted into word vectors.

13. The non-transitory computer-readable medium of claim 12, wherein the word vectors are provided as a seed to the natural language model.

14. A system comprising:

one or more processors; and one or more memory devices comprising instructions that, when executed by the one or more processors, cause the one or more processors to perform operations comprising:

accessing a model of a system, wherein the system is represented by a hierarchy of nodes in a data structure, and nodes in the hierarchy of nodes comprise time series of data;

identifying a time series represented by a node in the data structure that will generate a future anomaly;

accessing a template that is selected from a plurality of templates based on a corresponding to a type of the time series, wherein the template comprises semantic tags;

populating the semantic tags in the template using data from the time series;

sending a phrase from the template to a natural language model;

receiving a plurality of similar phrases having a same semantic meaning as the phrase from the natural language model;

selecting one of the plurality of similar phrases and replacing the phrase in the template; and causing language from the template to be displayed on a display device.

15. The system of claim 14, wherein the hierarchy of nodes in the data structure comprises a plurality of non-cyclical, linear parent-child relationships.

16. The system of claim 14, wherein the operations further comprise:

simplifying the model by removing relationships between the hierarchy of nodes that affect parent nodes less than a threshold amount;

simulating the model to identify a node comprising a time series of data that risks missing a predefined target value;

generating a pathway of actions comprising changes to driver nodes of the node that cause the time series of data to move within a threshold distance of the predefined target value in the future, wherein the template describes the action pathway.

17. The system of claim 16, wherein simplifying the model further comprises removing parameters from the model that affect simulated values less than a threshold amount.

18. The system of claim 17, wherein simplifying the model further comprises removing non-driver notes from the hierarchy of nodes.

19. The system of claim 18, wherein simplifying the model further comprises assigning partial delay equations to relationships between the hierarchy of nodes.

20. The system of claim 19, wherein simplifying the model further comprises:

initializing the partial delay equations using domain-specific values; and assigning default values to partial delay equations without
   domain-specific values.

* * * * *